(12) United States Patent
Itani et al.

(10) Patent No.: US 9,649,787 B2
(45) Date of Patent: May 16, 2017

(54) SHEET-SHAPED MOLD POSITION DETECTION DEVICE, TRANSFER DEVICE AND TRANSFER METHOD

(75) Inventors: Shinya Itani, Mishima (JP); Hiromi Nishihara, Fuji (JP); Takato Baba, Numazu (JP); Takaharu Tashiro, Gotemba (JP); Takafumi Ookawa, Mishima (JP); Hidetoshi Kitahara, Atami (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 689 days.

(21) Appl. No.: 13/583,191

(22) PCT Filed: Feb. 24, 2011

(86) PCT No.: PCT/JP2011/054138
§ 371 (c)(1),
(2), (4) Date: Sep. 6, 2012

(87) PCT Pub. No.: WO2011/111546
PCT Pub. Date: Sep. 15, 2011

(65) Prior Publication Data
US 2012/0326346 A1    Dec. 27, 2012

(30) Foreign Application Priority Data
Mar. 8, 2010 (JP) ................... 2010-050452

(51) Int. Cl.
B29C 37/00 (2006.01)
B29C 31/00 (2006.01)
(Continued)

(52) U.S. Cl.
CPC ........ *B29C 37/0003* (2013.01); *B29C 31/006* (2013.01); *B29C 33/303* (2013.01);
(Continued)

(58) Field of Classification Search
None
See application file for complete search history.

(56) References Cited

U.S. PATENT DOCUMENTS 5,483,348 A * 1/1996 Komatsu ............... G03F 9/70
250/548
2004/0182820 A1 9/2004 Motowaki
(Continued)

FOREIGN PATENT DOCUMENTS

| CN | 1979336 | 6/2007 |
|---|---|---|
| CN | 101118380 | 2/2008 |

(Continued)

OTHER PUBLICATIONS

Muhlberger M. et al. A Moire method for high accuracy alignment in nanoimprint lithography,2007, Science Direct, 925-927.*
(Continued)

*Primary Examiner* — Stella Yi
(74) *Attorney, Agent, or Firm* — DLA Piper LLP US

(57) ABSTRACT

A sheet-shaped mold position detection device 183 for conveying and positioning a sheet-shaped mold M on which a fine transfer pattern M1 is formed. The sheet-shaped mold position dejection device 183 includes a sheet-shaped mold position detector 191 that detects a predetermined region of the sheet-shaped mold M by detecting transmittance of light in the sheet-shaped mold M.

2 Claims, 30 Drawing Sheets

(51) Int. Cl.
    B29C 59/02      (2006.01)
    B29C 59/04      (2006.01)
    B29C 33/30      (2006.01)
    B29C 35/08      (2006.01)
(52) U.S. Cl.
    CPC ............. *B29C 59/02* (2013.01); *B29C 59/04* (2013.01); *B29C 2035/0827* (2013.01); *B29C 2059/023* (2013.01)

(56) References Cited

U.S. PATENT DOCUMENTS

| | | |
|---|---|---|
| 2006/0233906 A1 | 10/2006 | Kokubo |
| 2006/0257514 A1 | 11/2006 | Kokubo |
| 2006/0266734 A1 | 11/2006 | Fujii |
| 2007/0134362 A1 | 6/2007 | Heidari |
| 2008/0028953 A1* | 2/2008 | Ando .................... B29C 43/003 101/32 |
| 2009/0087506 A1* | 4/2009 | Hasegawa ............... B29C 59/04 425/34.2 |
| 2009/0095711 A1* | 4/2009 | Koshiba ................ B29C 43/003 216/52 |
| 2009/0194914 A1 | 8/2009 | Uozu et al. |
| 2009/0273119 A1 | 11/2009 | Imai |
| 2009/0315212 A1 | 12/2009 | Minoura et al. |
| 2010/0089255 A1 | 4/2010 | Shimao |
| 2011/0278772 A1 | 11/2011 | Inamiya et al. |
| 2013/0323347 A1 | 12/2013 | Itani et al. |

FOREIGN PATENT DOCUMENTS

| | | |
|---|---|---|
| JP | 04-010932 | 1/1992 |
| JP | 07-276498 | 10/1995 |
| JP | 2000323461 | * 11/1999 |
| JP | 2002-331580 | 11/2002 |
| JP | 2004-288783 | 10/2004 |
| JP | 2005-297357 | 10/2005 |
| JP | 2006-297716 | 11/2006 |
| JP | 2007-165812 | 6/2007 |
| JP | 2008-041852 | 2/2008 |
| JP | 2008-093987 | 4/2008 |
| JP | 2008-173914 | 7/2008 |
| JP | 2008-213398 | 9/2008 |
| JP | 2009-214323 | 9/2009 |
| JP | 2010-089136 | 4/2010 |
| JP | 2011-020272 | 2/2011 |
| JP | 2011-031547 | 2/2011 |
| TW | 508317 | 11/2002 |
| TW | 2007-06374 | 4/2006 |
| TW | 2007-06375 | 4/2006 |
| TW | M298515 | 10/2006 |
| TW | 200640647 | 12/2006 |
| TW | 200900224 | 1/2009 |

OTHER PUBLICATIONS

Li Nianhua et. al., Sub-20-nm Alignment in Nanoimprint Lithography Using Moire Fringe, 2006, American Chemical Society, vol. 6, No. 11, 2626-2629.*
Ahn S. H. and Guo L. J.,Large-Area Roll-to-Roll and Roll-to-Plate Nanoimprint Lithography:A Step toward High-Throughput Application of Continuous Nanoimprinting, 2009, American Chemical Society, vol. 3, No. 8, 2304-2310.*
Choi et al., "Design of orientation stages for step and flash imprint lithography," Precision Engineering, Journal of International Societies doe Precision Engineering and Nanotechnology, vol. 25, pp. 192-199, 2001.
English Language Abstract of JP 2008-173914 published Jul. 31, 2008.
English Language Translation of JP 2008-173914 published Jul. 31, 2008.
English Language Abstract of JP 07-276498 published Oct. 24, 1995.
English Language Translation of JP 07-276498 published Oct. 24, 1995.
English Language Abstract of JP 2005-297357 published Oct. 27, 2005.
English Language Translation of JP 2005-297357 published Oct. 27, 2005.
English Language Abstract of JP 2002-331580 published Nov. 19, 2002.
English Language Translation of JP 2002-331580 published Nov. 19, 2002.
English Language Abstract of JP 2008-213398 published Aug. 18, 2008.
English Language Translation of JP 2008-213398 published Aug. 18, 2008.
English Language Abstract of JP 04-010932published Jan. 16, 1992.
English Language Abstract of JP 2011-020272 published Feb. 3, 2011.
English Language Translation of JP 2011-020272 published Feb. 3, 2011.
International Search Report issued in PCT/JP2011/054137 mailed May 10, 2011.
International Search Report issued in PCT/JP2011/054141 mailed May 10, 2011.
International Search Report issued in PCT/JP2011/054139 mailed Apr. 12, 2011.
English Language Abstract of JP 2006-297716 published Nov. 2, 2006.
English Language Translation of JP 2006-297716 published Nov. 2, 2006.
English Language Abstract of JP 2008-093987 publishedApr. 24, 2008.
English Language Translation of JP 2008-093987 publishedApr. 24, 2008.
English Language Abstract of JP 2010-089136 publishedApr. 22, 2010.
English Language Translation of JP 2010-089136 publishedApr. 22, 2010.
English Language Abstract of JP 2011-031547 published Feb. 17, 2011.
English Language Translation of JP 2011-031547 published Feb. 17, 2011.
International Search Report issued in PCT/JP2011/054138 on Apr. 12, 2011.
English Language Abstract of JP 2008-041852 published Feb. 21, 2008.
English Language Translation of JP 2008-041852 published Feb. 21, 2008.
English Language Abstract of JP 2007-165812 published Jun. 28, 2007.
English Language Translation of JP 2007-165812 published Jun. 28, 2007.
English Language Abstract of JP 2004-288783 published Oct. 14, 2004.
English Language Translation of JP 2004-288783 published Oct. 14, 2004.
English Language Abstract of JP 2009-214323 published Sep. 24, 2009.
English Language Translation of JP 2009-214323 published Sep. 24, 2009.
Taiwanese Office Action issued in TW 1001107163 on Feb. 18, 2013.
English Language Translation of Taiwanese Office Action issued in TW 1001107163 on Feb. 18, 2013.
English Language Abstract of TW Application No. 2006-0113208 (TW 200706374) filed Apr. 13, 2006.
English Language Abstract of TW Application No. 2006-0115065 (TW 200706375) filed Apr. 27, 2006.
Taiwanese Office Action and Search Report issued in TW 100107162 on Feb. 20, 2013.
English Language Translation of Taiwanese Office Action and Search Report issued in TW 100107162 on Feb. 20, 2013.

(56) References Cited

OTHER PUBLICATIONS

English Language Abstract of TW 200640647 published Dec. 1, 2006.
English Language Abstract of CN 101118380 published Feb. 6, 2008.
English Language Abstract of CN 1979336 published Jun. 13, 2007.
Taiwanese Office Action issued in TW 100106414 on Sep. 5, 2013.
English Language Translation of Taiwanese Office Action issued in TW 100106414 on Sep. 5, 2013.
English Language Abstract of TW M298515 published on Oct. 1, 2006.
English Language Abstract of TW 508317 published on Nov. 1, 2002.
Taiwanese Office Action issued in TW 100107164 on Sep. 14, 2013.
English Language Translation of Taiwanese Office Action issued in TW 100107164 on Sep. 14, 2013.
English Language Abstract of TW 200900224 published Jan. 1, 2009.
Korean Office Action issued in KR 10-2012-7026142 on Nov. 4, 2013.
English Language Translation of Korean Office Action issued in KR 10-2012-7026142 on Nov. 4, 2013.
Related U.S. Appl. No. 13/581,266.
Related U.S. Appl. No. 13/635,656.
Related U.S. Appl. No. 13/635,658.

\* cited by examiner

FIG.9
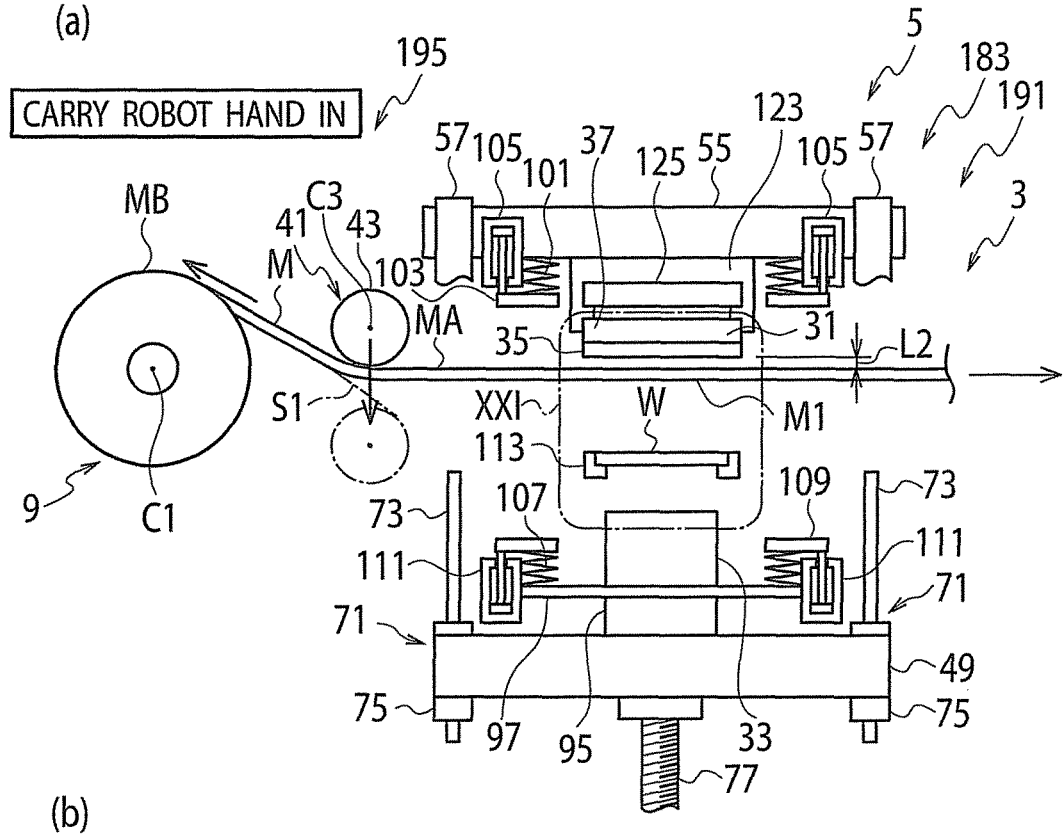
(a) CARRY ROBOT HAND IN
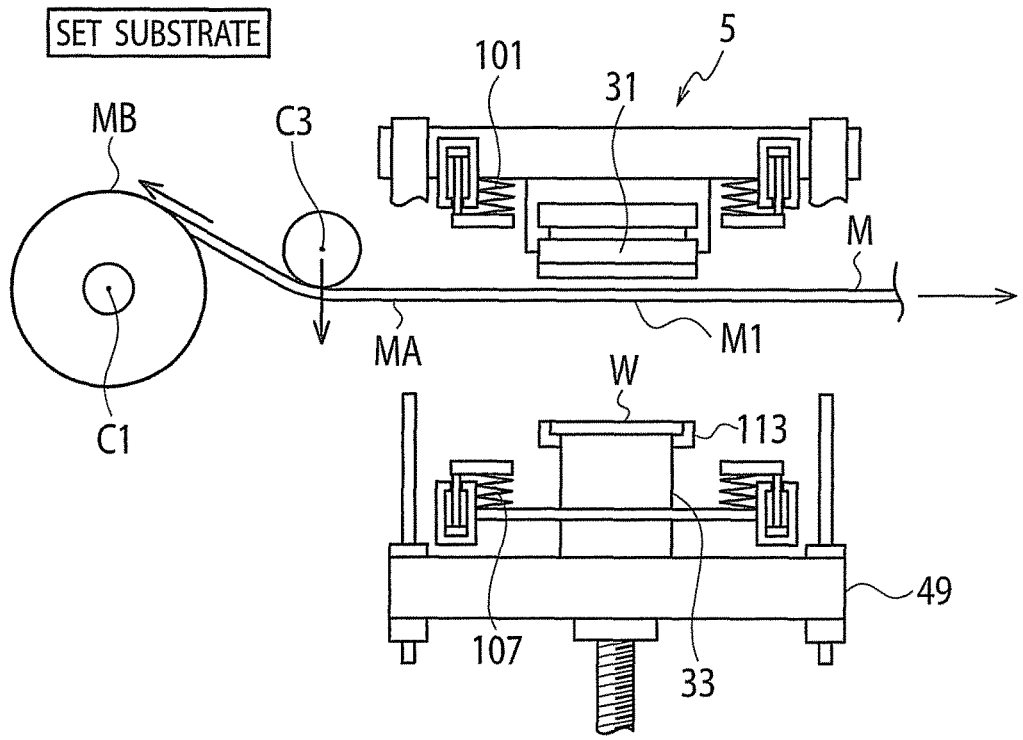
(b) SET SUBSTRATE

FIG. 10
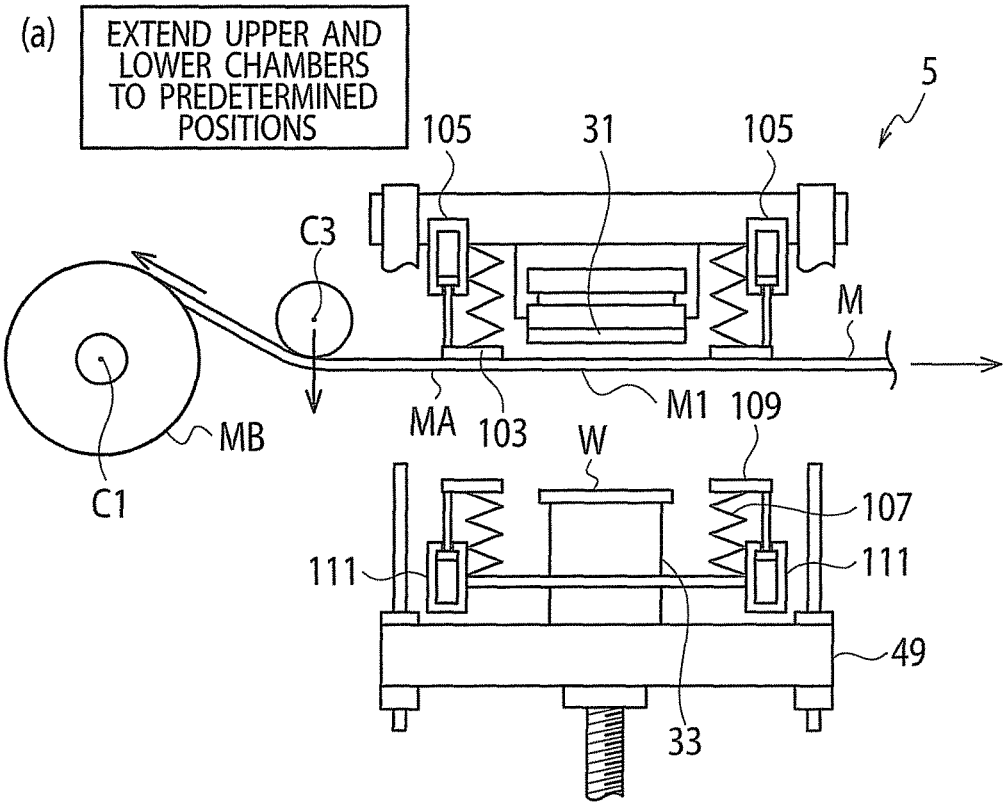
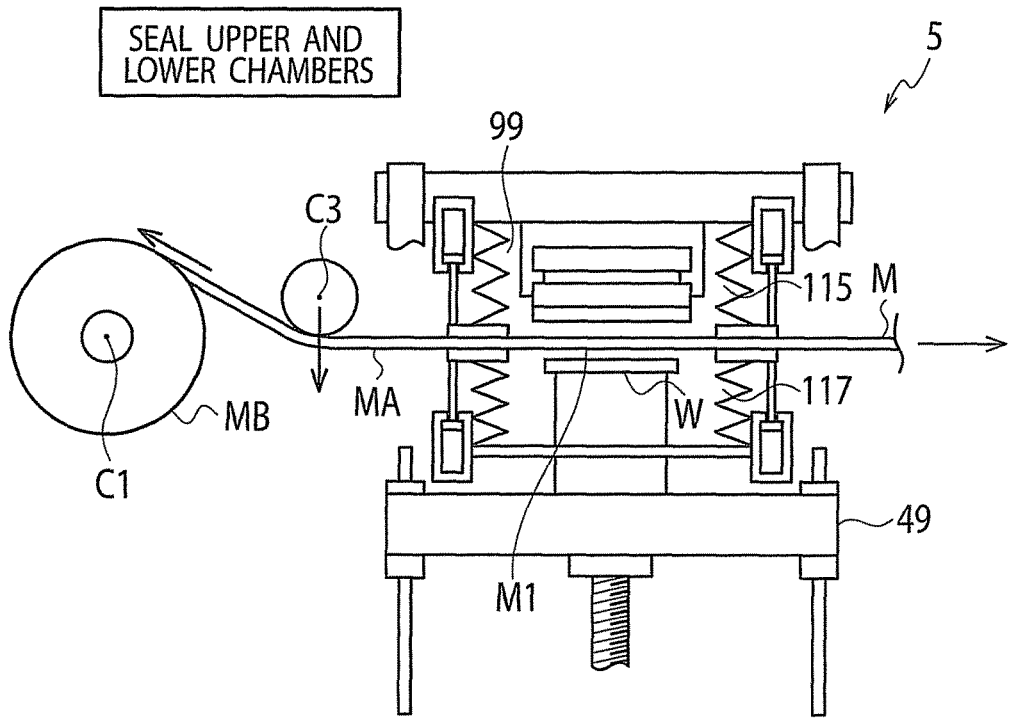

FIG. 11
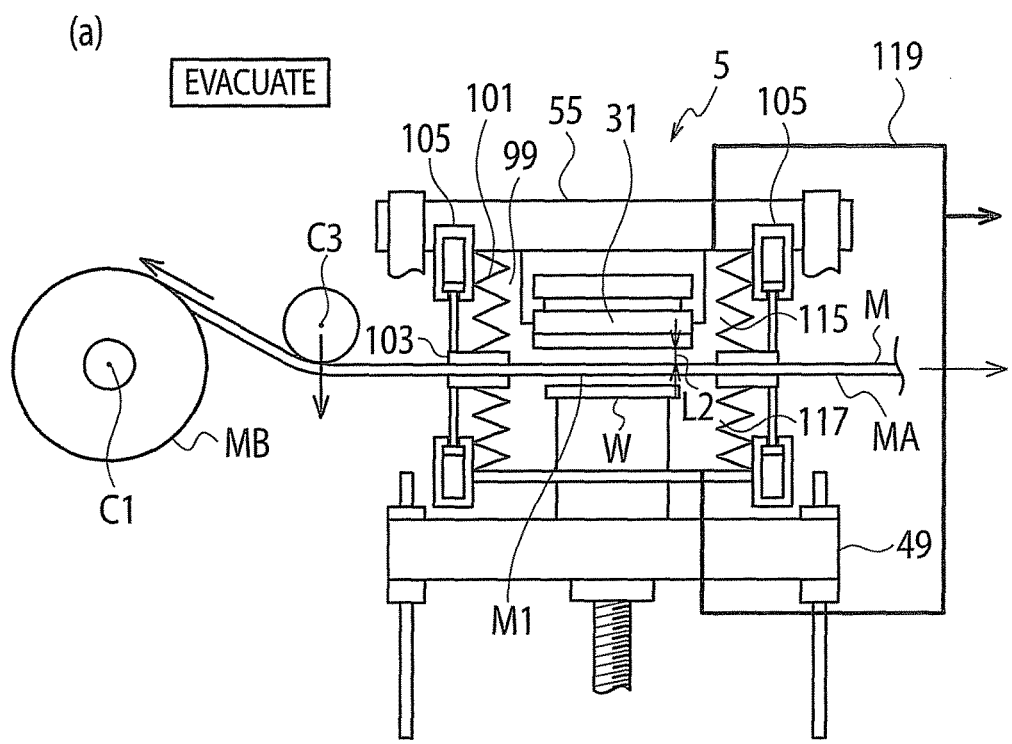
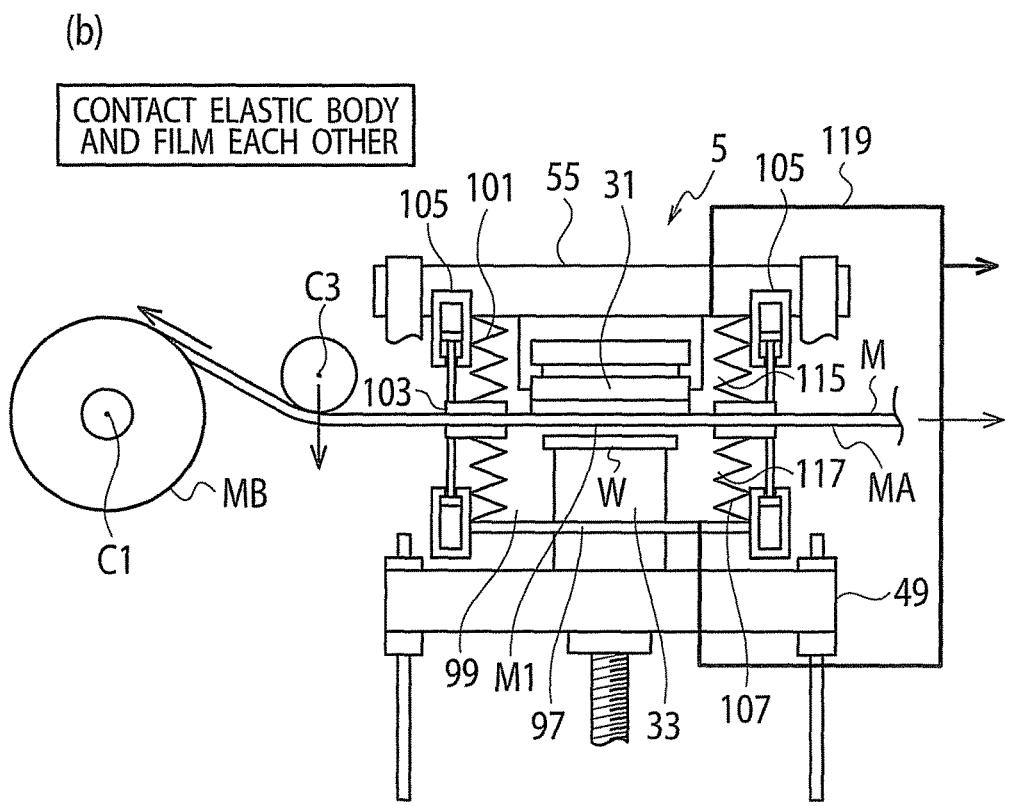

FIG. 12
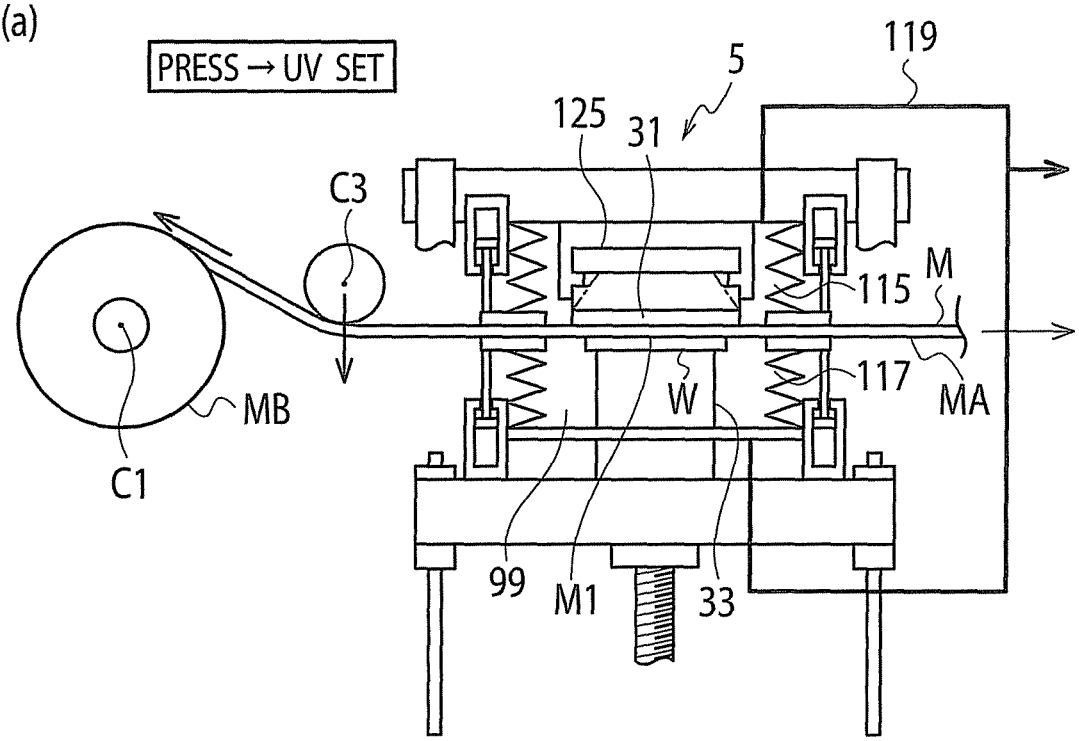
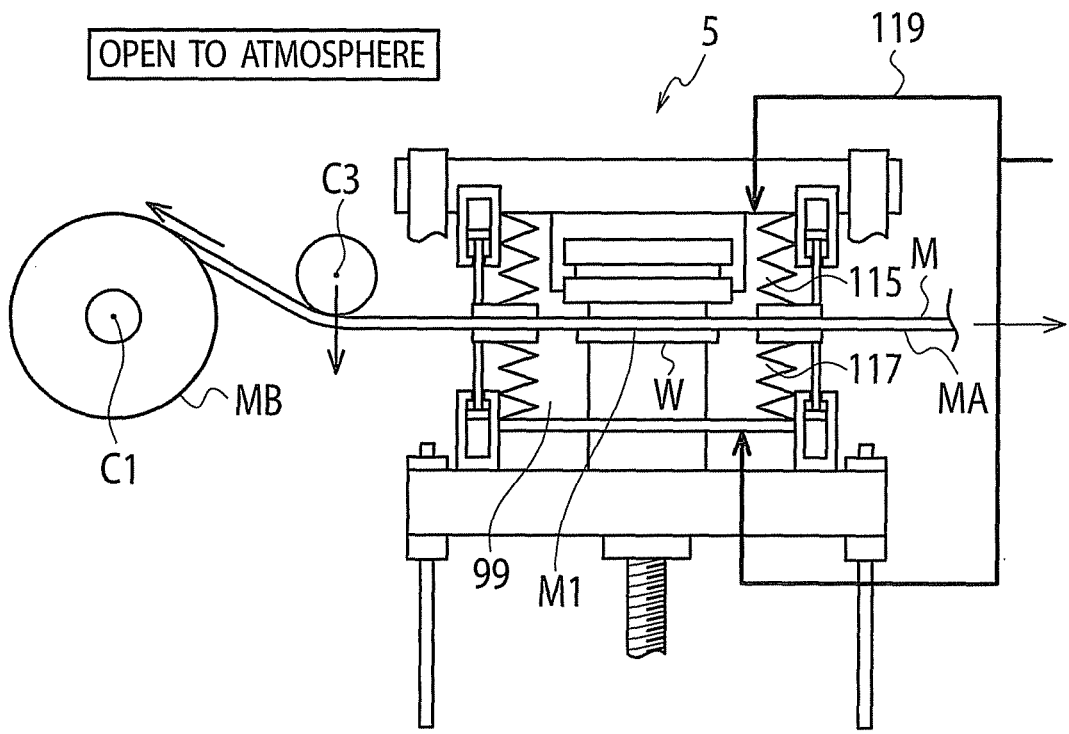

FIG. 13
(a)
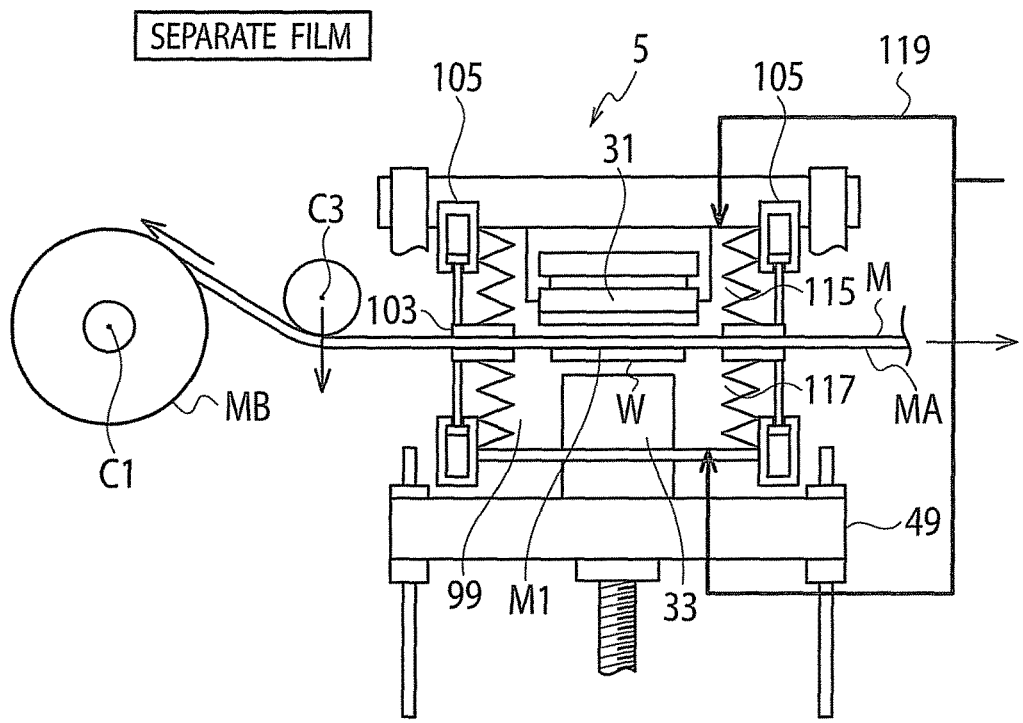
(b)
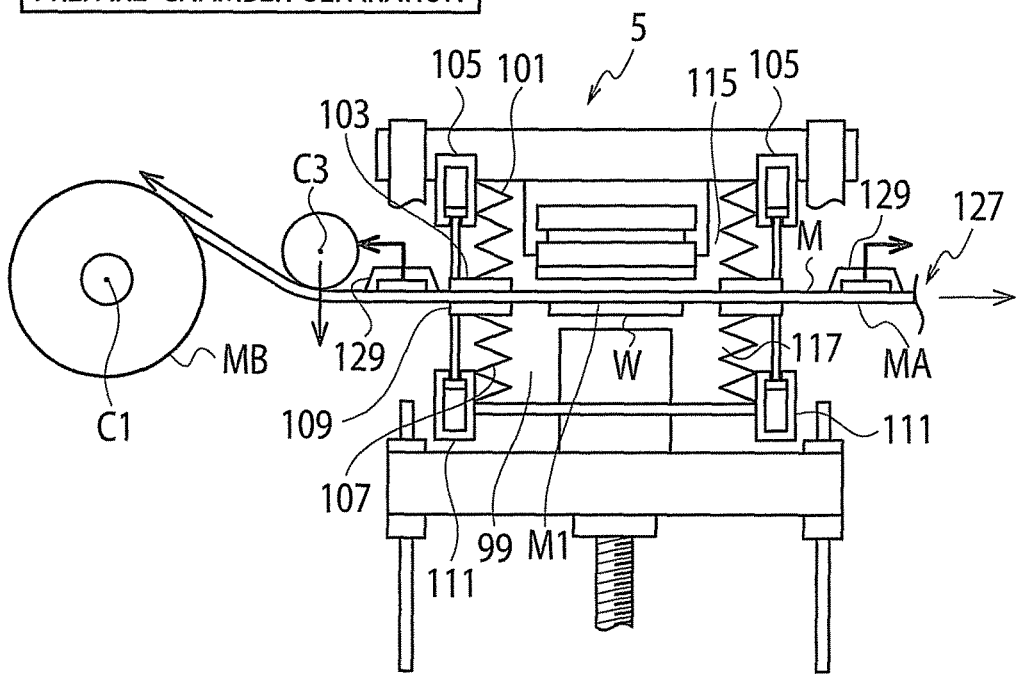

FIG. 14
(a) SEPARATE CHAMBER
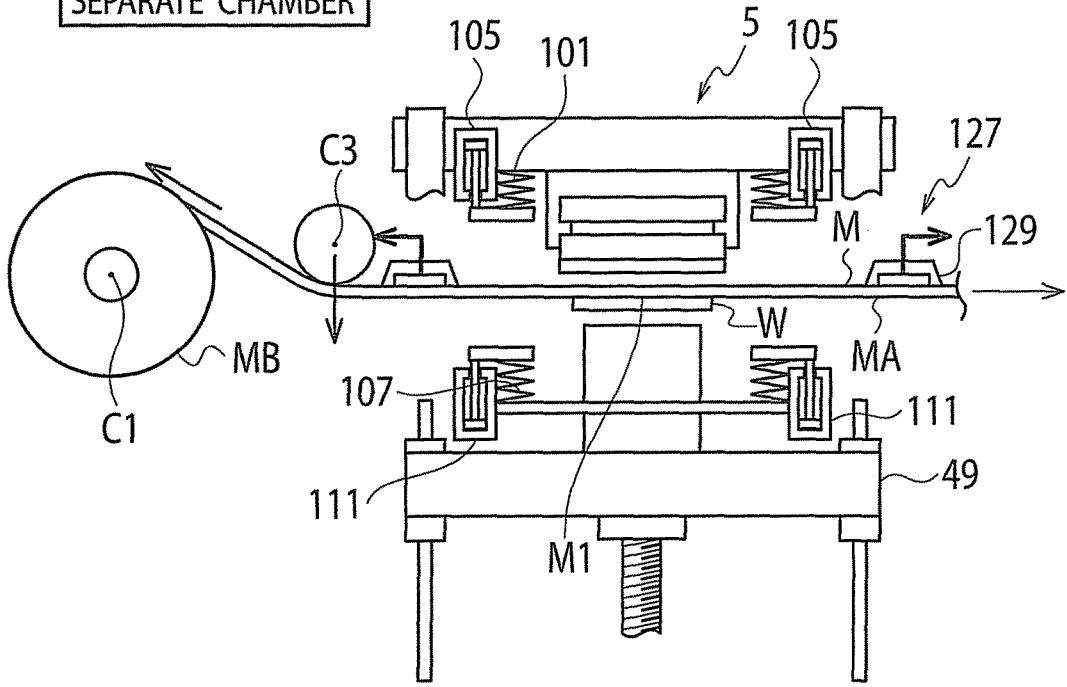
(b) RETREAT MOVING DIE
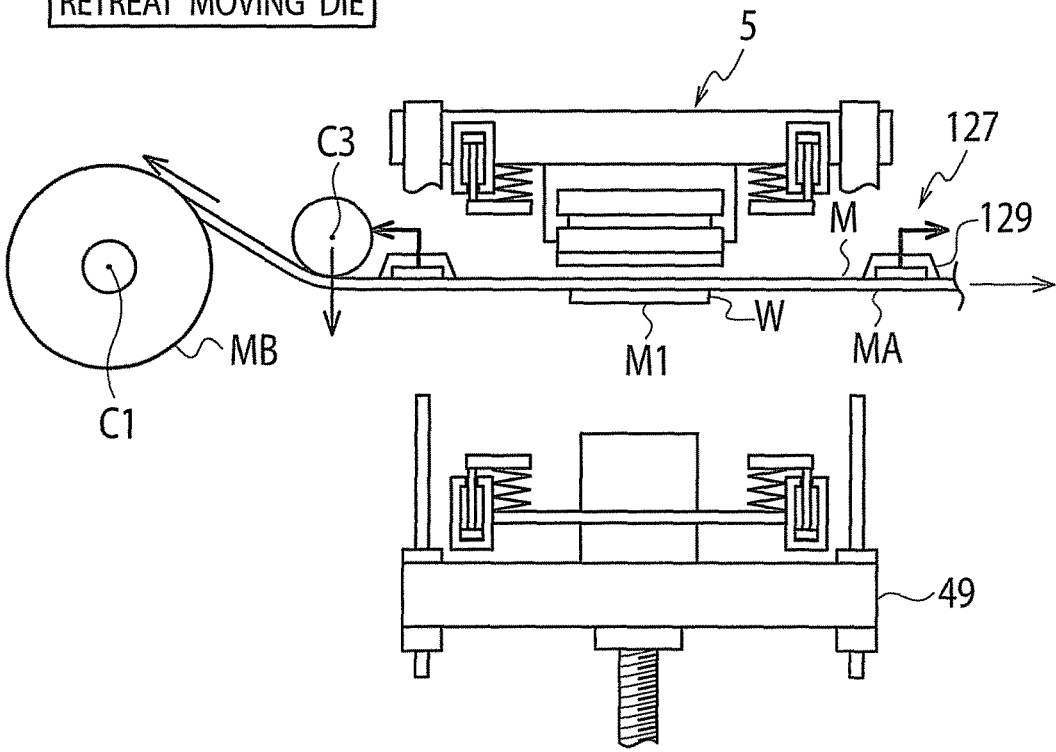

FIG. 16
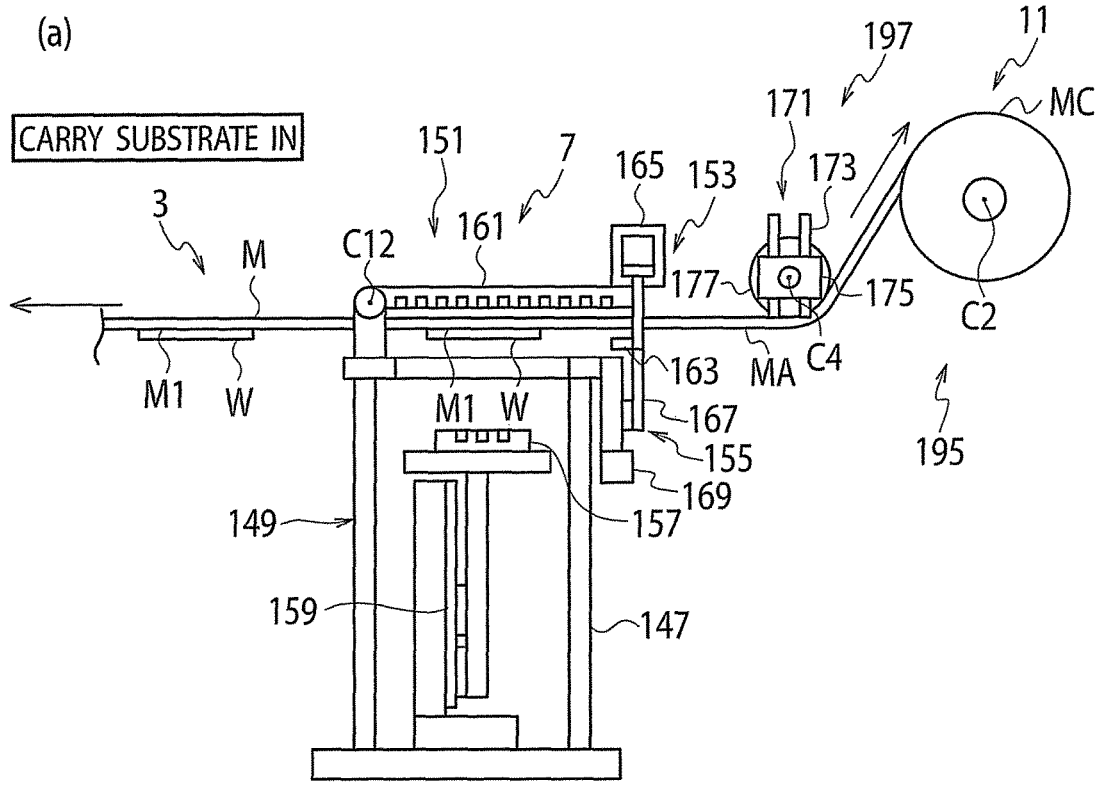
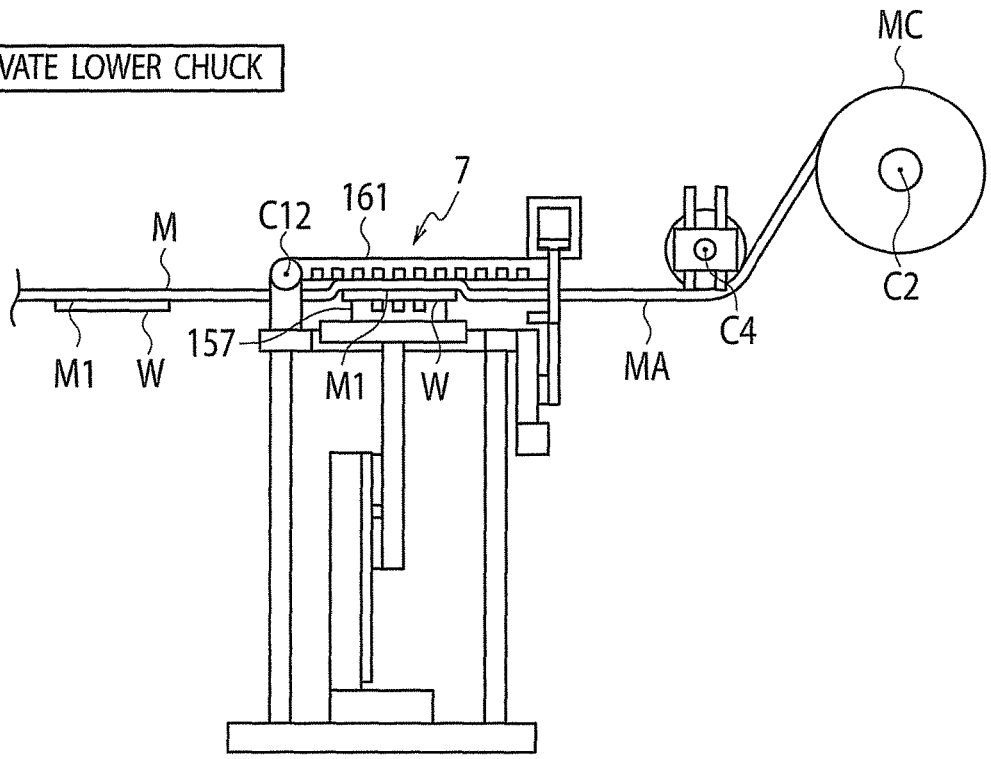

FIG. 17
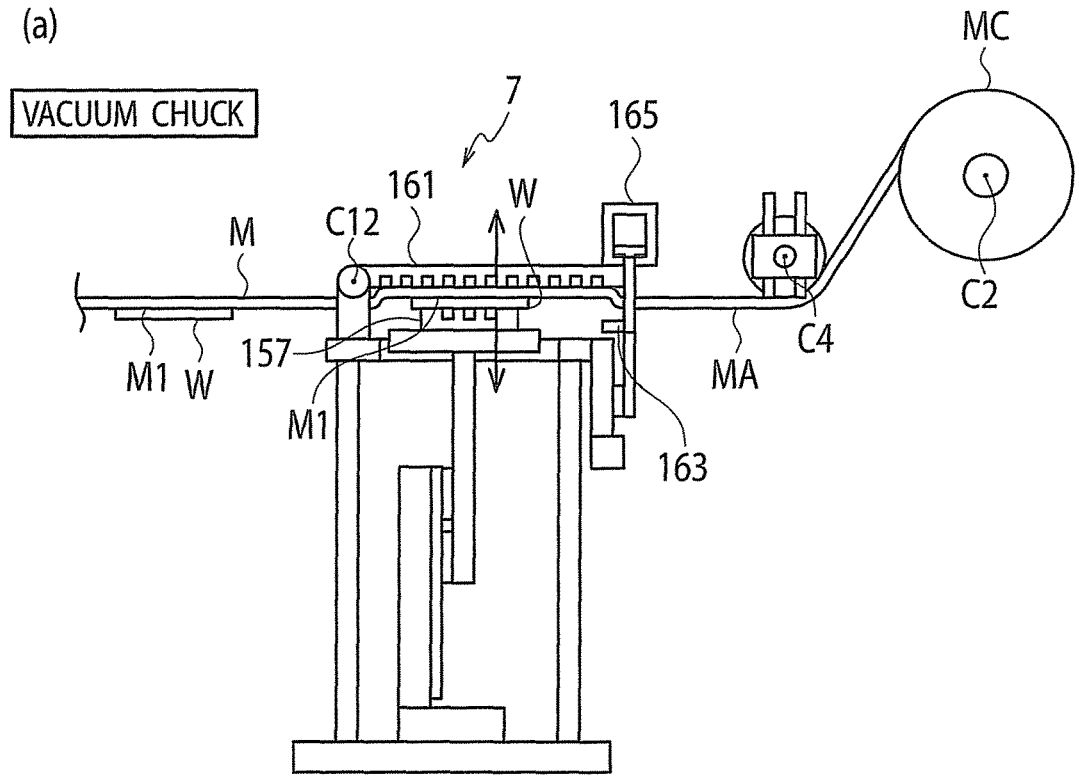
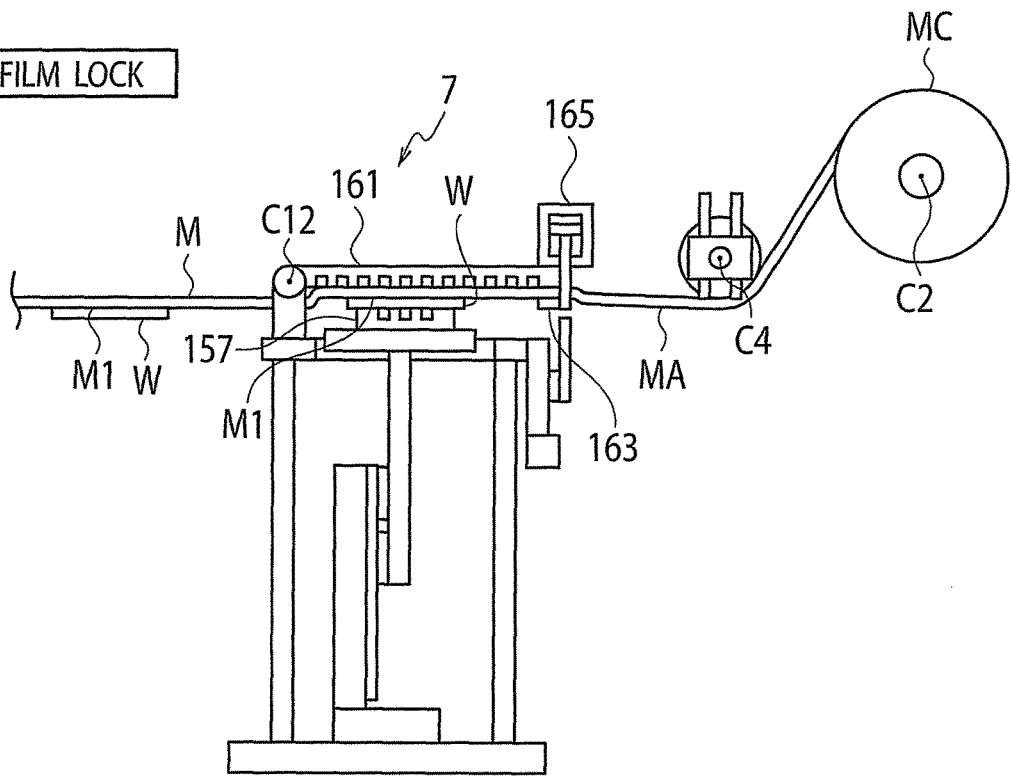

FIG. 18
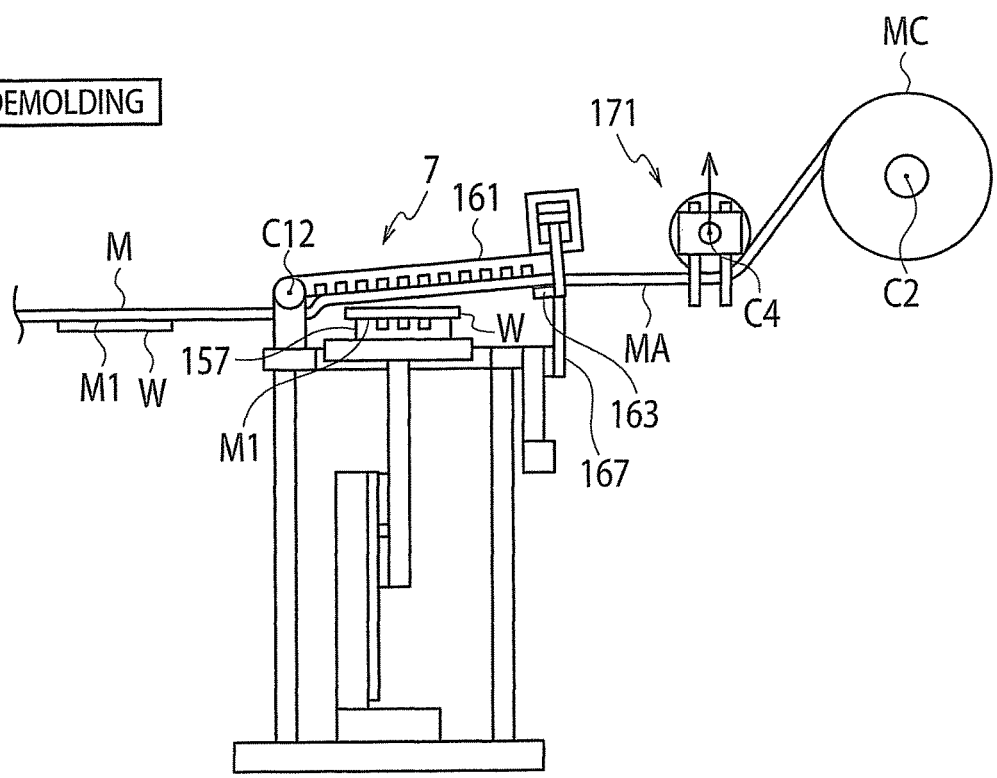
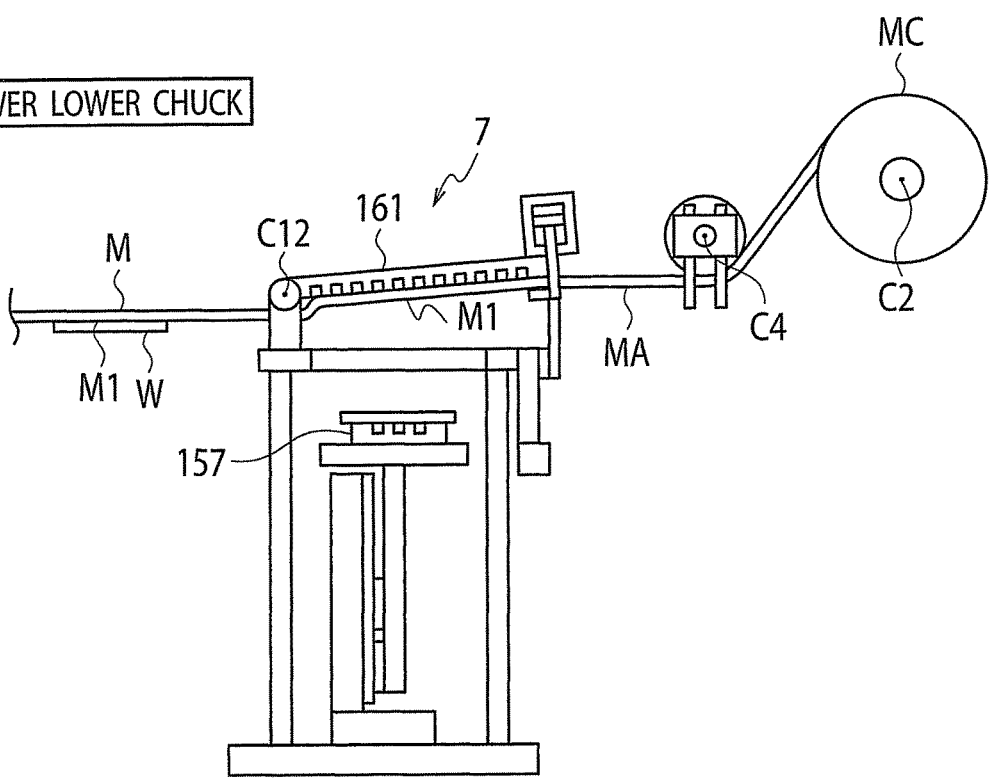

FIG. 19
(a)
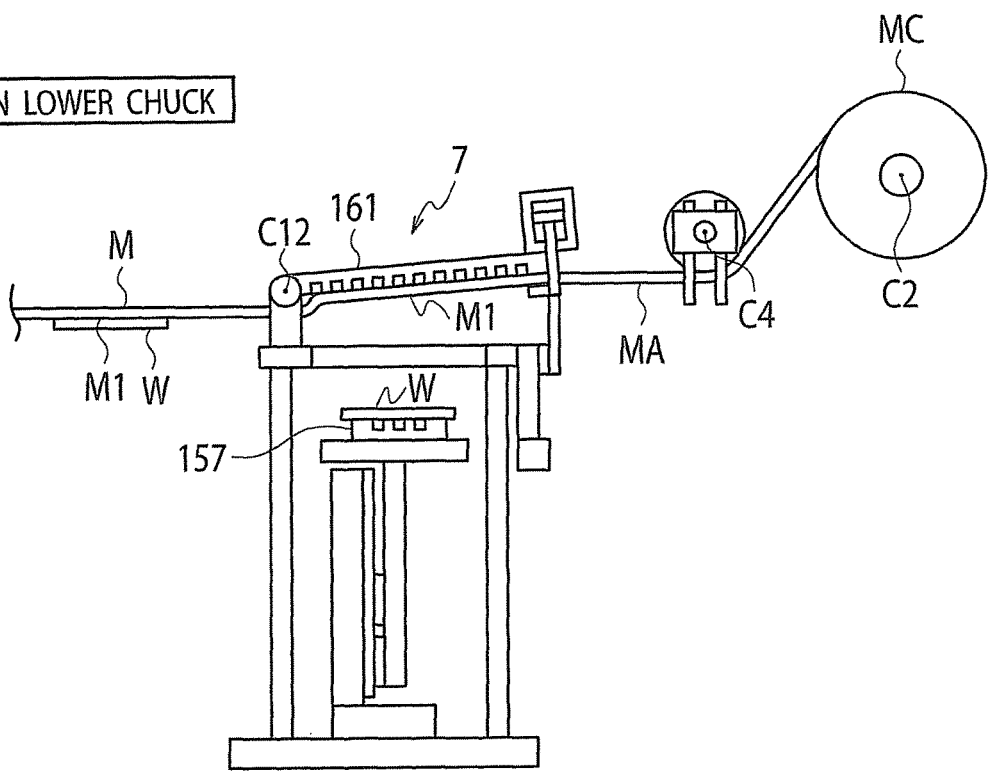
(b)
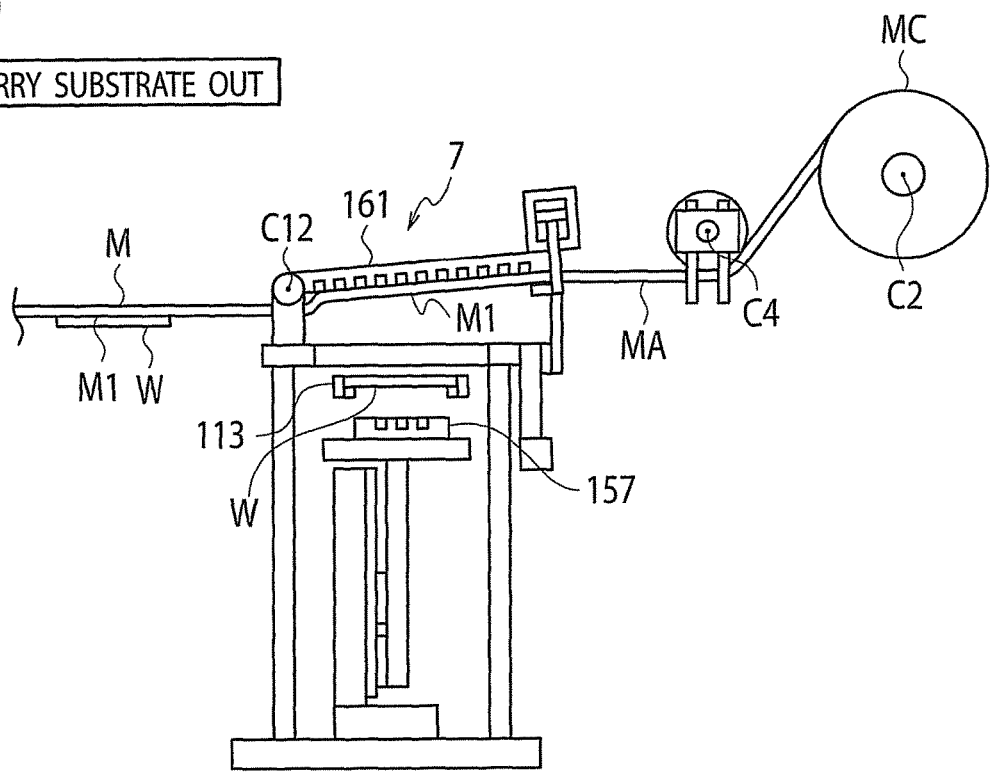

FIG. 20
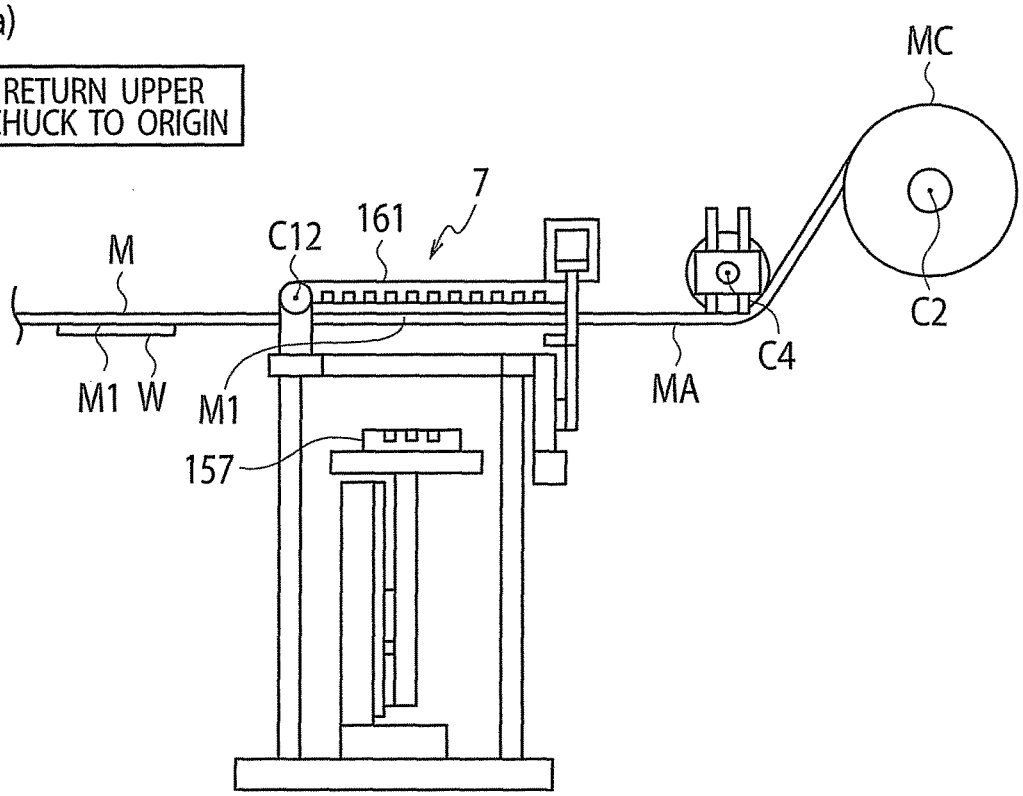
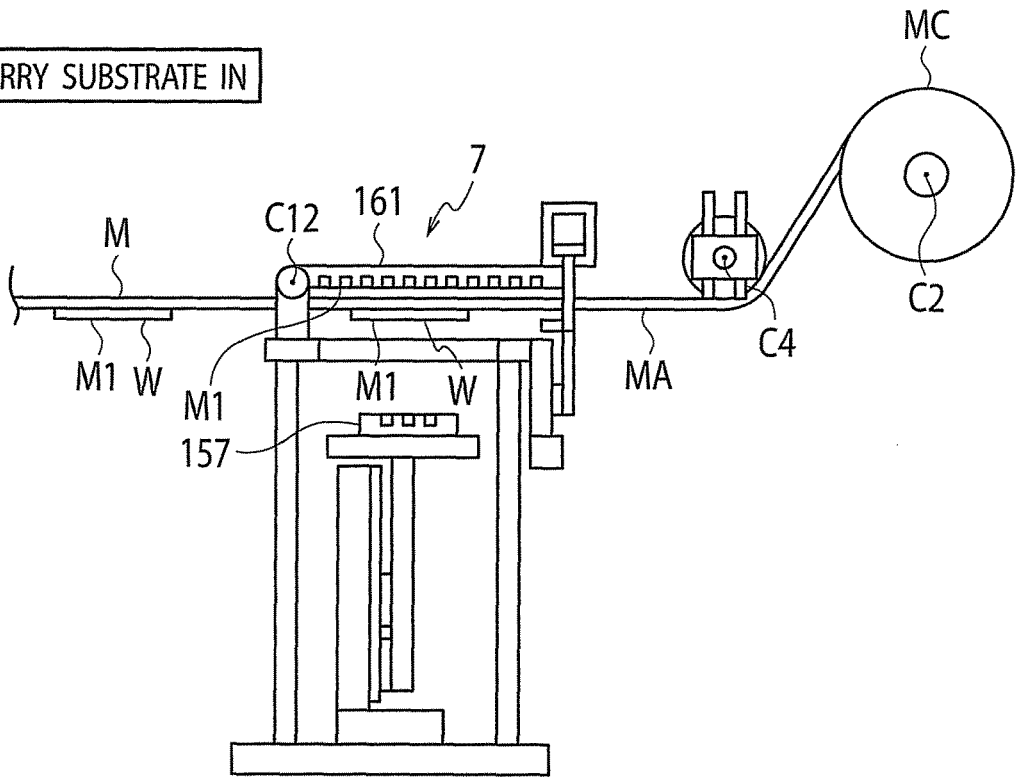

FIG. 26
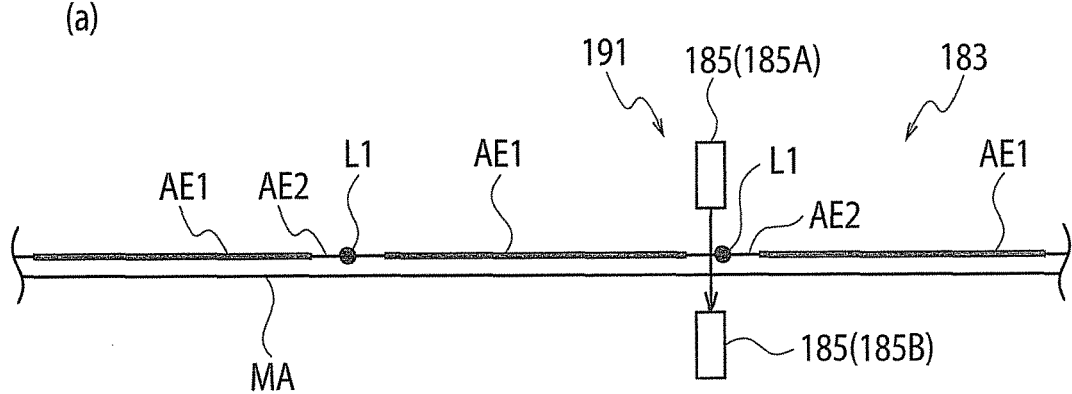
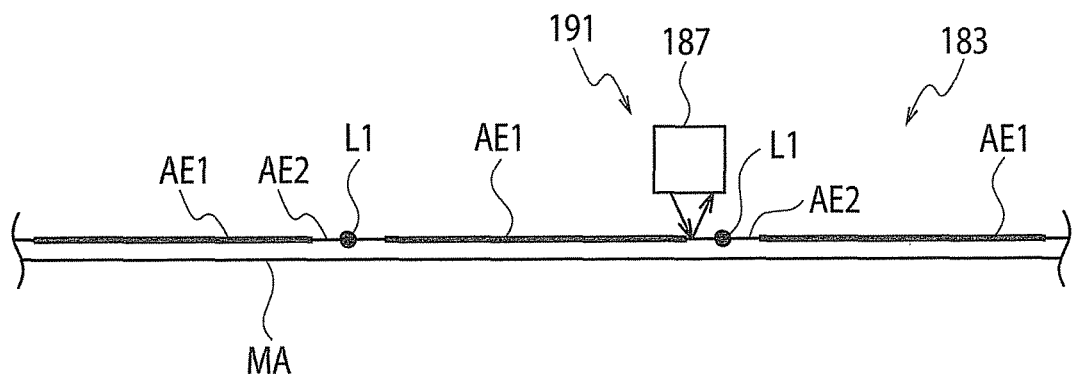
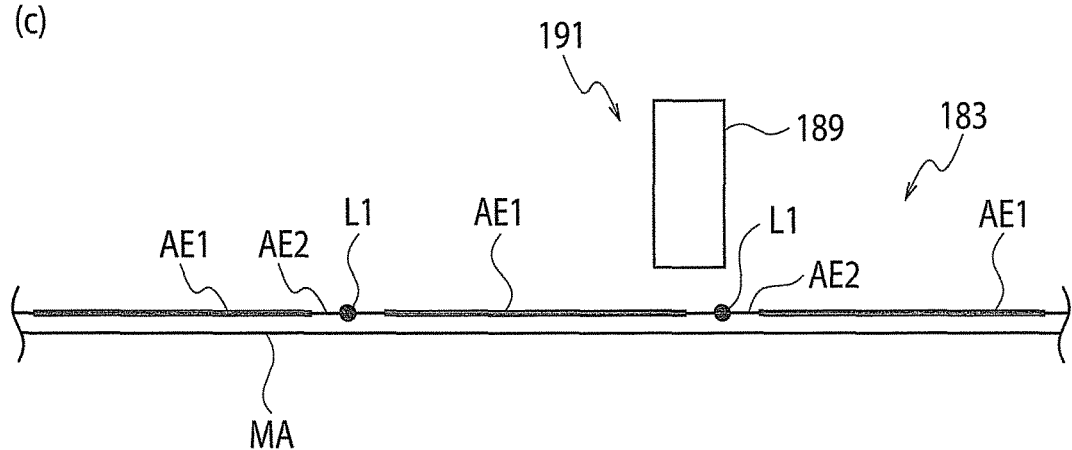

FIG. 27
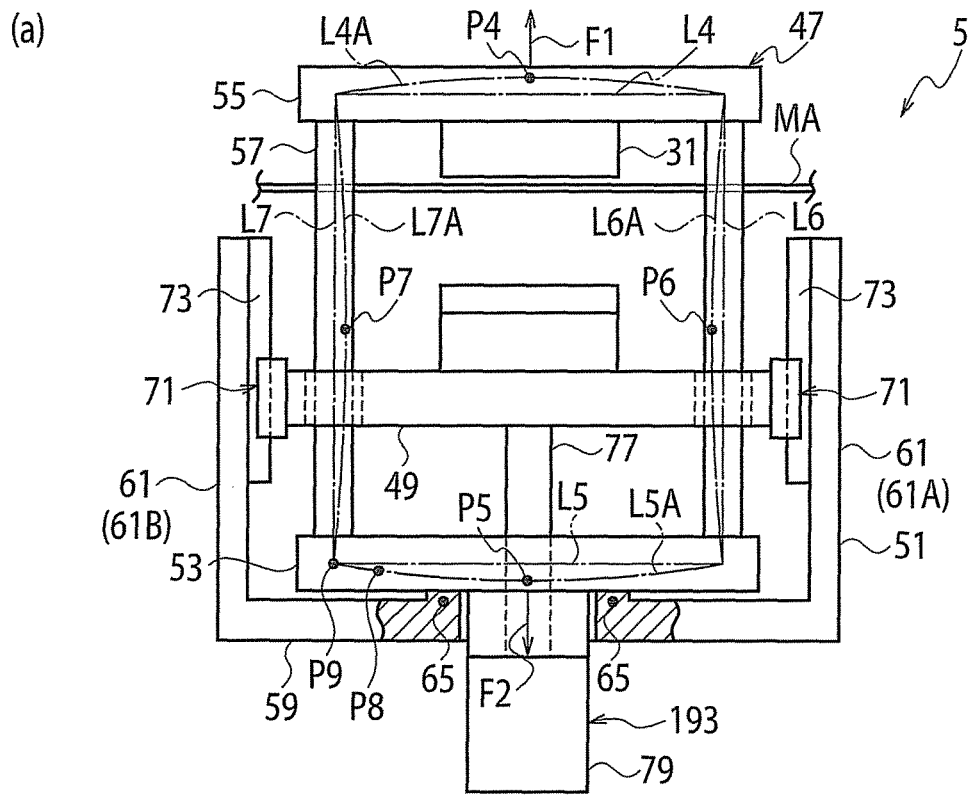
(a)
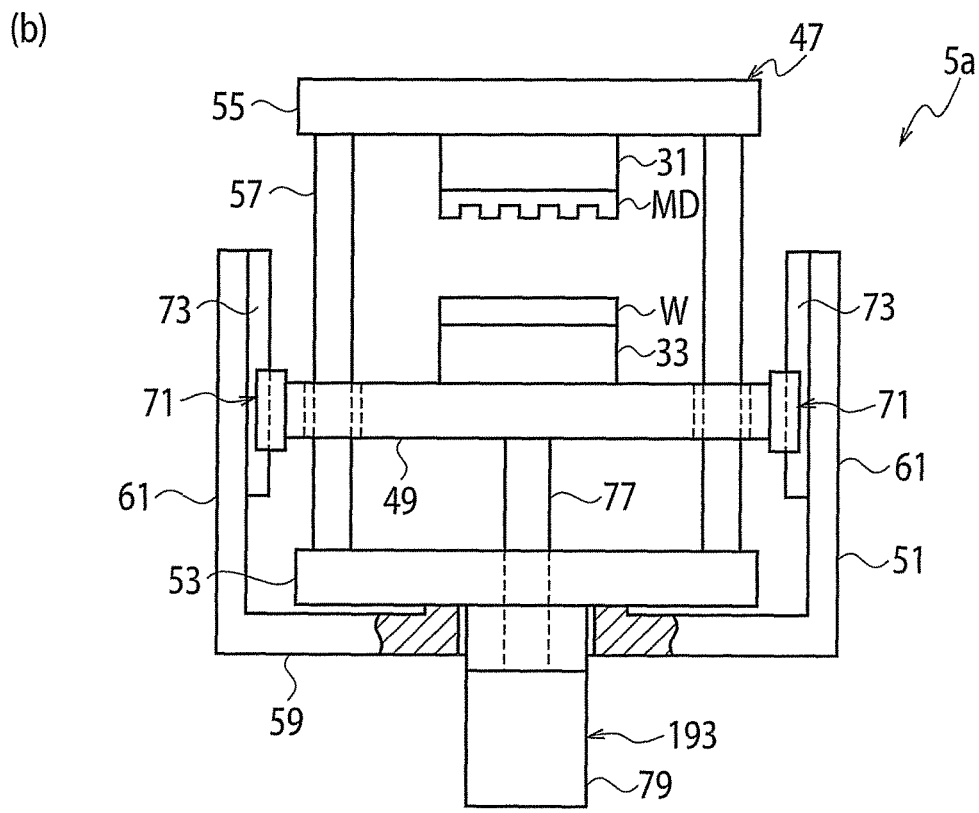
(b)

FIG. 29
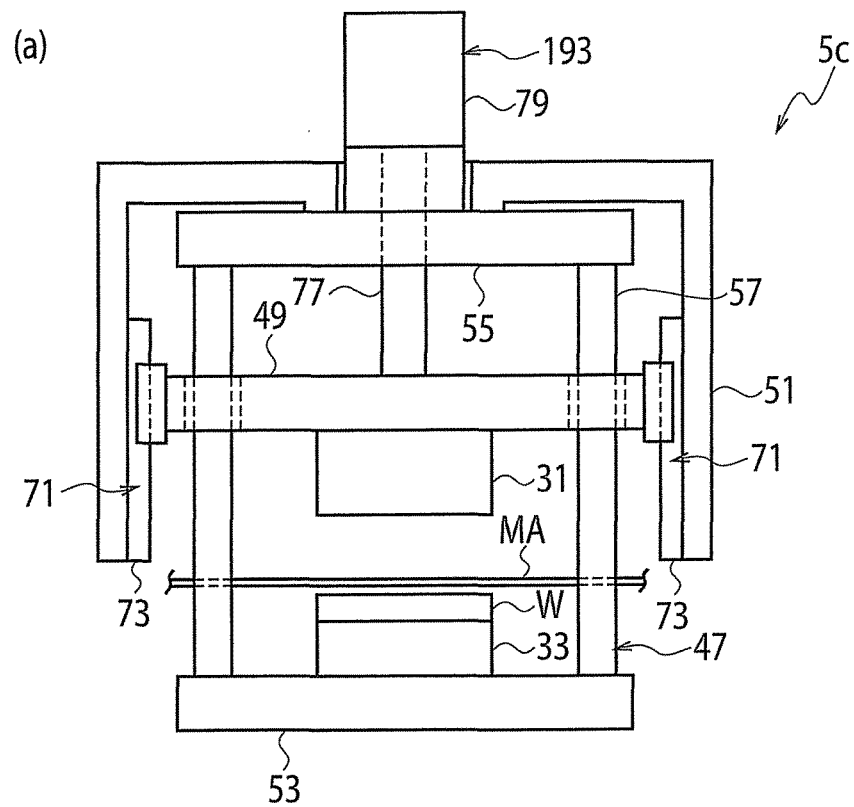
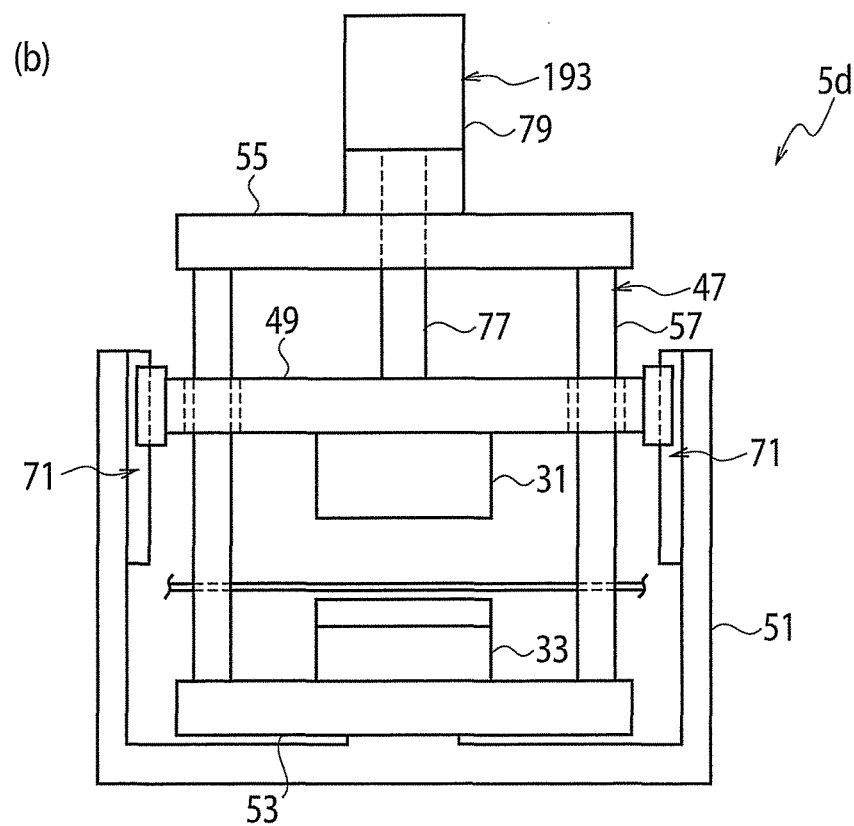

FIG. 30
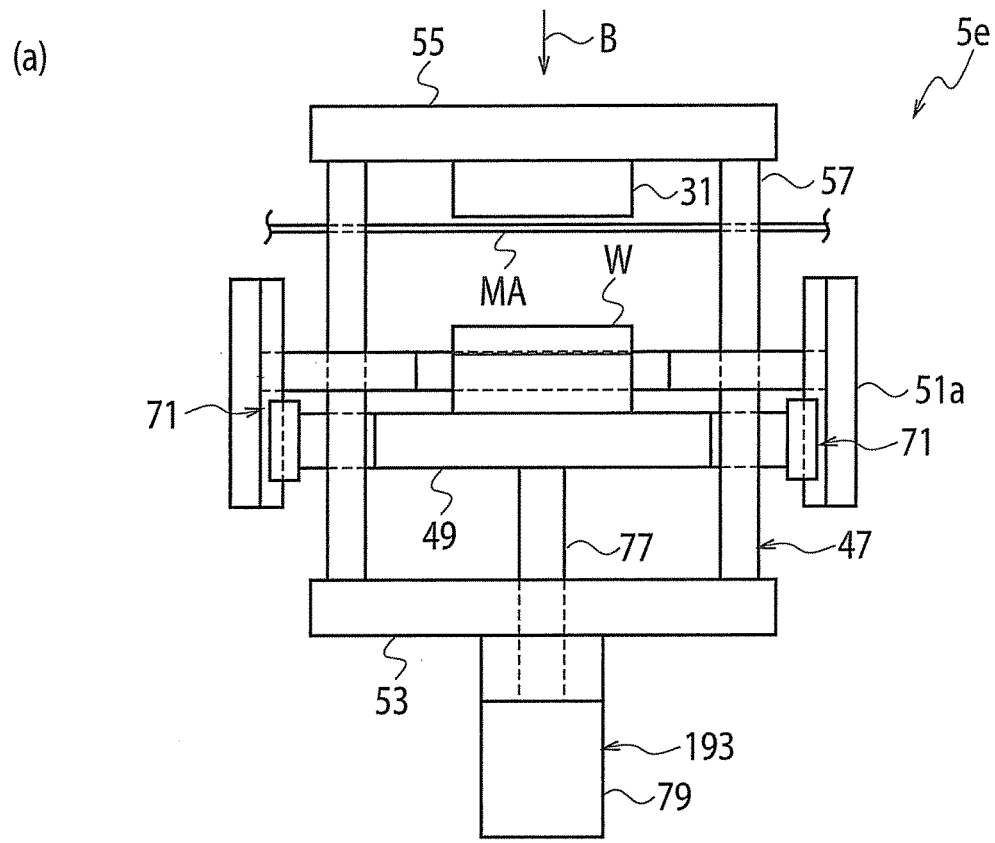
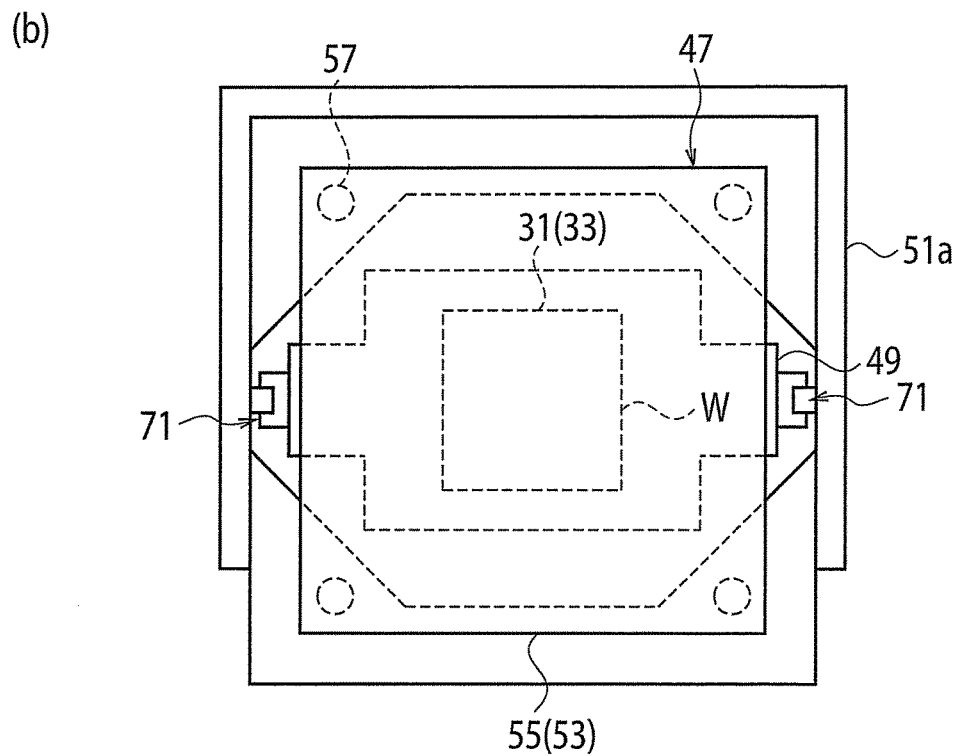

FIG. 31
(a)
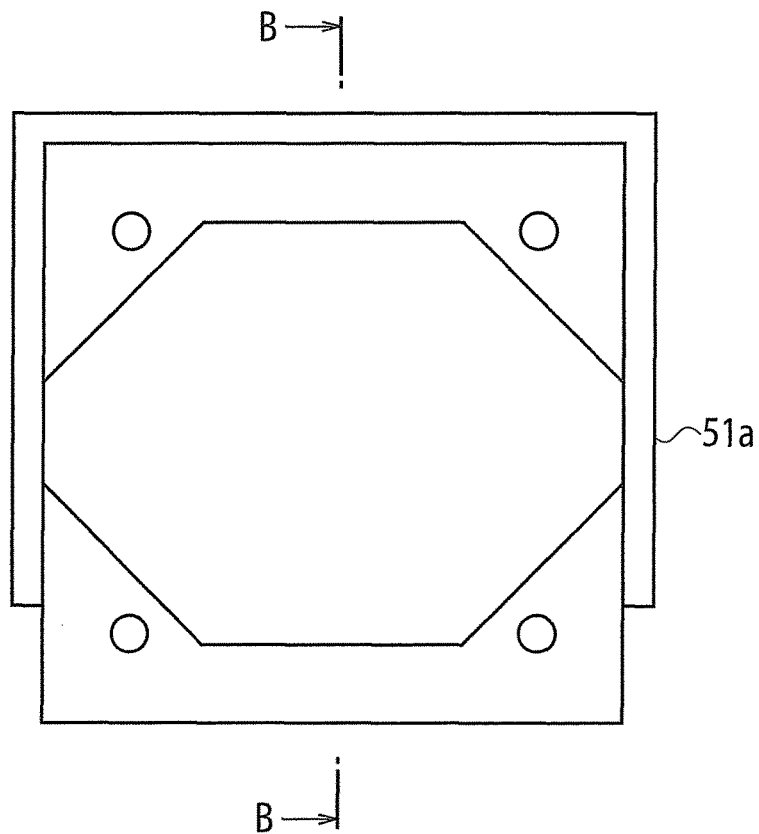
(b)
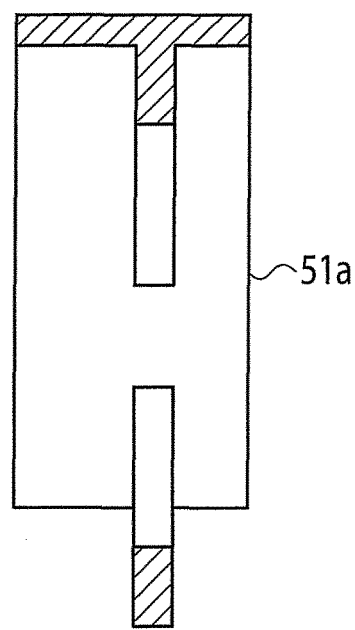

SHEET-SHAPED MOLD POSITION DETECTION DEVICE, TRANSFER DEVICE AND TRANSFER METHOD

TECHNICAL FIELD

The present invention relates to a sheet-shaped mold position detection device, a transfer device using this device, and a transfer method using this device. The present invention relates to those for use at the time of transferring a fine transfer pattern formed on a sheet-shaped mold to a molding target, for example.

BACKGROUND ART

In recent years, a nano-imprint technology has been researched and developed. In this technology, a hyperfine transfer pattern is formed on a quartz substrate or the like by an electron beam lithography and the like, whereby a mold is fabricated, then the mold is pressed against a molding target with a predetermined pressure, and the transfer pattern formed on the mold concerned is transferred thereto (for example, refer to Non-Patent Literature 1)

As a method of molding a nano-order fine pattern (transfer pattern) at low cost, an imprint method using a lithography has been devised. This molding method is broadly classified into a thermal imprint method and a UV imprint method.

In the thermal imprint method, a mold is pressed against a substrate, and is heated up to a temperature at which resin (thermoplastic resin) made of a thermoplastic polymer becomes sufficiently capable of flowing, whereby the resin is flown into the fine pattern, thereafter, the mold and the resin are cooled down to a glass transition temperature or less, then the fine pattern transferred to the substrate is cured, and thereafter, the mold is separated from the substrate.

In the UV imprint method, a transparent mold capable of transmitting light therethrough is used. The mold is pressed against a UV curable liquid, and UV radiation light is applied thereto. The radiation light is applied for an appropriate time, whereby the liquid is cured, and the fine pattern is transferred to the substrate, and thereafter, the mold is separated therefrom.

Moreover, there has been proposed a method using a sheet-shaped mold when the above-described transfer is performed (for example, refer to Patent Literature 1).

CITATION LIST

Patent Literature

JP 2011-20272 A.

Non Patent Literature

Precision Engineering Journal of the International Societies for Precision Engineering and Nanotechnology 25(2001) 192-199.

SUMMARY OF INVENTION

Technical Problem

Incidentally, in the above-described conventional transfer device using the sheet-shaped mold, it is necessary to position the sheet-shaped mold with respect to the molding target before transferring the fine transfer pattern of the sheet-shaped mold to the molding target.

Accordingly, in the conventional transfer device, the positioning of the sheet-shaped mold is visually performed, or alternatively, a radius of mold whole cloth around which the sheet-shaped mold is wound is detected, and in addition, a rotation angle of the mold whole cloth is detected, whereby the positioning of the sheet-shaped mold is performed.

However, in the above-described positioning method, there is a problem that it is difficult to accurately position the sheet-shaped mold.

The present invention has been made in consideration of the above-described problem. It is an object of the present invention to provide a sheet-shaped mold position detection device capable of accurately detecting the sheet-shaped mold at the time of conveying and positioning the sheet-shaped mold on which the fine transfer pattern is formed, a transfer device using the sheet-shaped mold position detection device, and a transfer method.

Solution to Problem

A first aspect of the present invention is a sheet-shaped mold position detection device for conveying and positioning a sheet-shaped mold on which a fine transfer pattern is formed. The sheet-shaped mold position detection device comprises: a sheet-shaped mold position detector configured to detect a predetermined region of the sheet-shaped mold by detecting at least any of transmittance of light in the sheet-shaped mold, reflectance of light in the sheet-shaped mold, and a mark formed in advance on the sheet-shaped mold.

In the sheet-shaped mold, there preferably exist a transfer pattern forming area on which the fine transfer pattern is formed, and a transfer pattern non-forming area on which the fine transfer pattern is not formed. It is preferable that the sheet-shaped mold position detector detects the predetermined region of the sheet-shaped mold by detecting a difference in the transmittance of the light or a difference in the reflectance of the light between the transfer pattern forming are and the transfer pattern non-forming area.

It is preferable that the sheet-shaped mold position detector detects the predetermined region of the sheet-shaped mold by detecting an edge line created at a time of forming the fine transfer pattern on the sheet-shaped mold.

It is preferable that the mark is a mark formed at a time of forming the fine transfer pattern on a sheet-shaped raw material, and that the sheet-shaped mold position detection device detects the predetermined region of the sheet-shaped mold by detecting the mark.

A second aspect of the present invention is a transfer device configured to transfer the fine transfer pattern to the molding target from the sheet-shaped mold positioned by using the sheet-shaped mold position detection device as described above.

A third aspect of the present invention is a transfer method comprising: a positioning step of positioning the sheet-shaped mold by using sheet-shaped mold position detection device as described above; and a transfer step of transferring the fine transfer pattern to the molding target from the sheet-shaped mold positioned in the positioning step.

Advantageous Effects of Invention

In accordance with the present invention, in the transfer system that transfers the fine transfer pattern formed on the sheet-shaped mold to the molding target, the transfer can be performed efficiently.

BRIEF DESCRIPTION OF DRAWINGS

FIGS. 4(a) and 4(b) are views showing size and position relationships between a flat sheet-shaped mold and respective contact members and the like.

FIGS. 5(a) and 5(b) are views showing size and position relationships between the flat sheet-shaped mold and the respective contact members and the like.

FIGS. 9(a) and 9(b) are views showing an outline and operation of the transfer device.

FIGS. 10(a) and 10(b) are views showing the outline and operation of the transfer device.

FIGS. 11(a) and 11(b) are views showing the outline and operation of the transfer device.

FIGS. 12(a) and 12(b) are views showing the outline and operation of the transfer device.

FIGS. 13(a) and 13(b) are views showing the outline and operation of the transfer device.

FIGS. 14(a) and 14(b) are views showing the outline and operation of the transfer device.

FIGS. 16(a) and 16(b) are views showing an outline and operation of a peeling device.

FIGS. 17(a) and 17(b) are views showing the outline and operation of the peeling device.

FIGS. 18(a) and 18(b) are views showing the outline and operation of the peeling device.

FIGS. 19(a) and 19(b) are view 6 showing the outline and operation of the peeling device.

FIGS. 20(a) and 20(b) are views showing the outline and operation of the peeling device.

FIGS. 26(a) to 26(c) are views showing a XXVI-XXXVI cross section in FIG. 24(a).

FIGS. 27(a) and 27(b) are a schematic view of the transfer device, and a schematic view of a transfer device according to the modification example, respectively.

FIGS. 29(a) and 29(b) are schematic views of the transfer device according to the modification example.

FIGS. 30(a) and 30(b) are schematic views of the transfer device according to the modification example.

FIGS. 31(a) and 31(b) are views showing a moving body supporting body for use in the transfer device according to the modification example.

DESCRIPTION OF EMBODIMENTS

Figure 1:
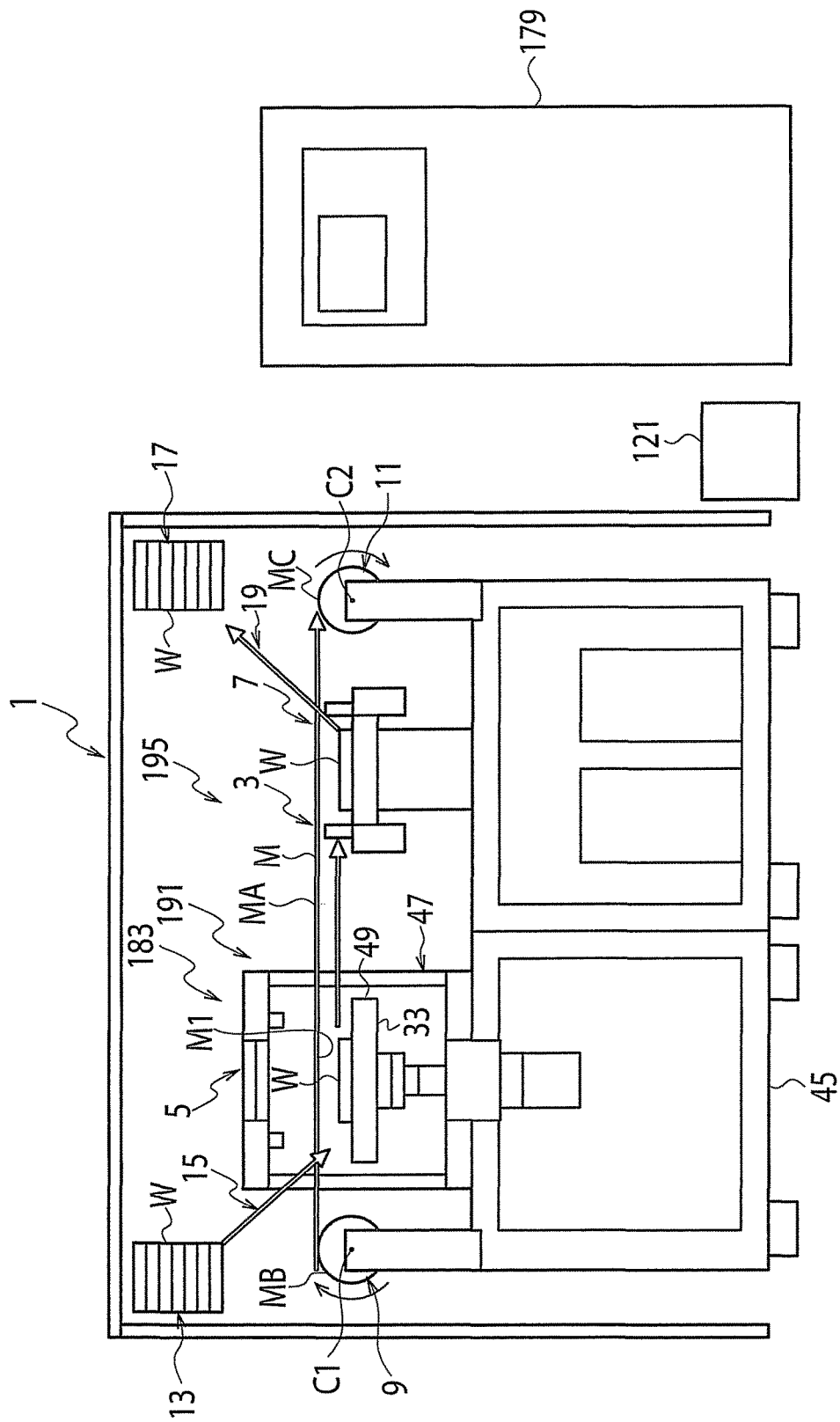
FIG. 1 is a view showing an outline of a transfer system according to an embodiment of the present invention.
Figure 2:
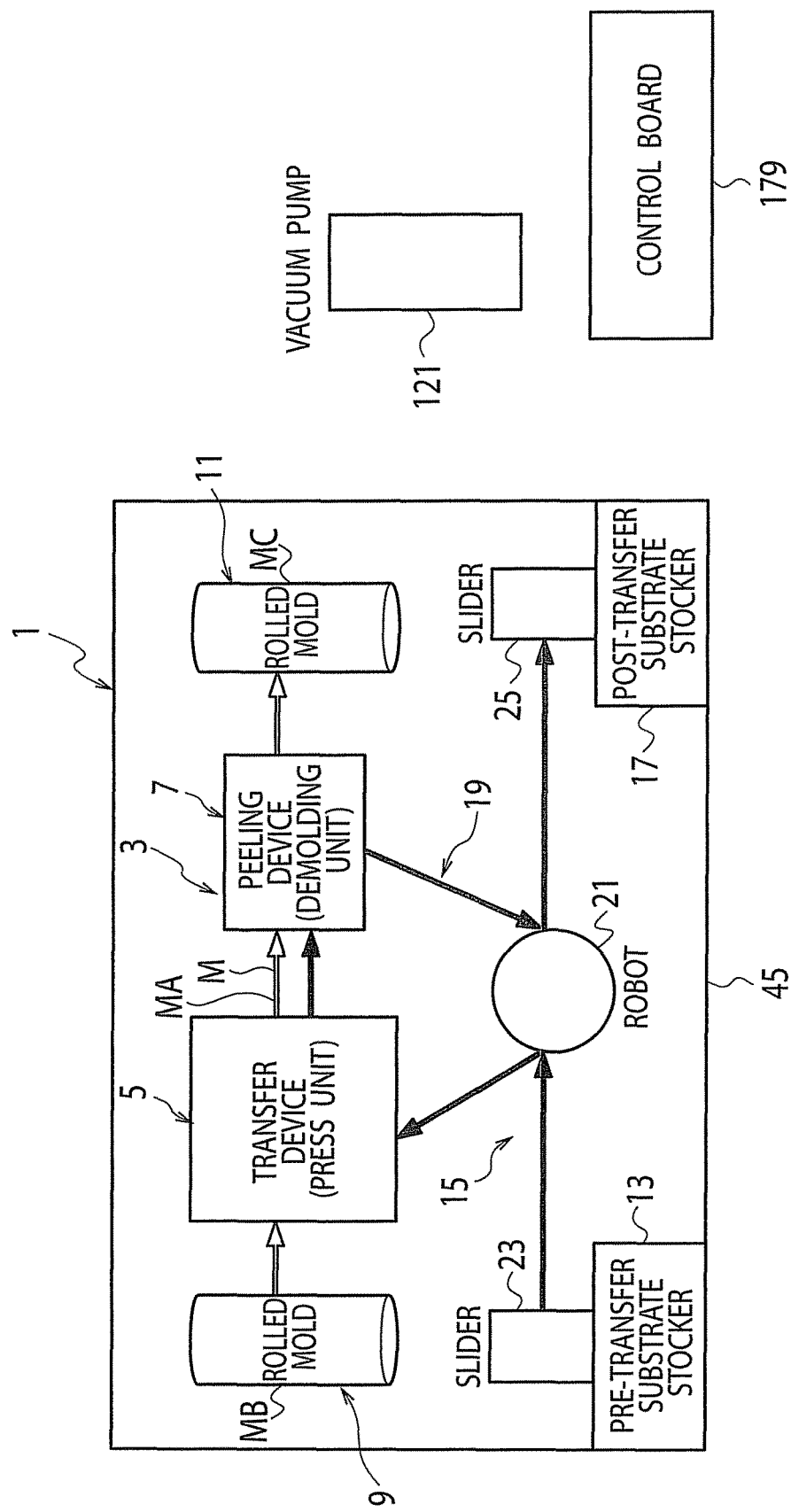
FIG. 2 is a plan view showing the outline of the transfer system.
Figure 3:
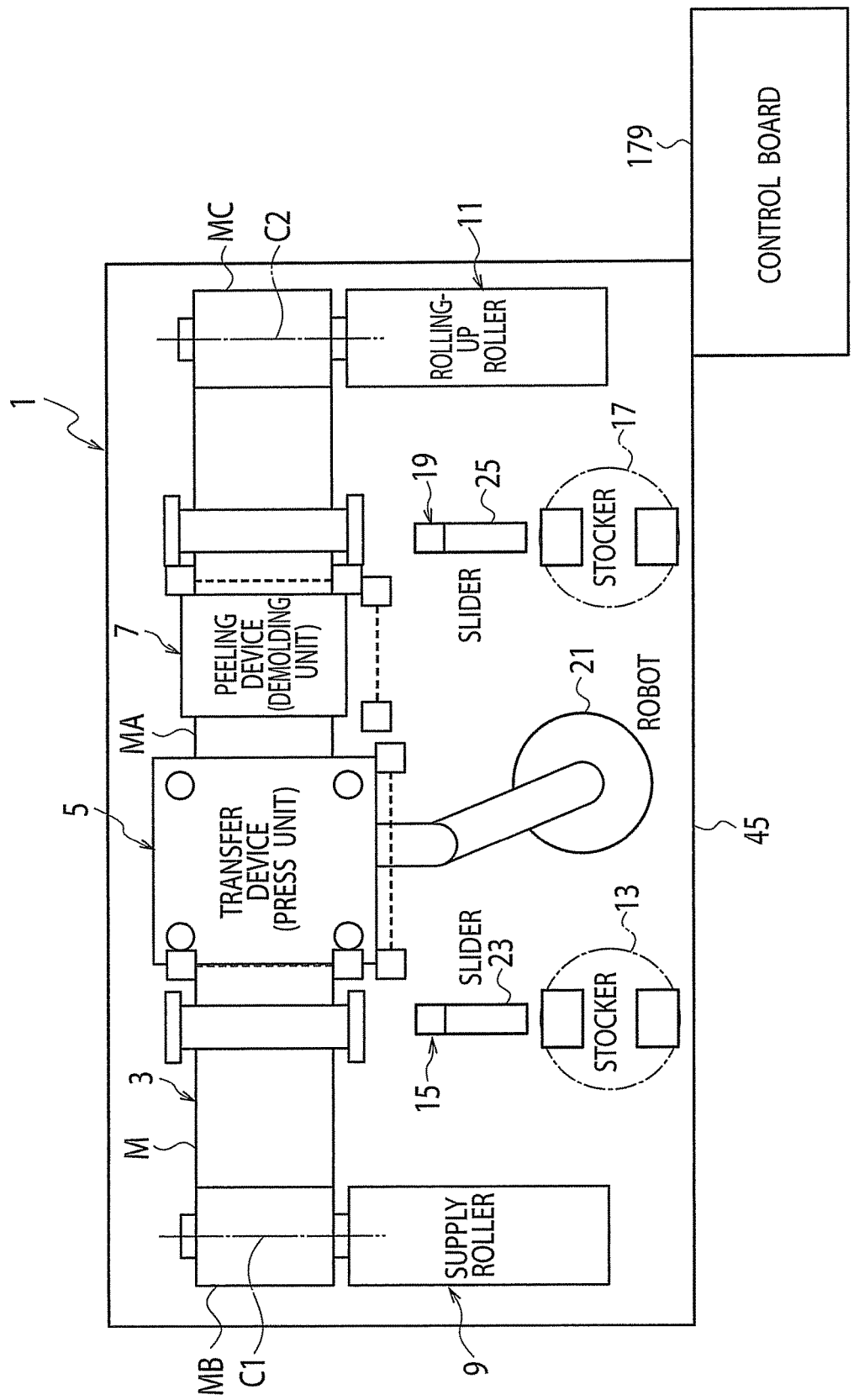
FIG. 3 is a plan view showing the outline of the transfer system.

FIG. 1 is a view showing an outline of a transfer system 1 in which a conveying/positioning device (sheet-shaped mold conveying/positioning device) 3 according to an embodiment of the present invention is used, and FIG. 2 and FIG. 3 are plan views showing the outline of the transfer system 1.

The transfer system 1 is a system that transfers a fine transfer pattern M1 formed on a sheet-shaped mold M to a molding target W. The transfer system 1 includes : a conveying/positioning device 3; a transfer device 5; and a peeling device 7.

Figure 6:
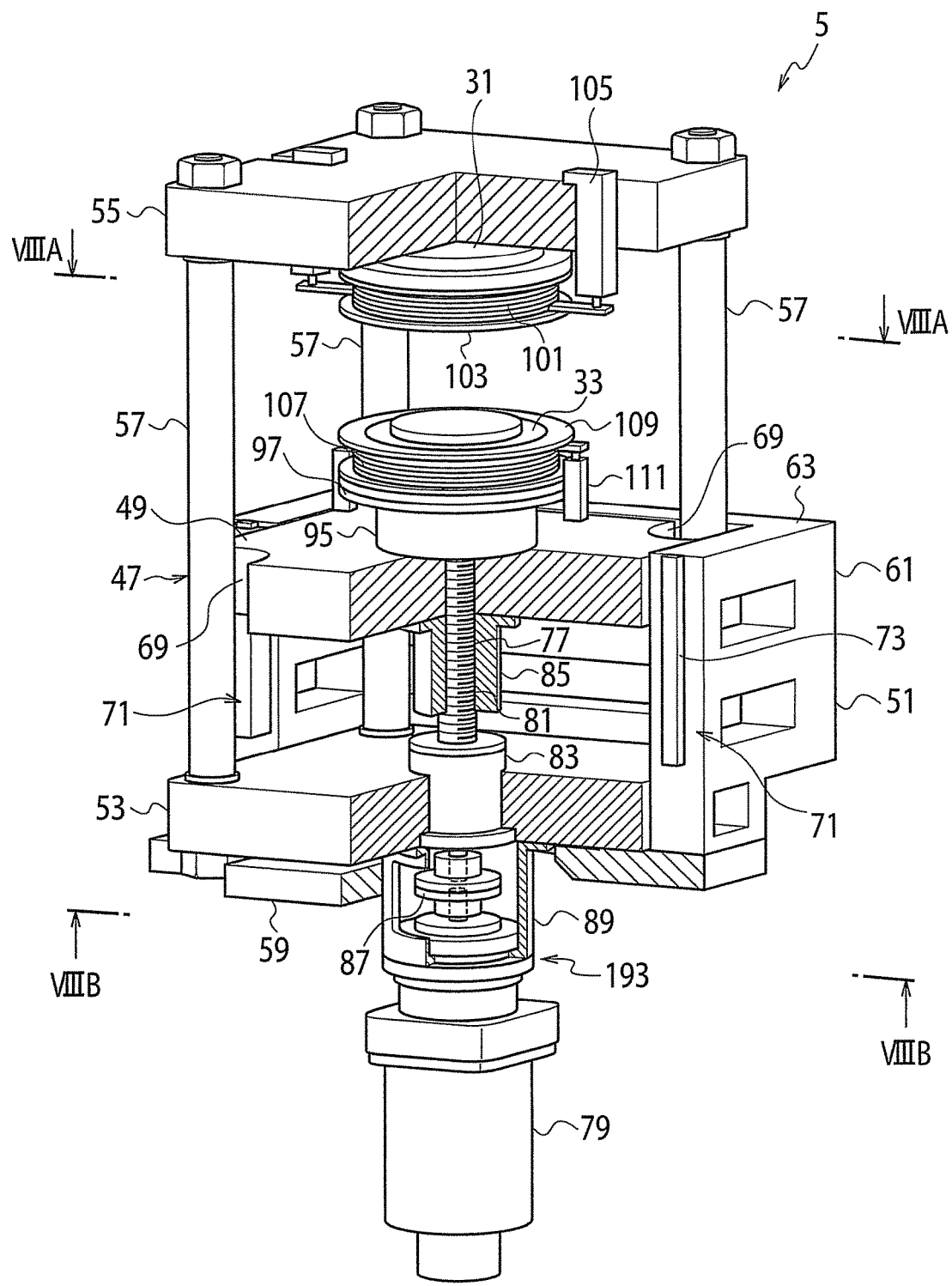
FIG. 6 is a perspective view showing a schematic configuration of a transfer device.
Figure 7:
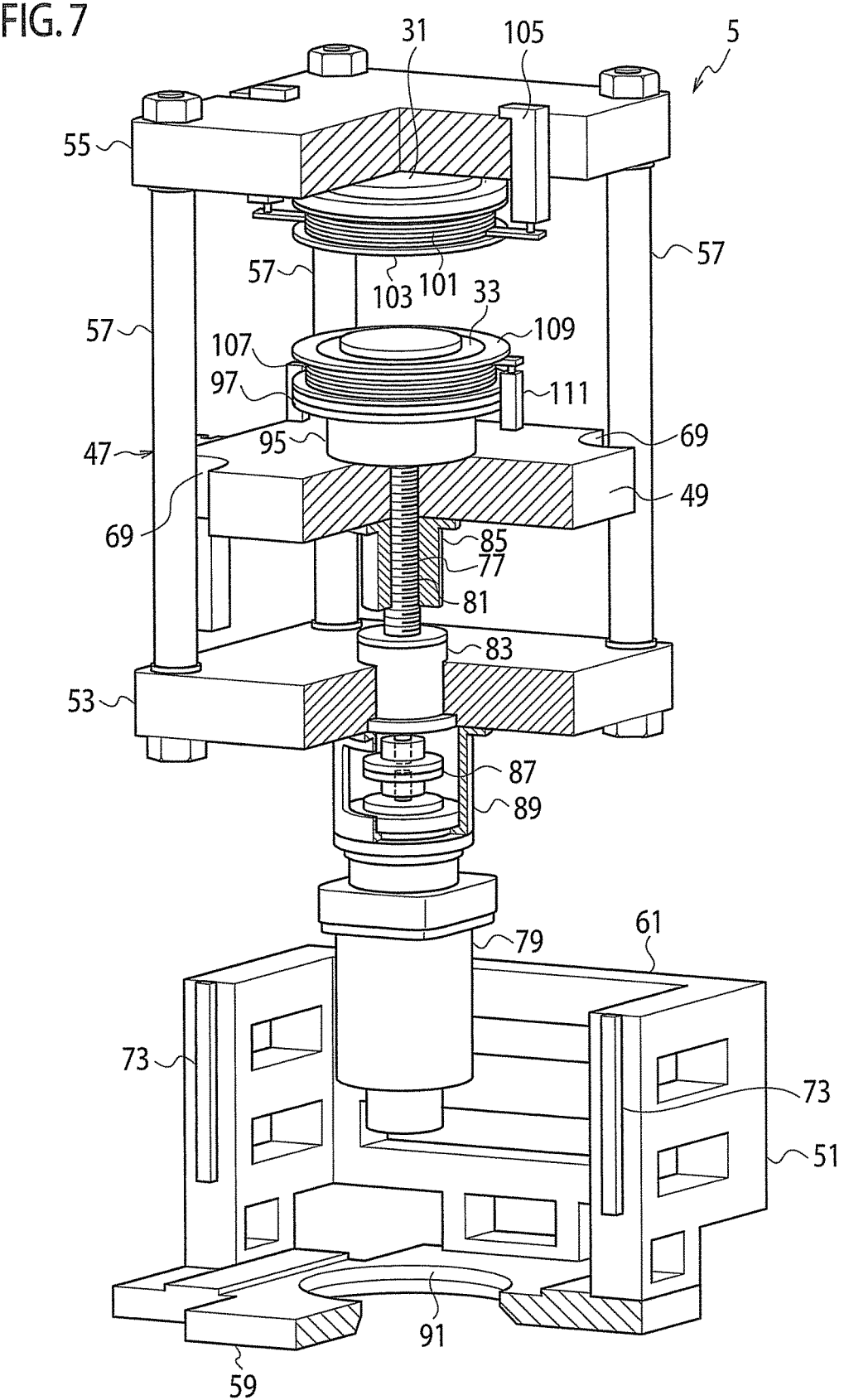
FIG. 7 is a view showing the schematic configuration of the transfer device.
Figure 8:
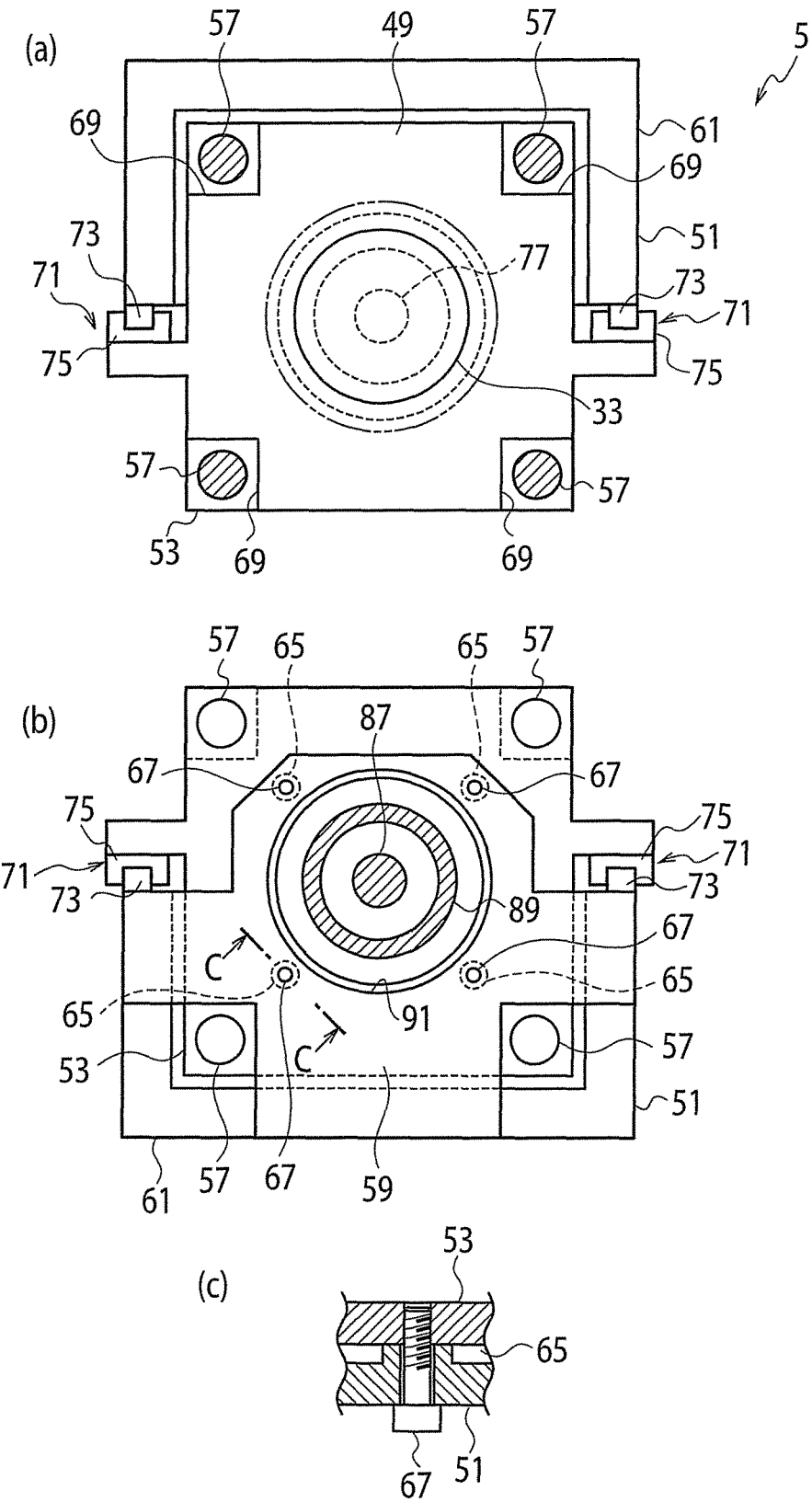
FIGS. 8(a) to 8(c) are cross-sectional arrow views of the transfer device.
Figure 21:
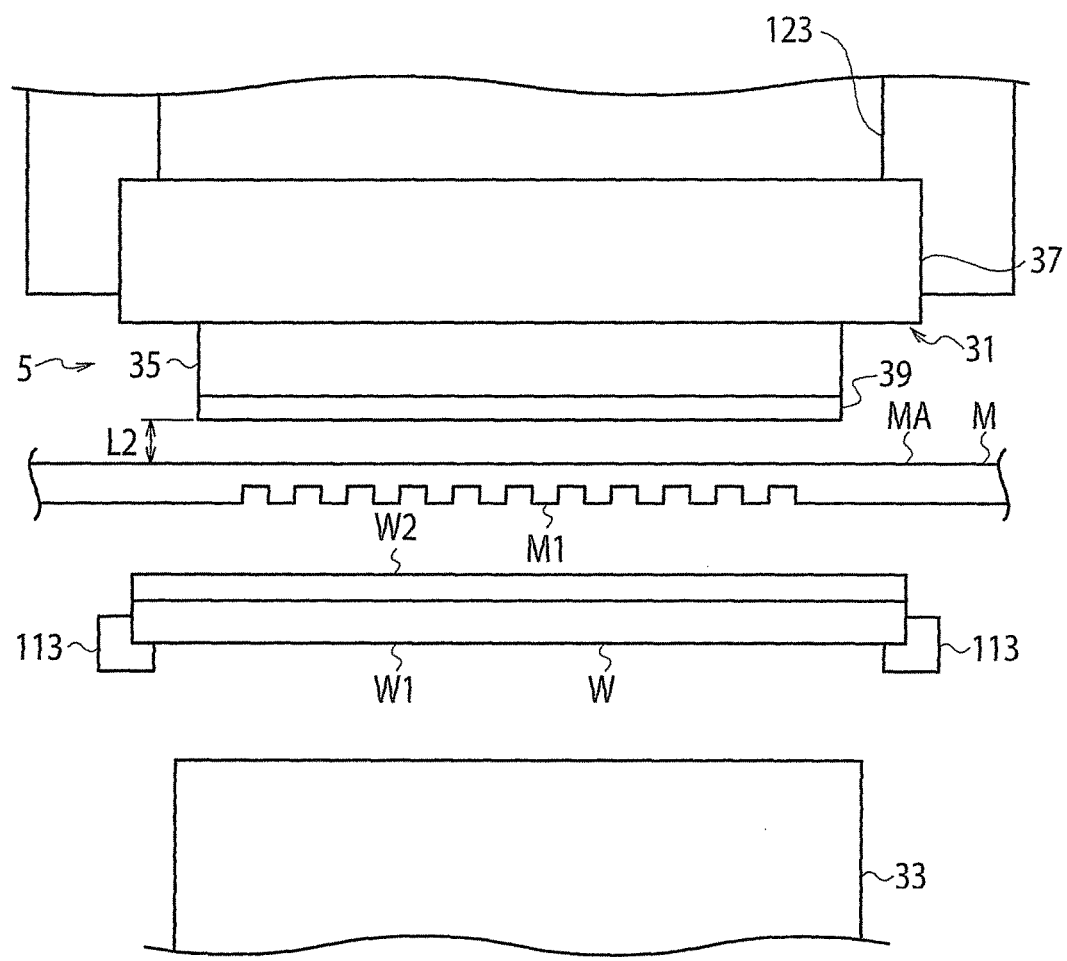
FIG. 21 is an enlarged view of a portion XXI, in FIG. 9(a).

FIG. 6 and FIG. 7 are perspective views showing a schematic configuration of the transfer device 5, and FIGS. 8(a) and 8(b) are cross-sectional arrow views of the transfer device 5: FIG. 8(a) is a VIIIA-VIIIA cross-sectional arrow view in FIG. 6; FIG. 8(b) is a VIIIB-VIIIB cross-sectional arrow view in FIG. 6; and FIG. 8(c) is a view showing a C-C cross section in FIG. 8(b). Note that, in FIG. 8(a), display of a bellows 107 and a lower contact member 109, which will be described later in detail, is omitted. FIGS. 9(a) and 9(b) to FIG. 15 are views showing an outline and operation of the transfer device 5, FIGS. 16(a) and 16(b) to FIGS. 20(a) and 20(b) are views showing an outline and operation of the peeling device 7, and FIG. 21 is an enlarged view of a portion XXI in FIG. 9(a).

The conveying/positioning device 3 forms the sheet-shaped mold M into a flat shape at a predetermined spot by conveyance of the sheet-shaped mold M, and positions this flat sheet-shaped mold MA in a predetermined direction. Here, the predetermined spot is between an unused-mold placing device and a mold rolling-up device 11, for example. The predetermined direction is a horizontal direction going from the unused-mold placing device 9 toward the mold rolling-up device 11, for example. Note that the conveyance and positioning of the flat sheet-shaped mold MA are performed for preparation of transfer or peeling. In this transfer, the fine transfer pattern of the flat sheet-shaped mold MA is transferred to the flat molding target W by using the transfer device 5. In this peeling, the molding target W clinging onto the sheet-shaped mold MA by this transfer is peeled off from the sheet-shaped mold.

A sheet-shaped mold position detection device 183 (refer to FIG. 1, FIG. 26) is provided in the conveying/positioning device 3. When the sheet-shaped mold position detection device 183 detects a predetermined part of the conveyed flat sheet-shaped mold MA, the conveyance of the sheet-shaped mold MA is stopped, and the sheet-shaped mold MA is positioned with respect to the transfer device 5.

Note that, for example, the fine transfer pattern M1 is a pattern, which is formed of a large number of fine irregularities, and has a height and a pitch, which are substantially equal to a wavelength of visible light, or slightly larger or slightly smaller than the wavelength of the visible light. The fine transfer pattern M1 is formed on one surface in a thickness direction of the sheet-shaped mold M. That is to say, in FIG. 1 and FIGS. 9(a) and 9(b) to FIGS. 20(a) and 20(b), the fine transfer pattern is formed on a lower surface of the flat sheet-shaped mold MA.

The transfer device 5 transfers the fine transfer pattern M1, which is formed on the flat sheet-shaped mold MA, to the molding target (transfer target) W by pressing the molding target W by the flat sheet-shaped mold MA. The transfer device 5 is provided on an upstream side (left side in FIG. 1, FIGS. 9(*a*) and 9(*b*) to FIGS. 20(*a*) and 20(*b*), and the like) in a conveying direction of the sheet-shaped mold M by the conveying/positioning device 3.

The peeling device (molding target separation device) 7 peels off the sheet-shaped mold MA and the molding target (post-transfer molding target) W, which are subjected to the transfer by the transfer device 5 and thus cling onto each other, from each other. That is, the peeling device 7 peels off or separates the molding target W from the sheet-shaped mold MA. The peeling device 7 is provided on a downstream side (downstream side of the transfer device 5 apart from the transfer device 5: right side in FIG. 1, FIGS. 9(*a*) and 9(*b*) to FIGS. 20(*a*) and 20(*b*), and the like) in the conveying direction of the sheet-shaped mold MA by the conveying/positioning device 3.

Note that the peeling device 7 performs peeling when the transfer device 5 performs next another transfer. The next another transfer is performed after the transfer device 5 performs transfer and the conveying/positioning device 3 conveys and positions the sheet-shaped mold MA and the molding target W clinging onto this sheet-shaped mold MA. Moreover, the conveying/positioning device 3 performs the conveying and positioning of the sheet-shaped mold MA and the molding target W by rolling up the flat sheet-shaped mold MA by the mold rolling-up device 11.

Moreover, the transfer system 1 comprises: a first stocker (pre-transfer molding target, pre-transfer substrate stocker) 13; a first conveying device (pre-transfer molding target conveying device) 15; a second stocker (post-transfer molding target stocker, already transferred substrate stocker) 17; and a second conveying device (post-transfer molding target conveying device) 19.

The first stocker 13 stores a plurality of the molding targets W before being transferred in the transfer device 5. The first conveying device 15 supplies the molding targets W, which are stored in the first stocker 13, to the transfer device 5 sheet by sheet (that is, one by one).

The second stocker 17 stores the plurality of molding targets W after being transferred in the transfer device 5. The second conveying device 19 supplies the post-transfer molding targets W, which are peeled off from the sheet-shaped mold MA, to the second stocker 17 sheet by sheet.

The first conveying device 15 includes a robot 21 and slider 23. The slider 23 takes out the pre-transfer molding targets W, which are stored in the first stocker 13, from the first stocker 13 sheet by sheet, and delivers the pre-transfer molding targets W concerned to the robot 21 sheet by sheet.

The second conveying device 19 includes the robot 21 and a slider 25. The slider 25 stores the post-transfer molding targets W, which are received from the robot 21, in the second stocker 17 sheet by sheet.

Moreover, the transfer system 1 comprises a sheet-shaped mold production device 27.

Figure 22:
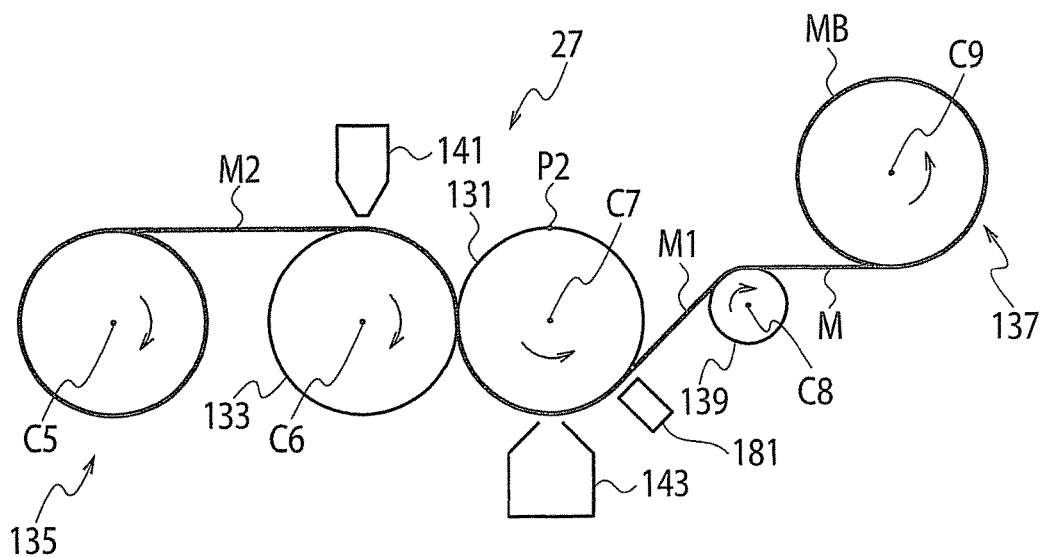
FIG. 22 is a view showing an outline of a sheet-shaped mold production device.

FIG. 22 is a view showing an outline of the sheet-shaped mold production device 27.

The sheet-shaped mold production device 27 produces the sheet-shaped mold M by forming the fine transfer pattern M1 on one surface in a thickness direction of a sheet-shaped raw material M2. The fine transfer pattern M1 is formed by the transfer, for example. In the transfer system 1, with respect to one sheet-shaped mold production device 27, there are provided a plurality of units (conveying/transfer/ peeling units) 29, each of which includes, as a set, one conveying/positioning device 3, one transfer device 5, and one peeling device 7.

Figure 25:
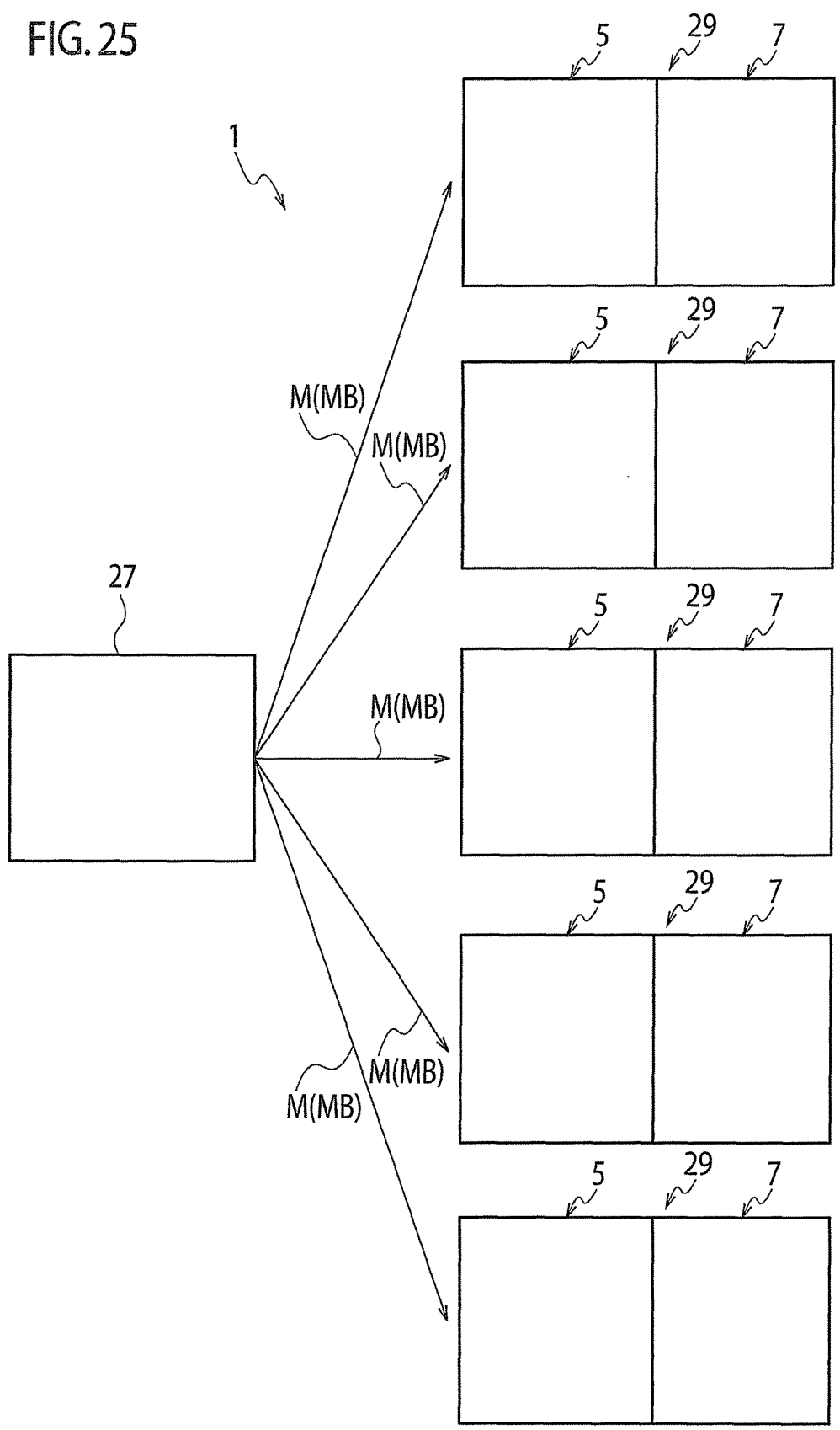
FIG. 25 is a plan view showing an outline of a transfer system including the sheet-shaped mold production device.

That is to say, as shown in FIG. 25, the plurality of units 29 are provided with respect to the one sheet-shaped mold production device 27. Then, the sheet-shaped molds M produced by the sheet-shaped mold production device 27 are supplied to the respective units 29. A number ratio of the units 29 to the sheet-shaped mold production device 27 is determined so that an idling time of each of the sheet-shaped mold production device 27 and the units 29 can become minimum to most efficiently perform the transfer from the sheet-shaped mold M to the molding targets W with reference to a tact time of the sheet-shaped mold production device 27 and a tact time of the units 29.

Note that each of the units 29 may include the first stocker 13, the first conveying device 15, the second stocker 17, and the second conveying device 19.

For example, as shown in FIG. 9(*a*), the transfer device 5 is configured to sandwich and transfer the molding target W and the flat sheet-shaped mold MA by a press body 31 and a molding target placing body 33 that places the molding target W thereon.

The press body 31 is configured so as sandwich the molding target W and the flat sheet-shaped mold MA by a flat shock-absorbing material 35. This flat shock-absorbing material is a shock-absorbing material composed of an elastic material such as hard rubber and soft resin, through which an ultraviolet ray transmits.

In a state where the molding target placing body 33 and the press body 31 sandwiches the sheet-shaped mold MA and the molding target W, the molding target W contacts the molding target placing body 33, the sheet-shaped mold MA contacts the molding target W, and the press body 31 contacts the sheet-shaped mold MA (for example, refer to FIG. 12(*a*)).

As shown in FIG. 21, the press body 31 of the transfer device 5 includes: a flat base material (for example, backup glass) 37 made of a highly rigid material such as glass, through which the ultraviolet ray transmits; the shock-absorbing material 35 provided in a layer shape so as to cover this base material 37; and a flat mold contact material 39 made of a material (for example, glass, PET resin), through which the ultraviolet ray transmits, and onto which the sheet-shaped mold M is less likely to cling (for example, a material with a small friction coefficient). The mold contact material 39 is provided in a layer shape (such a thin layer shape that is elastically deformed in response to elastic deformation of the shock-absorbing material 35) so as to cover the shock-absorbing material 35.

In the state where the molding target placing body 33 and the press body 31 sandwiches the sheet-shaped mold MA and the molding target W, the mold contact member 39 is brought into contact with the sheet-shaped mold MA.

The flat sheet-shaped mold MA is a sheet-shaped mold pulled out from the unused rolled mold MB in which the sheet-shaped mold M is wound. The flat sheet-shaped mold MA is extended, for example, in a horizontal direction between the unused-mold placing device 9 and the mold rolling-up device 11 (refer to FIG. 1 and the like)

The fine transfer pattern M1 shown in FIG. 21 is formed on each transfer pattern forming area AE1 as a part of the sheet-shaped mold M. Spacers (laminate films) S1 are provided (refer to FIGS. 24(*a*) to 24(*c*)) on at least a part of a region AE2 of the sheet-shaped mold M. The region AE2 is an area other than the transfer pattern forming area. Note that FIG. 24(*a*) is a plan view of the flat sheet-shaped mold MA, and FIG. 24(*b*) is a view showing a B-B cross section in FIG. 24(*a*).

As shown in FIG. 24(c) (cross-sectional view of the unused rolled mold MB), each laminate films S1 has a predetermined thickness sufficient for preventing a fine transfer pattern M1; Mx1 (transfer pattern forming area AE1) of the sheet-shaped mold M (Mx) forming the unused rolled mold MB from being pressed by the sheet-shaped mold M (My) adjacent and opposite to the fine transfer pattern M1 (Mx1). For example, the thickness prevents the fine transfer pattern M1 (Mx1) from contacting the sheet-shaped mold M (My)

As already understood, the sheet-shaped mold M is formed to be long with a predetermined width. Note that a direction perpendicular to paper surfaces of FIG. 1 and FIGS. 9(a) and 9(b) to FIG. 22 is a width direction of the sheet-shaped mold M.

As shown in FIG. 24(a), the fine transfer pattern M1 is formed on the rectangular area AE1, for example. This transfer pattern forming area AE1 having a rectangular shape is smaller in width than the sheet-shaped mold M. When viewed from the thickness direction of the sheet-shaped mold M, the transfer pattern forming area AE1 is located at substantially a midpoint of the sheet-shaped mold M while a width direction thereof coincides with the width direction of the sheet-shaped mold M. In a longitudinal direction of the sheet-shaped mold M, a plurality of the transfer pattern forming areas AE1 are arrayed at a predetermined interval (at a pitch p1) in the longitudinal direction of the sheet-shaped mold M.

The conveying/positioning device 3 includes: the unused-mold placing device (supply roller) 9 placing the unused rolled mold MB; and the mold rolling-up device (rolling-up roller) 11 that rolls up the sheet-shaped mold MA supplied (pulled out) from the unused rolled mold MB placed in this unused-mold placing device 9. Then, as mentioned above, the sheet-shaped mold MA is extended out and is formed into the substantially flat shape between the unused-mold placing device 9 and the mold rolling-up device 11 (refer to FIG. 1 and the like). Note that the unused-mold placing device 9 and the mold rolling-up device 11 are provided integrally on a bed 45.

A tension applying device 195 (refer to FIG. 1, FIG. 9(a) and FIG. 16(a)) applies a predetermined tension to the sheet-shaped mold MA, which forms into the flat plate shape between the unused-mold placing device 9 and the mold rolling-up device 11, in the longitudinal direction thereof. The longitudinal direction is, for example, the horizontal direction of connecting the unused-mold placing device 9 and the mold rolling-up device 11 to each other. In such a way, the flat shape is kept. Although the fine transfer pattern M1 is not illustrated in FIGS. 9(a) and 9(b) to FIGS. 20(a) and 20(b), the fine transfer pattern M1 is formed on the lower surface of the flat sheet-shaped mold MA as mentioned above (refer to FIG. 21).

The unused rolled mold (yard goods-like mold) MB is a mold before being used in the transfer in the transfer device 5. The unused rolled mold MB is formed into a cylindrical shape or a columnar shape in such a manner that the sheet-shaped mold M is wrapped and wound around an outer circumference of a columnar core material so that a circumferential direction of this outer circumference and the longitudinal direction of the sheet-shaped mold M can coincide with each other.

A rolled-up mold MC rolled up by the mold rolling-up device 11 is the mold already used in the transfer in the transfer device 5, and has a roll shape in a similar way to the unused rolled mold MB.

The unused rolled mold MB placed on the unused-mold placing device 9 is configured to rotate about, as a rotation center, a center axis (for example, an axis extended in the horizontal direction; an axis extended out in the direction perpendicular to the paper surfaces of FIG. 1, FIG. 9(a) and the like) C1 thereof. The rolled-up mold MC to be taken up by the mold rolling-up device 11 is also configured to rotate about, as a rotation center, a center axis (axis parallel to the axis C1 and extended in the horizontal direction) C2 thereof.

As mentioned above, in the flat sheet-shaped mold MA existing between the unused-mold placing device 9 and the mold rolling-up device 11, for example, the thickness direction thereof is an vertical direction, the longitudinal direction thereof is one horizontal direction, which is a direction of connecting the unused-mold placing device 9 and the mold rolling-up device 11 to each other, and the width direction thereof is another horizontal direction, which is a direction perpendicular to the thickness direction and the longitudinal direction.

The flat sheet-shaped mold MA is conveyed and positioned in this longitudinal direction, which is a direction going from the unused-mold placing device 9 to the mold rolling-up device 11, by the conveying/positioning device 3 while keeping the substantially flat form.

For example, a conveying distance by a single operation of the conveying/positioning device 3 is equal to the pitch p1 of the area AE1 in which the fine transfer pattern M1 is formed. Moreover, at the time when the sheet-shaped mold MA is conveyed by the conveying/positioning device 3 and thereafter, the position of the sheet-shaped mold MA extended out between the unused-mold placing device 9 and the mold rolling-up device 11 is substantially maintained by the tension applying device 195 in the state where the predetermined tension is kept.

A description is made in detail of the tension applying device 195 by mentioning an example thereof. The unused rolled mold MB placed on the unused-mold placing device 9 rotates by being coupled to a rotation output shaft of an actuator such as a motor through a torque control clutch such as a powder clutch. The sheet-shaped mold M (rolled-up mold MC) to be rolled up by the mold rolling-up device 11 rotates by being coupled to a rotation output shaft of an actuator such as a servomotor.

When conveying the flat sheet-shaped mold MA extended out between the unused-mold, placing device 9 and the mold rolling-up device 11, the motor of the unused-mold placing device 9 is set to reversely rotate in advance. In other words, the rotation output shaft of the motor of the unused rolled mold MB is rotated in advance so as to roll up the flat sheet-shaped mold MA by the unused-mold placing device 9. Further, torque of the powder clutch is set at a predetermined value T1. The rotation output shaft of the serve motor of the mold rolling-up device 11 is set to rotate by a predetermined rotation angle by predetermined torque T2 in a direction of rolling up the flat sheet-shaped mold MA. In this case, when "R1" is a radius of the unused rolled mold MB placed on the unused-mold placing device 9, and "R2" is a radius of the rolled-up mold MC in the mold rolling-up device 11, then "T1/R1<T2/R2" is established. In such a way, while keeping a predetermined tension F1 (F1=T2/R2−T1/R1), the flat sheet-shaped mold MA extended out between the unused-mold placing device 9 and the mold rolling-up device 11 is conveyed to the mold rolling-up device 11 side.

In a state where the conveyance of the flat sheet-shaped mold MA by the conveying/positioning device 3 is not performed, and the flat sheet-shaped mold MA maintains the position thereof, the rotation output shaft of the servomotor of the mold rolling-up device 11 is stopped by predetermined holding torque. Moreover, the flat sheet-shaped mold MA obtains a predetermined tension by the motor and powder clutch of the unused-mold placing device 9.

A conveying distance of the flat sheet-shaped mold MA extended out between the unused-mold placing device 9 and the mold rolling-up device 11 (conveyance and positioning) is determined by using the sheet-shaped mold position detection device 183 (refer to FIG. 1, FIG. 26 and the like) including a sheet-shaped mold position detector 191.

The sheet-shaped mold position detection device 183 detects a predetermined part of the sheet-shaped mold MA at the time of conveying the flat sheet-shaped mold MA in a predetermined direction (longitudinal direction of the sheet-shaped mold MA; direction going from left to right in FIG. 1, FIG. 9 and FIG. 26).

As mentioned above, the above-described positioning is performed by stopping the conveyance of the sheet-shaped mold MA by the conveying/positioning device 3. Specifically, when the conveying/positioning device 3 conveys the sheet-shaped mold MA, it also stops the conveyance of the sheet-shaped mold MA performed by itself and positions the sheet-shaped mold MA under control of a control device (control board) 179 in response to a detection result in the sheet-shaped mold position detector 191.

Figure 24:
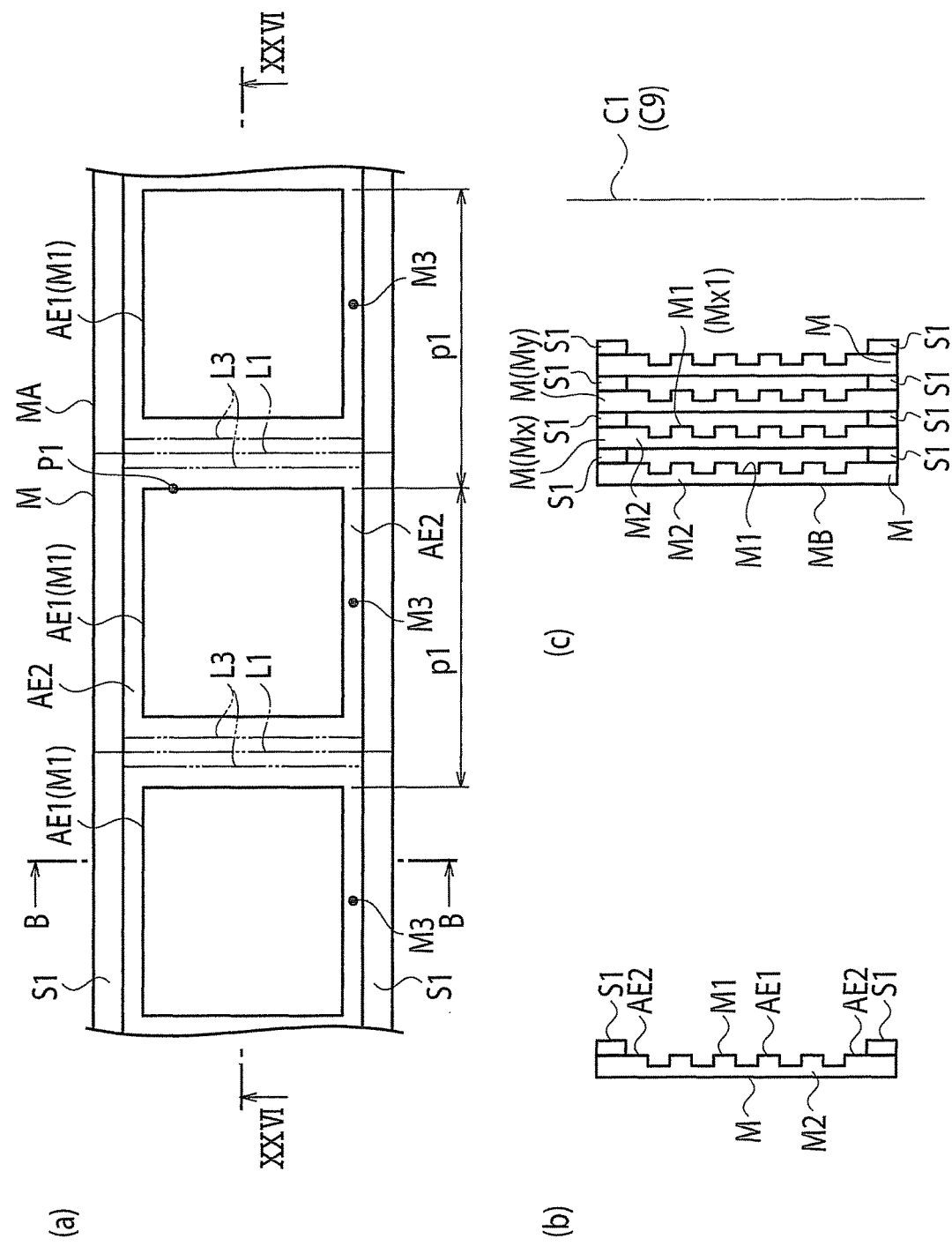
FIGS. 24(a) to 24(c) are views showing a sheet-shaped mold.

The sheet-shaped mold position detector 191 detects the predetermined part (for example, the position of the sheet-shaped mold MA with respect to the transfer device) by detecting at least any of a change of transmittance of light in the flat sheet-shaped mold MA, a change of reflectance of the light in the sheet-shaped mold MA, a mark (position detection mark; eye mark) M3 (refer to FIG. 24(*a*) formed in advance on the sheet-shaped mold MA, for example, in the vicinity of the transfer device 5.

Note that the above-described light is visible right with a predetermined wavelength, a near infrared ray with a predetermined wavelength, or a near ultraviolet ray with a predetermined wavelength.

Here, a description is made in detail of the sheet-shaped mold position detector 191 using the transmittance of the light in the flat sheet-shaped mold MA.

As mentioned above, in the sheet-shaped mold MA, there exist the transfer pattern forming area AE1 and the transfer pattern non-forming area AE2 (refer to FIG. 24(*a*)).

The sheet-shaped mold position detector 191 detects the position (predetermined part) of the sheet-shaped mold by detecting a difference in the transmittance of the light between the transfer pattern forming area AE1 and the transfer pattern non-forming area AE2. For example, the sheet-shaped mold position detector 191 detects the position of the sheet-shaped mold by detecting an edge (predetermined part) which is a boundary between the transfer pattern forming area AE1 and the transfer pattern non-forming area AE2.

That is to say, as shown in FIG. 26(*a*), a light emitting unit 185A of a light transmission-type sensor 185 is placed on an upper side of the flat sheet-shaped mold MA, and a light receiving unit 1853 of the light transmission-type sensor 185 is placed on a lower side of the flat sheet-shaped mold MA. Note that positions of the light emitting unit 185A and the light receiving unit 1853 may be changed. The light emitting unit 185A and the light receiving unit 185B are provided integrally on a base member 47 of the transfer device 5 in the vicinity of the transfer device 5.

The transfer pattern forming area AE1 and transfer pattern non-forming area AE2 of the flat sheet-shaped mold MA pass between the light emitting unit 185A of the light transmission-type sensor 185 and the light receiving unit 1853 of the light transmission-type sensor 185 by the conveyance of the flat sheet-shaped mold MA. Then, by the difference of the transmittance of the light in the flat sheet-shaped mold MA to be conveyed between the light emitting unit 185A, of the light transmission-type sensor 185 and the light receiving unit 185B of the light transmission-type sensor 185, the conveyance and positioning of the flat sheet-shaped mold MA are configured to be performed.

The description is further made. It is assumed that the light transmission-type sensor 185 is provided at a position of a point P1 of FIG. 24(*a*). It is assumed that such light transmittance of the light transmission-type sensor 185 is low in the transfer pattern forming area AE1, and high in the transfer pattern forming area AE2. Moreover, it is assumed that the flat sheet-shaped mold MA is conveyed and positioned in advance in a state shown in FIG. 24(*a*).

Then, when the flat sheet-shaped mold MA is conveyed by the pitch p1 as the predetermined distance in the right direction with respect to the light transmission-type sensor 185 and is positioned from the state shown in FIG. 24(*a*), the light transmittance by the light transmission-type sensor 185 is low at the beginning, next becomes high, and thereafter, becomes low. The movement of the flat sheet-shaped mold MA is stopped when the light transmittance becomes low as described above. In such a way, the flat sheet-shaped mold MA is conveyed by one pitch p1, followed by the positioning.

Note that, in the sheet-shaped mold position detector 191, a light reflection-type sensor 187 may be adopted in place of the light transmission-type sensor 185 (refer to FIG. 26(*b*), and the decision (conveyance and positioning) of the conveying distance of the flat sheet-shaped mold MA may be performed.

That is to say, the light is irradiated from the light reflection-type sensor 187 onto the flat sheet-shaped mold MA, and a difference in the reflectance of this light on the flat sheet-shaped mold MA is detected by the light reflection-type sensor 187, whereby the predetermined part of the flat sheet-shaped mold MA is detected, and the decision of the conveying distance may be made. Note that, in a similar way to the light transmission-type sensor 185, the light reflection-type sensor 187 is also provided integrally on the base member 47 of the transfer device 5 in the vicinity of the transfer device 5.

Note that the reflectance of the light in the transfer pattern forming area AE1 is lower in general than the reflectance of the light in the transfer pattern non-forming area AE2.

As described above, the difference in the transmittance or reflectance of the light in the flat sheet-shaped mold M is detected, whereby the predetermined part of the sheet-shaped mold M is detected. Then, the sheet-shaped mold M can be positioned accurately. Moreover, since the difference in the transmittance of the light between the transfer pattern forming area AE1 and the transfer pattern non-forming area AE2 is detected, it is not necessary to separately provide the mark on the sheet-shaped mold and a manufacturing process of the sheet-shaped mold M can be simplified.

Here, the sheet-shaped mold position detector 191 may be configured to detect each edge line L1 (refer to FIG. 24(*a*)) to be created at the time of forming the fine transfer pattern M1 on the sheet-shaped mold M to detect the predetermined part of the sheet-shaped mold, in place of detecting the difference in the transmittance or reflectance of the light between the transfer pattern forming area AE1 and the transfer pattern non-forming area AE2. Also in this case, the light transmission-type sensor 185 or the light reflection-type sensor 187 measures the transmittance or reflectance of the light.

Although described later in detail, the edge line L1 is, for example, a segment to be necessarily created at the time of forming the fine transfer pattern M1 on the sheet-shaped mold M.

As described above, the edge line L1 to be created at the time of forming the fine transfer pattern M1 on the sheet-shaped mold is detected, whereby the predetermined part of the sheet-shaped mold M is detected. Then, the sheet-shaped mold M can be positioned accurately. Moreover, since the edge line L1 is detected, it is not necessary to separately provide the mark on the sheet-shaped mold M, and the manufacturing process of the sheet-shaped mold M can be simplified.

For the purpose of detecting the edge line L1, a camera 189 shown in FIG. 26(*c*) and an image processing apparatus provided in the control device 179 may be used in place of the light transmission-type sensor 185 or the light reflection-type sensor 187. The camera 189 is provided integrally on the base member 47 of the transfer device 5.

Moreover, a configuration may be adopted, in which, in the sheet-shaped mold position detector 191, each mark M3 (refer to FIG. 24(*a*)) is provided at a predetermined position of the flat sheet-shaped mold MA in advance, for example, by the sheet-shaped mold production device 27, the mark M3 concerned is detected by the camera 189 (refer to FIG. 26(*c*)) and the image processing apparatus, and the sheet-shaped mold M is positioned.

The mark M3 is a mark to be formed at the time of transferring and forming the fine transfer pattern onto a sheet-shaped raw material M2, for example, from an original mold of a transfer reel 131.

The mark M3 is a predetermined part of the sheet-shaped mold M. The mark M3 is formed by a marker (ink-jet, laser marker or the like) 181 shown in FIG. 22 and FIG. 23. Moreover, as shown in FIG. 24(*a*), the mark M3 is formed, for example, at the predetermined pitch p1 on the transfer pattern non-forming area AE2, which is a region (region of the sheet-shaped mold M) on which the laminate films S1 are not provided. Note that the mark M3 maybe provided on the transfer pattern non-forming area AE2, which is a region on which the laminate films S1 are provided.

The formation of the mark M3 by the marker 181 is performed in synchronization of rotation of the transfer roll 131 under control of a control device (not shown). For example, the pitch p1 of the transfer pattern forming area AE1, the edge line L1 and the mark M3 is a pitch to be formed in such a manner that the transfer roll 131 makes one rotation. Accordingly, the marker 181 detects one rotation of the transfer roll 131, which is made by the actuator such as the motor, by using a rotation angle detection device (rotary encoder (not shown)) capable of detecting a rotation angle of the transfer roll 131, and forms, for example, the dot-like mark M3 on the sheet-shaped mold M (sheet-shaped raw material M2) for each rotation thus detected.

As described above, the mark M3 formed on the sheet-shaped mold M is detected, whereby the predetermined part of the sheet-shaped mold M is detected. Then, the sheet-shaped mold M can be positioned more accurately.

Moreover, before the transfer in the transfer device 5, the molding target W placed on the molding target placing body 33 and the sheet-shaped mold MA may be positioned by using the mark M3.

In this case, a mark is provided at a predetermined position of the molding target W, a camera (not shown) images the mark M3 of the sheet-shaped mold MA and the mark of the molding target W, and the image processing apparatus measures a positional deviation amount of the mark of the molding target W with respect to the mark M3 of the sheet-shaped mold MA.

An XY stage is provided between a load cell 95 and a lower member 53 to move and position the molding target W, which is placed on the molding target placing body 33, in XY-directions (expanding direction of an upper surface of the molding target W). Then, under the control of the control device 179, the XY stage is operated so as to eliminate the measured positional deviation amount.

Furthermore, as heretofore, a rotary encoder capable of detecting a rotation angle of a rotation output shaft of a servomotor provided in the mold rolling-up device 11 is provided, and in addition, an outer diameter of the rolled-up mold MC rolled up by the mold rolling-up device 11 is measured, whereby the decision (conveyance and positioning) of the conveying distance of the flat sheet-shaped mold MA may be performed.

Incidentally, as shown in FIG. 9(*a*) and the like, a tension F1 of the flat sheet-shaped mold MA is detected by a tensioner (tension detection device; tension measuring means) 41. In response to a result of this detection, the torque of the powder clutch is controlled so that the tension F1 can be a predetermined value.

The control device 179 controls the tension applying device 195 so as to obtain a predetermined tension of the flat sheet-shaped mold MA in response to a tension thereof measured by the tensioner 41.

The tensioner 41 includes a columnar roller 43 and a base (not shown). The roller 43 is provided integrally on a base (base provided integrally on the bed 45 shown in FIG. 1) through a bearing (not shown). The roller 43 rotates about a center axis C3 as a rotation center of the roller 43. The center axis C3 is an axis extended out in the direction perpendicular to the paper surface of FIG. 9(*a*) and the like.

Moreover, a load cell (not shown) is provided between the base and the bearing, whereby it is made possible to detect a load to be applied to the roller 43 in response to the tension of the flat sheet-shaped mold MA. That is to say, the flat sheet-shaped mold MA is wound around the roller 43. The sheet-shaped mold MA thus wound applies a load to the bearing of the roller 43. Then, the load to be applied to the load cell is detected (measured), whereby it is made possible to detect the tension of the flat sheet-shaped mold MA.

The roller 43 is located on and above the flat sheet-shaped mold MA, and the sheet-shaped mold MA is wound around a lower side of the roller 43.

In such a way, a back surface (upper surface) of the sheet-shaped mold MA, which is an opposite surface with the surface on which the fine transfer pattern M1 is formed, is brought into contact with the roller 43.

As shown in FIG. 6 and the like, the transfer device 5 includes the base member 47, a moving body 49 and a moving body supporting body 51. The base member 47 includes the lower member 53, an upper member 55, and tie bars (tie rods) 57. For example, the lower member 53, the upper member 55 and the moving body 49 have a rectangular flat shape, and are formed into substantially the same shape.

The lower member 53 and the upper member 55 are provided at a predetermined interval in the vertical direction, for example, so that thickness directions thereof can coincide with each other. The moving body 49 is located between the lower member 53 and the upper member 55. When viewed from the above, the lower member 53 and the upper member 55 substantially overlap each other. Moreover, the lower member 53 and the upper member 55 are coupled to each other, for example, by four tie bars 57.

The tie bars 57 are formed into a columnar shape, for example. The tie bars 57 are provided integrally on both the lower member 53 and the upper member 55 between the lower member 53 and the upper member 55 so that an extending direction of center axes thereof can become the vertical direction. When viewed from the above, the four tie bars 57 are provided in the vicinities of corner portions of the lower member 53 and the upper member 55. Moreover, the four tie bars 57 are arranged symmetrically with respect to centers of the lower member 53 and the upper member 55. For example, an intersection of diagonal lines of the four tie bars 57 and the centers of the lower member 53 and the upper member 55 coincide with each other. Moreover, by the press in the event of the transfer in the transfer device 5, a tensile stress is generated in the tie bars 57, and the tie bars 57 are elastically deformed very slightly; however, if slight extension amounts of the four tie bars 57 by this tensile stress become equal to one another, then in general, it is assumed that the tie bars 57 are arranged symmetrically with respect to the centers of the lower member 53 and the upper member 55.

The moving body supporting body 51 includes a rectangular flat base 59 and a U-shaped side portion 61. The moving body supporting body 51 is integrally formed with the base 59 and side portion 61, for example. A description is further made. The base 59 is formed into a rectangular flat shape in a similar way to the lower member 53 and the upper member 55. The side portion 61 is erected from side surfaces of the base 59 in a thickness direction of the base 59. When viewed from the above (when viewed from the thickness direction of the base 59), the side portion 61 is formed into the "U" shape, and is located on a place where one side of the base 59 and two sides thereof adjacent to this one side. Moreover, when viewed from the above, one end portion of the U-shaped side portion 61 is located at a substantial center portion of one side of the two sides adjacent to the one side of the base 59, and other end portion of the U-shaped side portion 61 is located at a substantially center portion of other side of the two sides adjacent to the one side of the base 59 (refer to FIGS. 8(a) and 8(b) and the like).

The moving body supporting body 51 is provided integrally on the lower member 53 so that one surface of the base 59 (a surface on a side to which the side portion 61 is extended out) in the thickness direction thereof is opposed to a lower surface of the lower member 53. When viewed from the above, the base 59 of the moving body supporting body 51 substantially overlaps the lower member 53, and the side portion 61 of the moving body supporting body 51 surrounds a half of an outer circumference of the lower member 53 while being slightly apart from the lower member 53. Specifically, the side portion 61 surrounds the one side of the lower member 53 and substantial halves of the two sides adjacent to the one side. Moreover, when viewed from the side, a tip end surface (upper surface; refer to FIG. 6) 63 of the side portion 61 is located between the lower member 53 and the upper member 55.

The moving body supporting body 51 and the lower member 53 are joined to each other only in the vicinities of the centers of the lower member 53 and the base 59 of the moving body supporting body 51. For example, in the vicinity of the center of the base 59 of the moving body supporting body 51, a plurality of seats (parts which slightly protrude from an upper surface of the base 59 and have flat upper surfaces) 65 are provided. For example, four seats 65 are provided. When viewed from the above, the four seats 65 are arranged on the periphery of the vicinity of the center (center of the lower member 53) of the center of the base 59 of the moving body supporting body 51. Moreover, the respective seats 65 are provided at positions obtained by dividing a small circle, which takes the center of the base 59 as a center thereof, equally into four portions.

Upper surfaces of the seats 65 of the moving body supporting body 51 and a part of the lower surface of the lower member 53 are brought into surface contact with each other (refer to FIG. 8(c)). In addition, other parts of the moving body supporting body 51 are spaced apart from the base member 47 such as the lower member 53 so as not to contact or not to be supported by the same base member 47, and in such a state, the moving body supporting body 51 provided integrally to the lower member 53 by fastening tools such as bolts 67.

The moving body 49 is provided between the lower member 53 and the upper member 55 so that a thickness direction thereof can be the vertical direction. When viewed from the above, the moving body 49 substantially overlaps the lower member 53 and the upper member 55. Note that, on corner portions of the moving body 49, notches 69 are provided. The moving body 49 is spaced apart from the tie bars 57 (base member 47) by the notches 69, and is not brought into contact with the tie bars 57 (refer to FIG. 8(a)).

The moving body 49 is supported on the moving body supporting body 51 by linear guide bearings 71. The moving body 49 moves in the vertical direction (direction of connecting the lower member 53 and the upper member 55 to each other; extension direction of the center axes of the tie bars 57).

That is to say, a rail 73 of the linear guide bearing 71 is provided integrally on one end portion of the side portion 61 of the moving body supporting body 51. This rail 73 is extended in the vertical direction. Also a rail 73 of the linear guide bearing 71 is provided integrally on other end portion of the side portion 61 of the moving body supporting body 51. This rail 73 is extended in the vertical direction (for example, refer to FIGS. 8(a) and 8(b)).

On the moving body 49, a pair of bearings 75 are provided integrally to be engaged with a pair of the rails 73. In such a way, the moving body 49 is supported only by the linear guide bearings 71. The moving body 49 is made freely movable in the vertical direction between the lower member 53 and the upper member 55. Moreover, when viewed from the above, the pair of linear guide bearings 71 are arranged symmetrically (for example, at point-symmetric positions) with respect to the centers of the lower member 53, the upper member 55 and the moving body 49.

Moreover, for example, the moving body 49 is made capable of freely moving and being positioned in the vertical direction by a ball screw 77 and an actuator such as a servomotor 79.

A description is made in detail. As shown in FIG. 6 to FIGS. 8(a) and 8(b), a center axis of a screw shaft portion 81 of the ball screw 77 extends in the vertical direction through the center of the lower member 53, and the screw shaft portion 81 is rotatably provided on the lower member 53. The screw shaft portion 81 of the ball screw 77 is rotatably provided on the lower member 53 by a bearing 83 placed in the lower member 53. Thus, the screw shaft portion 81 extends upward from the lower member 53. An upper part of the screw shaft portion 81 of the ball screw 77 is engaged with a nut 85 provided integrally on the moving body 49.

A lower part of the screw shaft portion 81 of the ball screw 77 is coupled to a rotation output shaft of the servomotor 79 though a coupling 87. A cabinet of the servomotor 79 is provided integrally on the lower member 53 on the lower side of the lower member 53 through a cylindrical spacer 89. In order to avoid an interference of the moving body supporting body 51 with the servomotor 79 and the spacer 89, a through hole 91 is formed in the center portion of the base 59 of the moving body supporting body 51. Each of the seats 65 is arranged as close as possible to the through hole 91 in the vicinity of the periphery of the through hole 91.

With such a configuration, the moving body 49 is made capable of freely moving and being positioned in the vertical direction (direction where the moving body 49 approaches and leaves the upper member 55). Moreover, parts (the nut 85, the bearing 83 and the servomotor 79) that may generate fine dusts are arranged below the moving body 49. Therefore, in combination with a down flow of clean air around the transfer system 1, it is possible to prevent a fine foreign object from being mixed into the molding target W.

The transfer device 5 is fixed to the bed 45 (refer to FIG. 1) by engaging at lease either of the lower member 51 and the moving body supporting body 51 with the bed 45. For example, the lower member 53 is fixed to the bed 45 by using fastening tools such as bolts.

As shown in FIG. 9(a) and the like, the press body 31 is provided integrally on the lower surface of the upper member 55. The press body 31 protrudes downward from the lower surface of the upper member 55. A lower surface of the press body 31 is formed into a horizontal flat surface, for example, a circular or rectangular flat surface. At the time of performing the transfer, this flat surface is brought into surface contact with the sheet-shaped mold MA.

As shown in FIG. 9(a), the molding target placing body 33 is provided integrally on an upper surface of the moving body 49 while interposing the load cell 95 and a spacer 97 therebetween. The flat load cell 95, the flat spacer 97 and the molding target placing body 33 protrude upward from the upper surface of the moving body 49. The upper surface of the molding target placing body 33 is formed into a horizontal flat surface (for example, a circular or rectangular flat surface).

The molding target W is mounted on the molding target placing body 33 so that the lower surface (one surface of the flat molding target W in the thickness direction thereof; a lower surface of a base material W1 shown in FIG. 21) of the molding target W is brought into surface contact with the upper surface of the molding target placing body 33, and that the thickness direction of the molding target W is directed to the vertical direction. Moreover, the molding target W is placed integrally on the molding target placing body 33, for example, by vacuum suction.

On the lower surface of the upper member 55, a cylindrical bellows (upper bellows) 101 is provided so as to protrude downward. The cylindrical bellows 101 forms a vacuum molding chamber 99 (for example, refer to FIG. 11(a)). A base end (upper end) of the bellows 101 is provided integrally on the upper member 55, and a tip end (lower end) of the bellows 101 is provided integrally on an annular upper contact member 103. A lower surface of the upper contact member 103 is formed, for example, into a horizontal annular flat surface.

As shown in FIG. 9(a), on the upper contact member 103 and the upper member 55, actuators such as air cylinders 105 are provided, for example. Each of the air cylinders 105 is provided integrally on the upper member 55, and a rod (piston rod) of the air cylinder 105 is provided integrally on the upper contact member 103. Then, the bellows 101 can be stretched and contracted by the air cylinders 105.

The air cylinder 105 is a cylinder of 3-position type. Specifically, the air cylinder 105 is configured to fix the rod at a predetermined intermediate position in a stroke of the rod with respect to the cylinder in addition to both end positions of the stroke of the rod.

In a state where the rod retracts most, the lower surface of the upper contact member 103 is located above the lower surface of the press body 31 (for example, refer to FIG. 9(a)). In a state where the rod is located at the predetermined intermediate position, the lower surface of the upper contact member 103 is located at the same height as that of the lower surface of the press body 31 (for example, refer to FIG. 11(b)). In a state where the rod is extended out most, the lower surface of the upper contact member 103 is located slightly below the lower surface of the press body 31 (for example, refer to FIG. 10(a)).

As shown in FIG. 9(a), for example, the flat spacer 97 is provided integrally on the load cell 95 and the molding target placing body 33 so that a thickness direction thereof is directed to the vertical direction. The load cell 95 is provided integrally on the moving body 49.

On an upper surface of the spacer 97, a bellows (lower bellows formed into the same shape as that of the upper bellows) 107 is provided to protrude upward. The bellows 107 forms the vacuum molding chamber 99. A base end (lower end) of the bellows 107 is provided integrally on the spacer 97. On a tip end (upper end) of the bellows 107, an annular lower contact member (lower contact member formed into the same shape as that of the upper contact member 103) 109 is provided integrally. An upper surface of the lower contact member 109 is formed, for example, into a horizontal annular flat surface.

On the lower contact member 109 and the spacer 97, actuators such as air cylinders 111 are provided. A cylinder of each air cylinder 111 is provided integrally on the spacer 97, and a rod (piston rod) of each air cylinder 111 is provided integrally on the lower contact member 109. Then, the bellows 107 can be stretched and contracted by the air cylinders 111.

In a state where the rod retracts most, the upper surface of the lower contact member 109 is located below the upper surface of the molding target placing body 33 (for example, refer to FIG. 9(a)), and in a state where the rod is extended out most, the upper surface of the lower contact member 109 is located slightly above the upper surface of the molding target placing body 33 (for example refer to FIG. 10(a)).

Thrust of the air cylinder that stretches and contracts the upper bellows 101 is larger than thrust of the air cylinder 111 that stretches and contracts the lower bellows 107. Hence, for example, even if the upper contact member 103 is pushed by the lower contact member 109, the rod of the air cylinder 105 that stretches and contracts the upper bellows 101 is configured not to retract (the upper bellows 101 is not contracted, and the upper contact member 103 does not move upward).

As shown in FIG. 21 and the like, for example, the molding target W is composed of: the flat base material (for example, a glass plate) W1 having a circular shape or a rectangular shape; and thin film-like ultraviolet curing resin W2 provided on one surface (for example, an entire surface) of this glass plate W1 in the thickness direction thereof. It is assumed that the liquid and thin film-like ultraviolet curing resin W2 is provided on the pre-transfer molding target W, which is stored in the first stocker 13, by another device in advance.

In the transfer in the transfer device 5, the fine transfer pattern M1 is transferred to the thin film-like ultraviolet curing resin W2. Note that reference numerals 113 shown in FIG. 21 and the like denote hands of the robot 21.

In a state (transfer preparation state) before the transfer is performed in the transfer device 5, the moving body 49 is located at a lowering end. The molding target W is mounted on the molding target placing body 33 so that the ultraviolet curing resin W2 before being cured positions upward. The respective bellows 101 and 107 are contracted. The molding target W and the press body 31 (the mold contact member 39) are spaced apart from each other by a predetermined distance (refer to FIG. 21, FIG. 9(b) and the like). The flat sheet-shaped mold MA extended out between the unused-mold placing device 9 and the mold rolling-up device 11 is not conveyed, thus stopped. The flat sheet-shaped mold MA is spaced slightly apart from the press body 31 (apart by a slight distance L2 as shown in FIG. 9(a)) between the press body 31 and the molding target W mounted on the molding target placing body 33, and the flat sheet-shaped mold MA is extended in the horizontal direction therebetween.

When viewed from the above in the transfer preparation state and transferring state of the transfer device 5, the upper surface of the molding target placing body 33 and the molding target W have the same size, and the molding target W covers the entire upper surface of the molding target placing body 33. Note that the molding target W may be slightly larger than the upper surface of the molding target placing body 33, and the upper surface of the molding target placing body 33 may be located in an inside of the molding target W. Alternatively, the molding target W may be slightly smaller than the upper surface of the molding target placing body 33, and the molding target W may be located in an inside of the upper surface of the molding target placing body 33.

Moreover, when viewed from the above in the transfer preparation state and transferring state of the transfer device 5, the lower surface of the press body 31 and the molding target W have the same size, and the molding target W covers the entire lower surface of the press body 31. Note that the molding target W may be slightly larger than the lower surface of the press body 31, and the lower surface of the press body may be located in the inside of the molding target W. Alternatively, the molding target W may be slightly smaller than the lower surface of the press body 31, and the molding target W may be located in an inside of the lower surface of the press body 31.

Furthermore, when viewed from the above in the transfer preparation state and transferring state of the transfer device 5, one transfer pattern forming area AE1 of the flat sheet-shaped mold MA has the same size as that of the molding target W, and the one transfer pattern forming area AE1 covers the whole of the molding target W. Note that the transfer pattern forming area AE1 may be slightly larger than the molding target W, and the molding target W may be located in an inside of the transfer pattern forming area AE1. Alternatively, the transfer pattern forming area AE1 may be slightly smaller than the molding target W, and the transfer pattern forming area AE1 may be located in an inside of the molding target W.

Note that, as mentioned above, the transfer pattern forming area AE1 may be formed into the rectangular shape as shown in FIG. 24(a) and the like, or may be formed into the circular shape as shown in FIGS. 4(a) and 4(b) and FIGS. 5(a) and 5(b). Furthermore, the transfer pattern forming area AE1 may be formed into a predetermined shape other than the rectangular shape and the circular shape.

Figure 5:
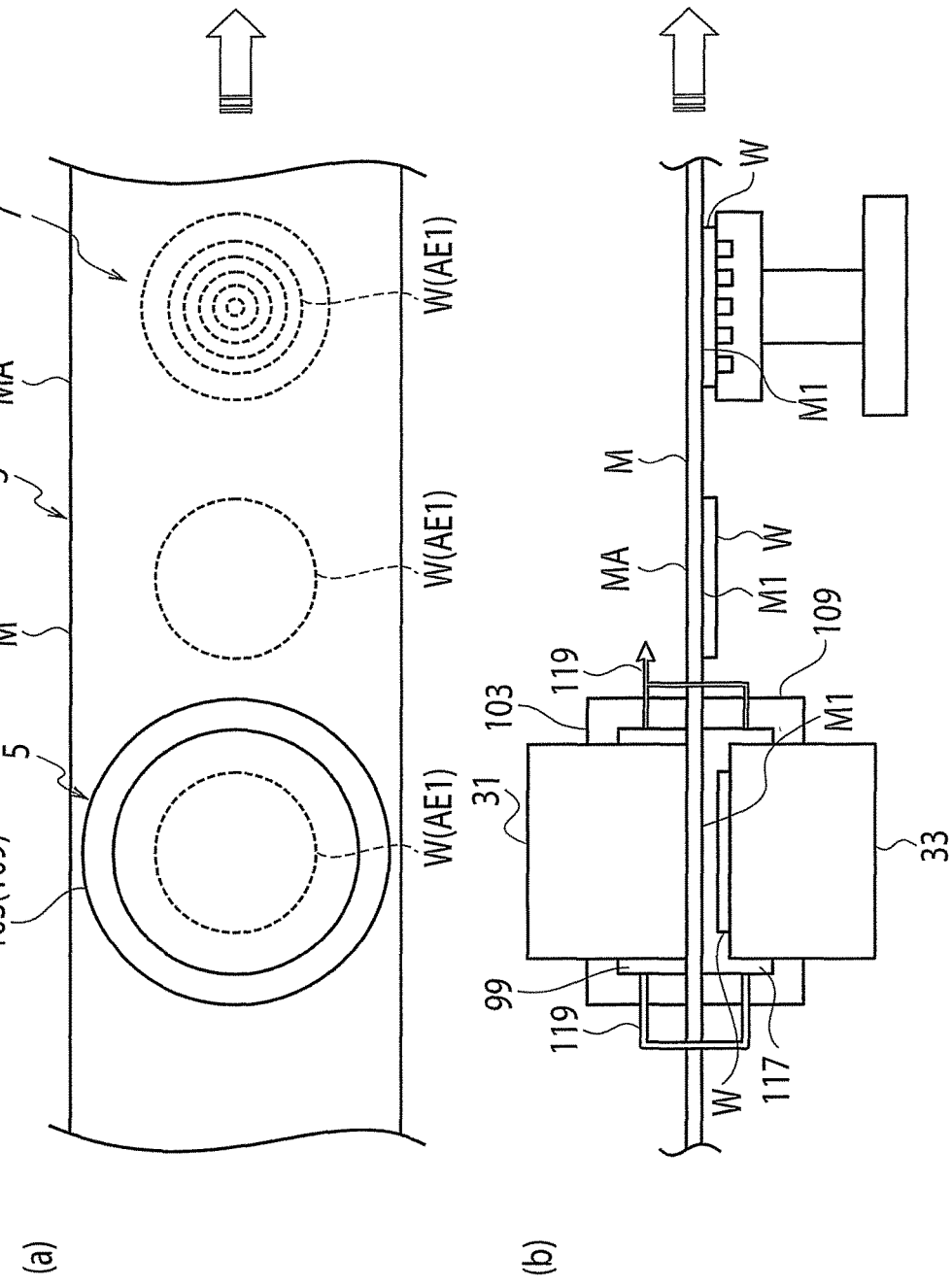

When viewed from the above in the transfer preparation state and the transferring state, the respective bellows 101 and 107 formed into the circular shape overlap each other, and the respective annular contact members 103 and 109 also overlap each other. Moreover, the molding target placing body 33, the molding target W and the press body 31 exist in insides of the respective bellows 101 and 107 and the respective contact members 103 and 109. Furthermore, a width of the flat sheet-shaped mold MA is larger than a diameter of the respective annular contact members 103 and 109, and thus the respective contact members 103 and 109 are located in the inside of the flat sheet-shaped mold MA (refer to FIG. 5(a)). Note that FIG. 5(a) is a plan view showing size and position relationships between the flat sheet-shaped mold MA and the respective contact members 103 and 109 and the like, and FIG. 5(b) is a side view showing the size and position relationships between the flat sheet-shaped mold MA and the respective contact members 103 and 109 and the like.

Figure 4:
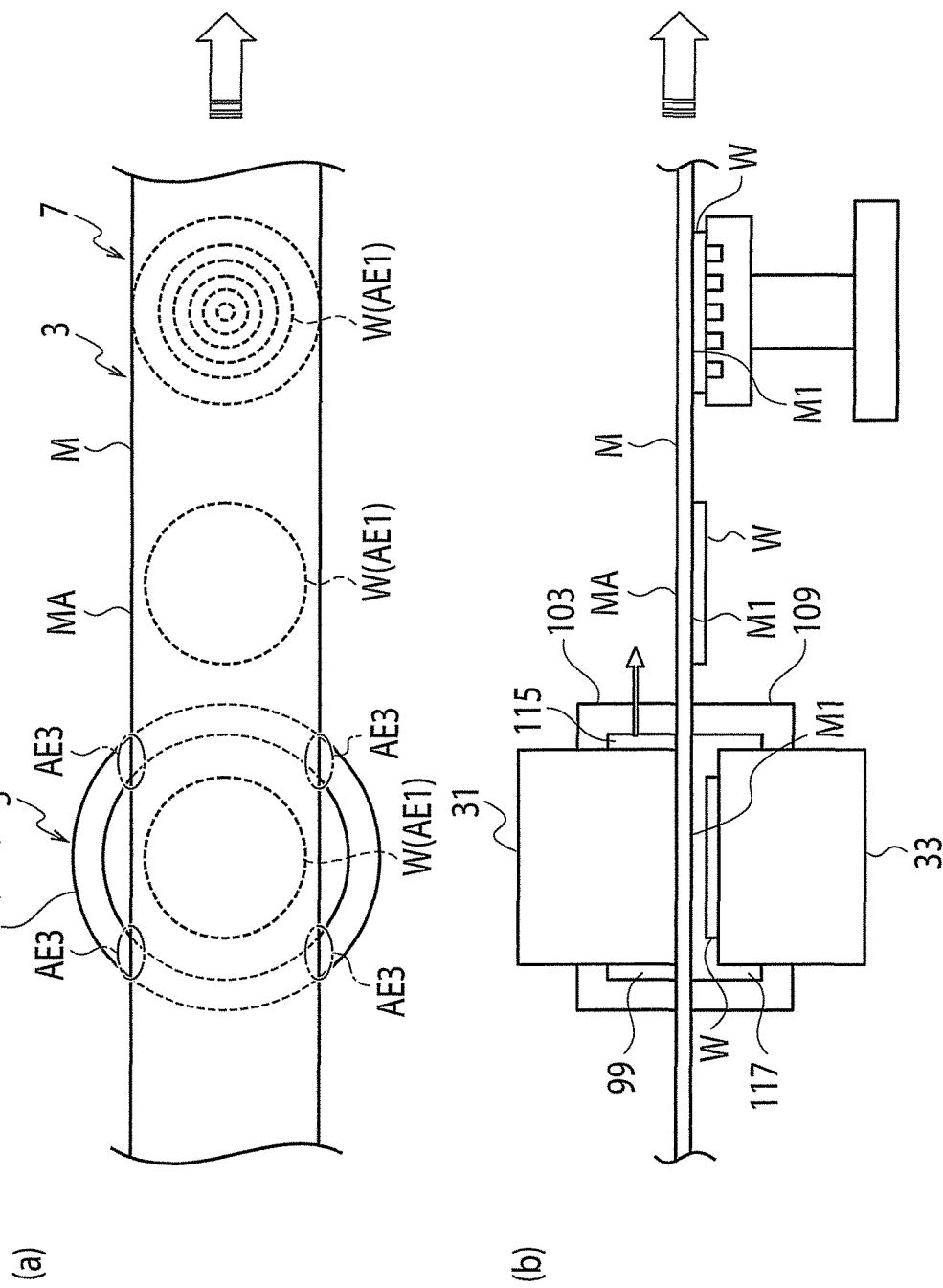

That is to say, as shown in FIG. 4(a), when the width of the flat sheet-shaped mold MA is smaller than the diameter of the respective annular contact members 103 and 109, slight gaps (gaps caused by the thickness of the sheet-shaped mold MA) occur in regions AE3 shown in FIG. 4(a), and air tightness of the vacuum molding chamber 99 is deteriorated. However, the air tightness of the vacuum molding chamber 99 can be enhanced by enlarging the width of the flat sheet-shaped mold MA more than the diameter of the respective annular contact members 103 and 109. Note that FIG. 4(a) is a plan view showing size and position relationships between such a narrow-width flat sheet-shaped mold MA and the respective contact members 103 and 109 and the like, and FIG. 4(b) is a side view showing the size and position relationships between the narrow-width flat sheet-shaped mold MA and the respective contact members 103 and 109 and the like.

With enlarging the width of the flat sheet-shaped mold MA more than the diameter of the respective annular contact members 103 and 109, the vacuum molding chamber 99 is formed by the respective bellows 101 and 107 and the like immediately before performing the transfer and at the time of performing the transfer. In this case, the vacuum molding chamber 99 is partitioned by the sheet-shaped mold MA, and the vacuum molding chamber 99 is formed into an upper vacuum molding chamber 115 and a lower vacuum molding chamber 117 (for example, refer to FIG. 11(b)).

The upper vacuum molding chamber 115 is a closed space in an inside of which the press body 31 is located, and the closed space is formed by the upper member 55, the bellows 101 and the sheet-shaped mold MA. The lower vacuum molding chamber 117 is a closed space in an inside of which the molting target placing body 33 and the molding target W are located, and the closed space is formed by the spacer 97, the bellows 107 and the sheet-shaped mold MA.

The lower vacuum molding chamber 117 and the upper vacuum molding chamber 115 communicate with each other by a pipe 119 extended out to outsides of these respective vacuum molding chambers 115 and 117. Then, by using a vacuum pump 121 shown in FIG. 1, it is possible to evacuate the respective vacuum molding chambers 115 and 117 simultaneously by the pipe 119. When such evacuation is performed, the respective vacuum molding chambers 115 and 117 is decompressed while keeping an equal atmospheric pressure. In such a way, flexure of the sheet-shaped mold MA can be eliminated.

Note that, when viewed from the above, for example, centers of the respective bellows 101 and 107, centers of the respective contact members 103 and 109, the center of the molding target W, the center of the press body 31 and the center of the transfer pattern forming area AE1 coincide with one another.

As mentioned above, and moreover, as shown in FIG. 21, the press body 31 includes the base material 37, the shock-absorbing material 35 and the mold contact material 39. The press body 31 is provided under a press body supporting body 123, and is provided integrally on the upper member 55 of the base member 47 through the press body supporting body 123. Note that the mold contact material 39 may be deleted.

The base material 37, the shock-absorbing material 35 and the mold contact material 39 are formed into a rectangular flat shape, for example. They are superimposed on one another in order of the base material 37, the shock-absorbing material 35 and the mold contact material 39 so that thickness directions thereof can coincide with one another. Moreover, on the press body supporting body 123, an ultraviolet ray generation device 125 that generates an ultraviolet ray curing the ultraviolet ray curing resin W2 of the molding target W is provided (for example, refer to FIG. 12(a))

In the transfer device 5, a mold holding mechanism 127 is provided (for example, refer to FIG. 13(b)). The mold holding mechanism 127 temporarily holds the sheet-shaped mold MA in order to prevent an occurrence of positional deviation of the flat sheet-shaped mold (sheet-shaped mold stopped without being conveyed) MA in such a case of performing the transfer.

The holding mechanism 127 is composed of, for example, suction pads 129 provided integrally on the base member 47. The suction pads 129 vacuum-suck the upper surface (opposite surface with the surface on which the fine transfer pattern M1 is formed) of the sheet-shaped mold MA, thus holding the sheet-shaped mold MA.

The suction pads 129 are provided in the vicinities of the transfer device 5 (respective contact members 103 and 109) on upstream and downstream sides in the conveying direction of the flat sheet-shaped mold MA. Moreover, although the suction pads 129 are provided integrally on the base member 47 as mentioned above, the suction pads 129 may be configured to move with respect to the base member 47. Then, when the flat sheet-shaped mold MA is stopped, the suction pads 129 may contact the flat sheet-shaped mold MA, and when the flat sheet-shaped mold MA is conveyed, the suction pads 129 maybe spaced apart from the flat sheet-shaped mold MA.

Figure 15:
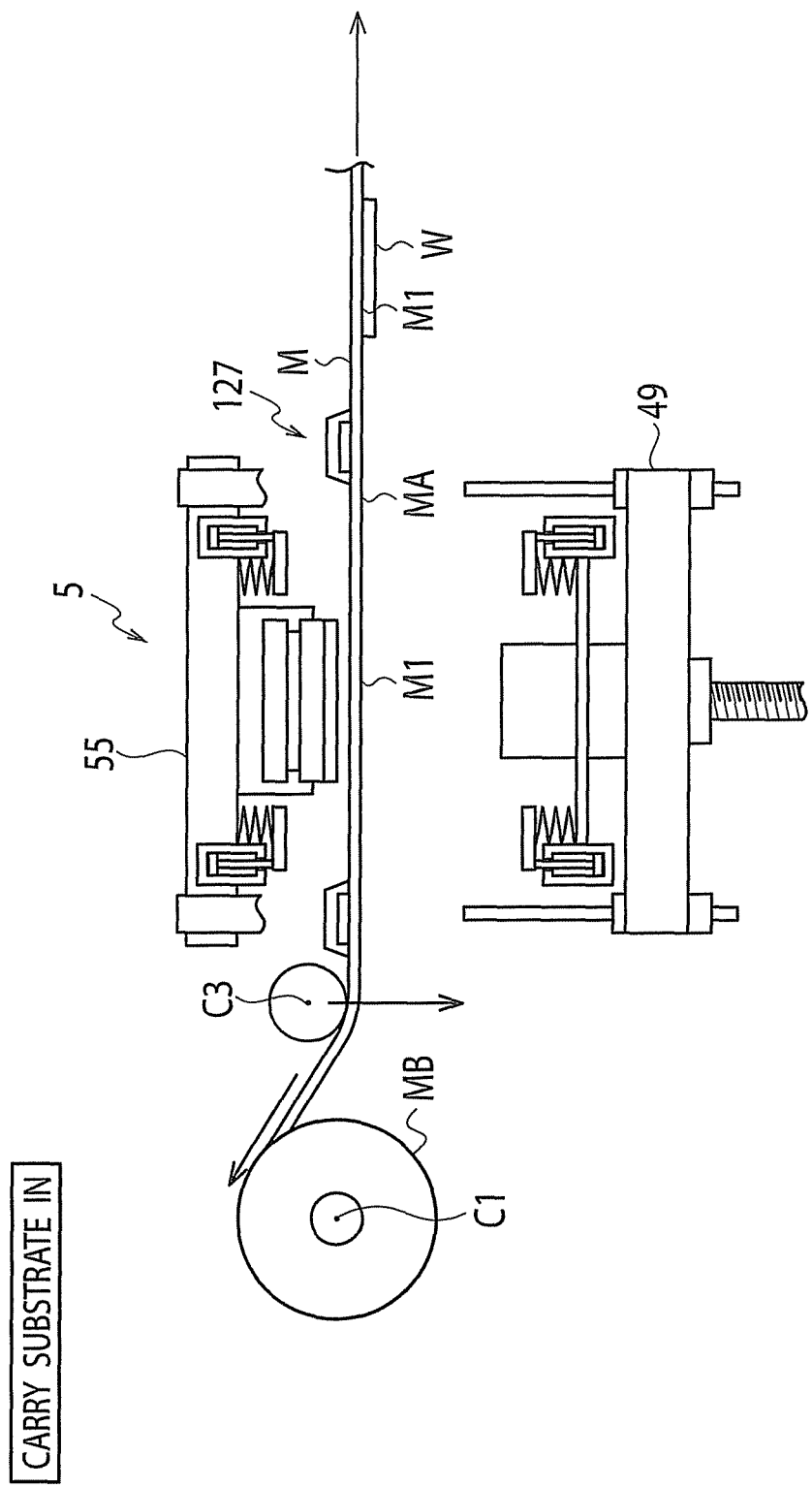
FIG. 15 is a view showing the outline and operation of the transfer device.

The mold holding mechanism 127 holds the flat sheet-shaped mold MA, for example, when the transfer is completed and the vacuum molding chamber 99 is eliminated. Note that the mold holding mechanism 127 is illustrated in FIG. 13(b), FIG. 14 and FIG. 15, but illustration thereof is omitted in other drawings.

Here, the description is further made of the transfer device 5

FIG. 27(a) is a schematic view of the transfer device 5.

As mentioned above, the transfer device 5 includes the base member 47, the third member (moving body) 49, and the supporting body (moving body supporting body) 51.

The base member 47 is integrally formed by including: the first member (upper member) 55 including: the first member (upper member) 55 including the first press portion (press body) 31; the second member (lower member) 53 spaced apart from the upper member 55 on the side (lower side) on which the press body 31 is provided; and the coupling members (tie bars) 57 which couple the upper member 55 and the lower member 53 to each other.

The moving body 49 is provided between the upper member 55 and the lower member 53, and is provided apart therefrom. The moving body 49 includes the second press portion (molding target placing body) 33 facing to the press body 31.

Moreover, the moving body 49 is movable linearly with respect to the base member 47 in the direction of connecting the upper member 55 and the lower member 53 to each other. For example, the moving body 49 is movable in the vertical direction.

Then, in accordance with the upward movement of the moving body 49, the molding target placing body 33 and the press body 31 cooperatively sandwich and press the sheet-shaped mold MA and the molding target W for the transfer.

The moving body 49 is driven (moved) by a drive device 193 including the servomotor 79 and the ball screw 77.

The moving body supporting body 51 includes the guide portion (linear guide bearing 71) on each part (side portion 61) thereof. Moreover, the moving body supporting body 51 is engaged with the lower member 53, and is provided integrally on the lower member 53 at a place of other parts (seats 65 of the base 59).

Accordingly, the moving body supporting body 51 engages with the lower member 53 only at the regions thereof in the vicinity of a center F2 of reaction force, and is provided integrally on the lower member 53. Here, the above-described reaction force is a reaction force generated in the lower member 53 when the drive device 193 moves the moving body 49 upward and the sheet-shaped mold MA and the molding target W are sandwiched and pressed.

When viewed from the above, the upper member 55 and the lower member 53 substantially overlap each other, and the center of the upper member 55, the center of the lower member 53 and the center of the moving body 49 substantially coincide with one another.

Furthermore, as mentioned above, the press body 31 protrudes downward from the flat surface (lower surface of the upper member 55) of the upper member 55, which faces to the lower member 53 (moving body 49), and a tip end surface (lower surface) of the press body 31 is parallel to the lower surface of the upper member 55.

Moreover, the molding target placing body 33 protrudes upward from the flat surface (upper surface of the moving body 49) of the moving body 49, which faces to the upper member 55, and a tip end surface (upper surface) of the molding target placing body 33 is parallel to the upper surface of the moving body 49.

When viewed from the above, the center of the lower surface of the press body 31, the center of the upper surface of the molding target placing body 33 and the center of the upper member 55 (lower member 53) substantially coincide with one another.

Moreover, the press by the drive device 193 (i.e. press to sandwich the sheet-shaped mold MA and the molding target W) is performed by applying a force to the lower member 53 and the moving body 49. Here, the force moves the moving body 49 away from the lower member 53.

When the sheet-shaped mold MA and the molding target W are sandwiched and pressed, reaction forces are generated in the upper member 55 and the lower member 53. The reaction force generated in the upper member 55 is upward. Alternatively, the reaction force generated in the lower member 53 is downward.

When viewed from the above, centers of the respective reaction forces described above coincide with the center of the upper member 55 (lower member 53).

In the transfer device 5, the moving body supporting body 51 engages with the lower member 53 only in the vicinity of the center of the lower member 53. Accordingly, even if the reaction force is generated in the lower member 53 by the press for the transfer, and the lower member 53 is slightly elastically deformed by this reaction force, the moving body supporting body 51 is less likely to be affected by an influence from this elastic deformation, and there is eliminated an occurrence of an error in alignment in the rails 73 of the linear guide bearings 71 of the moving body supporting body 51. Then, the moving body 49 can move accurately, and can perform the accurate transfer.

The description is made in detail with reference to FIG. 27(a). When the moving body 49 is elevated from the state shown in FIG. 27(a), and the press body 31 and the molding target placing body 33 sandwich and press the sheet-shaped mold MA and the molding target W, the reaction forces are generated in the upper member 55 and the lower member 53. Here, reference symbol F1 denotes the center of the reaction force (vector of the force) to be generated in the upper member 55, and reference symbol F2 denotes the center of the reaction force (vector of the force) to be generated in the lower member 53. The centers of the above-described respective reaction forces pass through the centers of the upper member 55 and the lower member 53, and are extended in the vertical direction.

Before the reaction forces are generated in the upper member 55 and the lower member 53, a neutral surface of the upper member 55 is a flat surface L4, a neutral surface of the lower member 55 is a flat surface L5, and the center axes of the tie bars 57 are straight lines L6 and L7.

When the reaction forces are generated in the upper member 55 and the lower member 53, by bending moments due to these reaction forces, the neutral surface of the upper member 55 becomes a curved surface L4A, the neutral surface of the lower member 53 becomes a curved surface L5A, and the center axes of the tie bars 57 become curved lines L6A and L7A. Note that the curved surface L4A is a circular arc curved line in FIG. 27(a) since the line is shown two-dimensionally.

As can be understood from the above-mentioned curved surface L5A, at regions of a point P8 and point P9 of the lower member 53, a flexure angle of the lower member 53 is large by a bending moment generated by the reaction force. Hence, if the lower member 53 is supported at the regions of the point P8 and the point P9, the side portion 61 (61A, 61B) of the moving body supporting body 51 is not extended straight in the vertical direction, but is inclined very slightly. That is to say, a distance between the side portion 61A and the side portion 61B on a lower end portion of the side portion 61 becomes very slightly larger than a distance between the side portion 61A and the side portion 61B on an upper end portion of the side portion 61. Then, there occurs a case where the moving body 49 cannot move accurately.

In contrast, the moving body supporting body 51 is supported to the lower member 53 in the vicinity of a point P5 (center F2 of the reaction force) of the lower member 53. Accordingly, even if the lower member 53 is elastically deformed very slightly by the bending moment generated by the reaction force, the flexure angle of the lower member 53 becomes "0" or a value very approximate to "0" at the region of the point P5 and the region in the vicinity thereof. That is to say, a tangential line on the curved line L5A becomes substantially horizontal. Hence, the moving body supporting body 51 turns to a moment-free state with respect to the base member 47, and the side portion 61 of the moving body supporting body 51 comes not to be inclined, the moving body 49 can be moved accurately, and the accurate transfer can be performed.

Incidentally, such a structure shown in FIG. 27(a) may be changed as appropriate.

FIG. 27(b) is a view showing a modification example of the transfer device 5, and is a view corresponding to FIG. 27(a).

A transfer device 5a shown in FIG. 27(b) is different from the transfer device 5 shown in FIG. 27(a) in that a Plate-like mold MD with a predetermined thickness is used in place of the sheet-shaped mold MA, and in other points, the transfer device 5a is configured in a similar way to the transfer device 5, and exerts similar effects to those thereof.

In the transfer device 5a shown in FIG. 27(b), the mold MD is provided, for example, integrally to the press body 31.

Figure 28:
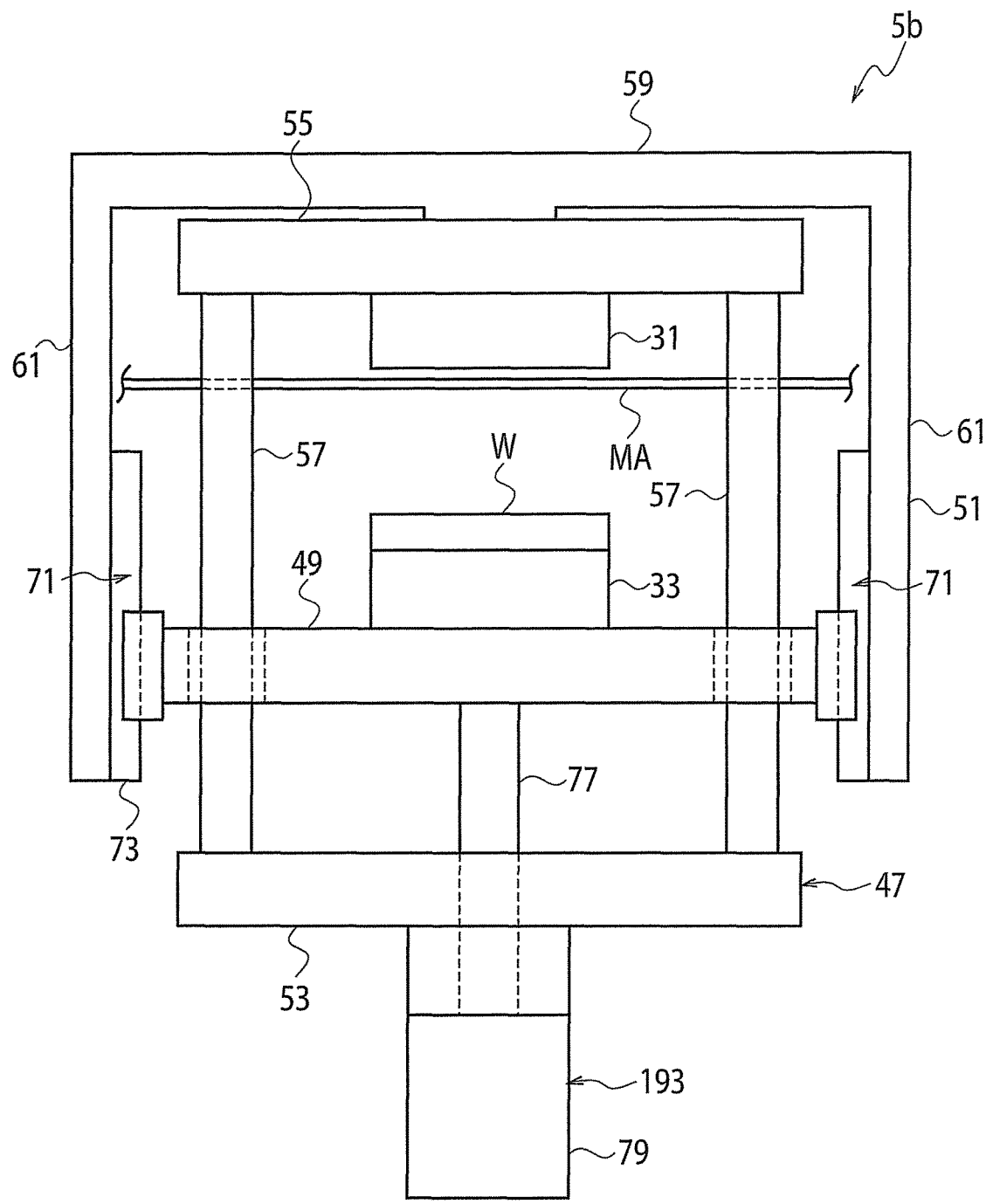
FIG. 28 is a schematic view of the transfer device according to the modification example.

FIG. 28 is a view showing a modification example of the transfer device 5, and is a view corresponding to FIG. 27(a).

In the transfer device 5 (transfer device shown in FIG. 27(a)), the moving body supporting body 51 is provided on the lower member 53. A transfer device 5b shown in FIG. 28 is different from the transfer device 5 in that the moving body supporting body 51 is provided on the upper member 55, and in other points, the transfer device 5b is configured in a similar way to the transfer device 5, and exerts similar effects to those thereof.

In the transfer device 5b shown in FIG. 28, there is no interference with the servomotor 79, and accordingly, only at the region of the center F1 of the reaction force (reaction force to be generated in the upper member 55 when the sheet-shaped mold MA and the molding target W are sandwiched and pressed), the moving body supporting body 51 is engaged with the upper member 55, and is provided integrally on the upper member 55. That is to say, the moving body supporting body 51 is engaged with the upper member 55 at the region (region where the flexure angle becomes substantially "0") of the point P4 shown in FIG. 27(a), and accordingly, similar effects to those in the case of the transfer device 5 are exerted.

In the transfer device 5b shown in FIG. 28, only at the region in the vicinity of the center F1 of the above-described reaction force, the moving body supporting body 51 may be engaged with the upper member 55 and provided integrally on the upper member 55, or only at the region of the center F1 of the above-described reaction force and the region in the vicinity of the center F1 of the above-described reaction force, the moving body supporting body 51 may be engaged with the upper member 55 and provided integrally on the upper member 55.

FIGS. 29(a) and 29(b) are views showing a modification example of the transfer device 5, and are views corresponding to FIG. 27(a).

In the transfer device 5 shown in FIG. 27(a), the moving body supporting body 51 and the drive device 193 are provided on the lower member 53. Instead, in a transfer device Sc shown in FIG. 29(a), the moving body supporting body 51 and the drive device 193 are provided on the upper member 55. In the transfer device 5b shown in FIG. 28, the moving body supporting body 51 is provided on the upper member 55, and the drive device 193 is provided on the lower member 53. Instead, in a transfer device 5d shown in FIG. 29(b), the moving body supporting body 51 is provided on the lower member 53 and the drive device 193 is provided on the upper member 55.

FIG. 30(a) is a view showing a modification example of the transfer device 5, and is a view corresponding to FIG.

27(a), and FIG. 30(b) is a B arrow view in FIG. 30(a). FIG. 31 is a view showing a moving body supporting body 51a in a transfer device 5e shown in FIGS. 30(a) and 30(b). Note that FIG. 31 is a B-B cross-sectional arrow view in FIG. 31(a).

In the transfer device 5e shown in FIGS. 30(a) and 30(b), the moving body supporting body 51a is engaged with the tie bars 57 at center portions in the longitudinal direction of the tie bars 57, and is provided integrally on the tie bars 57. In such a way, the moving body supporting body 51 is engaged with the tie bars 57 at regions (regions where the flexure angle becomes substantially "0") of points P6 and P7 shown in FIG. 27(a), and similar effects to those in the case of the transfer device 5 are exerted.

Each of the above-mentioned transfer devices 5 to 5e is an example of a transfer device that transfers, a fine transfer pattern formed on a mold to a molding target. This transfer device includes: a base member having a first press portion; a moving member (moving body) having a second press portion that sandwiches and presses the mold and the molding target in cooperation with the first press portion, the moving member being provided on the base member so as to linearly move in a direction where the second press portion approaches or leaves the first press portion; and a supporting body (moving body supporting body) including a guide portion that guides the movement of the moving member, the supporting body being engaged with the base member and provided integrally on the base member only at an elastically deformed region of the base member, in which a flexure angle by elastic deformation is substantially "0", the elastically deformed region being elastically deformed very slightly by reaction force when the press is performed (by a moment to be generated in the base member by reaction force when the mold and the molding target are sandwiched and pressed by the respective press portions).

As shown in FIG. 22, the sheet-shaped mold production device 27 produces the unused rolled mold MB by a roll-to-roll method. The sheet-shaped mold production device 27 includes: the transfer roll 131 that rotates about an axis C7 taken as a center; a backup roll 133 that rotates about an axis C6 taken as a center; a raw material placing device 135 that places the sheet-shaped raw material (unused rolled material) M2 thereon; and a mold rolling-up device 137 that takes up the sheet-shaped mold M.

The sheet-shaped raw material M2 has both surfaces flatly formed in the thickness direction thereof. The sheet-shaped raw material M2 is rolled in a similar way to the unused rolled mold MB. The sheet-shaped raw material M2 is composed of a resin material such as PET resin, and is rolled up around a columnar core material to serves as an unused rolled material.

The fine transfer pattern is transferred and provided onto the sheet-shaped raw material M2 supplied from the unused rolled material placed on the raw material placing device 135, and the sheet-shaped raw material thus transferred is taken up by the mold rolling-up device 137. Then, the unused rolled mold MB is created.

The unused rolled material placed on the raw material placing device 135 rotates about an axis C5 taken as a center. The unused rolled mold MB to be rolled up by the mold rolling-up device rotates about an axis C9 taken as a center. A tension roller 139 is provided between the transfer roll 131 and the mold rolling-up device 137. The tension roller 139 rotates about an axis C8 taken as a center.

The description is further made. Between the raw material placing device 135 and the mold rolling-up device 137, a nozzle 141 coats the liquid ultraviolet curing resin W2 in a film shape on one surface of the sheet-shaped raw material M2 supplied from the unused rolled material. Subsequently, the sheet-shaped raw material M2 coated with the liquid ultraviolet curing resin W2 is wound around the transfer roll 131, and it is sandwiched by the transfer roll 131 and the backup roll 133. An ultraviolet ray emitted from an ultraviolet ray generation device 143 is irradiated onto the ultraviolet curing resin W2, thus being cured. Consequently, the fine transfer pattern formed in advance on a columnar side surface-like outer circumferential surface of the transfer roll 131 is transferred to the ultraviolet curing resin W2 from the transfer roll 131. Then, as shown in FIG. 24(a), the transfer pattern M1 is formed.

The edge line L1 shown in FIG. 24(a) is formed between the transfer pattern forming areas AE1 (a pair of the transfer pattern forming areas AE1 adjacent to each other) provided at a predetermined interval in the longitudinal direction of the sheet-shaped mold M. The edge line L1 is formed by a seam of an outer circumference of the transfer roll 131. This seam linearly extends in a direction perpendicular to a paper surface of FIG. 22 at a spot of a point P2 shown in FIG. 22. Note that the seam is formed by a butting portion of end portion of a rectangular thin flat original mold. The butting portion is formed when the original mold, which has a fine transfer pattern formed on one surface thereof in its thickness direction, is placed integrally on the outer circumference of the transfer roll 131. The actual edge line L1 is formed of a protruding portion that linearly protrudes very slightly or a recessed portion that is recessed very slightly, the protruding portion or the recessed portion being formed on the sheet-shaped mold M (cured ultraviolet curing resin attached in the film shape onto the raw material M2)

Figure 23:
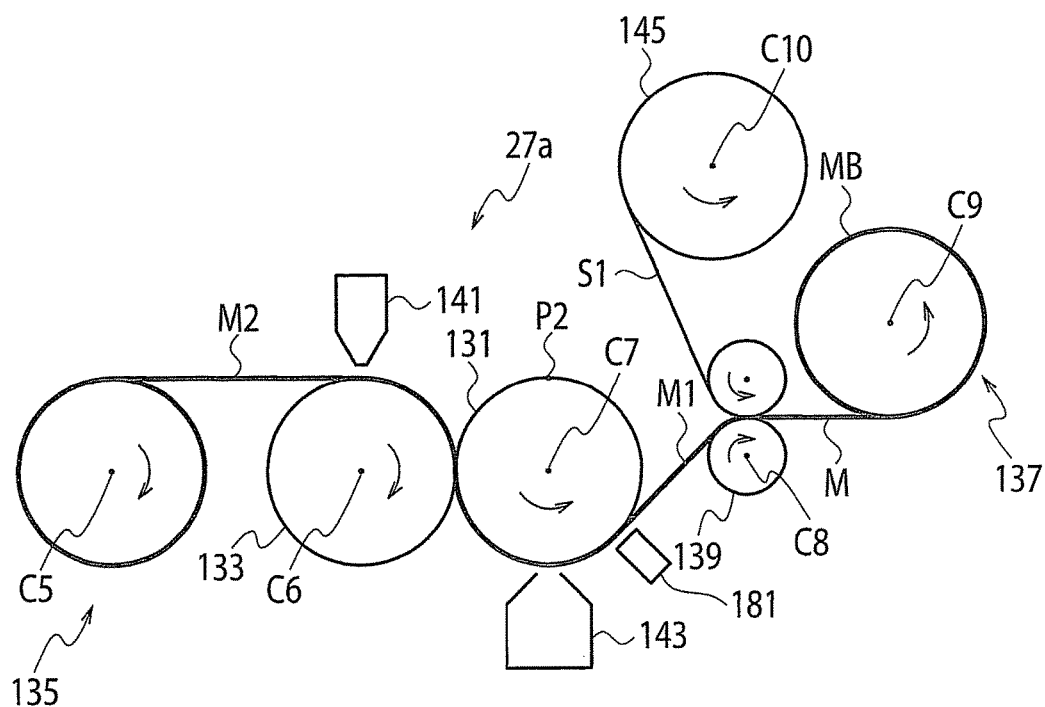
FIG. 23 is a view showing an outline of a sheet-shaped mold production device according to a modification example.

In the sheet-shaped mold production device 27 shown in FIG. 22, the laminate films S1 may be placed (refer to FIG. 23). In a sheet-shaped mold production device 27a shown in FIG. 23, the laminate films S1 are supplied to the sheet-shaped raw material M2 to which the fine transfer pattern is transferred. Therefore, in the unused rolled mold MB formed by being rolled up by the mold rolling-up device 137, the laminate films S1 enter in between the sheet-shaped molds M.

That is to say, the laminate films S1 are supplied from laminate roll 145 that rotates about an axis C10 taken as a center. Then, in the unused rolled mold MB formed by being rolled up by the mold rolling-up device 137, the thickness direction of the sheet-shaped mold M and the thickness direction of the laminate films S1 coincide with a radial direction of the unused rolled mold MB. In addition, the sheet-shaped mold M and the laminate films S1 overlap each other (refer to FIG. 24(c)). In such a way, mutual clinging of the sheet-shaped mold M in the unused rolled mold MB can be prevented, and it becomes easy to supply the sheet-shaped mold M from the unused rolled mold MB.

Such a laminate film S1 may have the same width as that of the sheet-shaped mold M, and may be provided to cover the entire surface of the sheet-shaped mold M. However, in this embodiment, the laminate films S1 are provided on a part of the sheet-shaped mold M.

For example, the width of the laminate films S1 is thinned, and the laminate films S1 are provided only on both end portions (a part of the transfer pattern non-forming area AE2) in the width direction of the sheet-shaped mold M (refer to FIGS. 24(a), 24(b), 24(c)). In such a way, as mentioned above, in the unused rolled mold MB, as shown in FIG. 24(c), the fine transfer pattern M1 of the sheet-shaped mold M does not contact or is less likely to contact the back surface (surface opposite with the surface on which the fine transfer pattern M1 is formed) of the sheet-shaped mold M opposite thereto, and the fine transfer pattern M1 can be prevented from being scratched.

Note that a shape of the laminate films S1 may be changed as appropriate. Such a configuration may be adopted, in which regions shown by chain double-dashed lines L3 in FIG. 24(a) are added, and the laminate films S1 are formed into a ladder shape so as to surround the transfer pattern forming areas AE1. In other words, the laminate films S1 are formed into a shape obtained by providing rectangular through holes at a predetermined interval on portions corresponding to the transfer pattern forming areas AE1.

When providing the laminate films S1 on the unused rolled mold MB, the laminate films S1 are configured to be peeled off and rolled up by a laminate film peeling device 145 shown by a chain double-dashed line in FIG. 9(a).

As shown in FIG. 16(a) and the like, the peeling device 7 includes a base member 147, a molding target holding portion 149, a mold holding portion 151, a mold sandwiching portion 153 and a demolding portion 155.

The molding target holding portion 149 includes a molding target holding body 157 having a flat upper surface. The molding target holding body 157 is provided in the base member 147 so as to be capable of freely moving and being positioned in the vertical direction. Specifically, the molding target holding body 157 is provided on the base member 147 through a linear guide bearing 159, and moves in the vertical direction by an actuator such as an air cylinder (not shown). Moreover, an upper surface of the molding target holding body 157 is brought into surface contact with the lower surface of the molding target W attached onto the flat sheet-shaped mold MA after the transfer in the transfer device 5. Accordingly, the molding target W (base material W1) is hold, for example, by vacuum suction.

The mold holding portion 151 includes a mold holding body 161 having a flat lower surface. The mold holding body 161 is provided on the base member 147 and above the molding target holding body 157. Above the molding target holding body 157, the lower surface of the mold holding body 161 faces to the upper surface of the molding target holding body 157. Then, the lower surface of the mold holding body 161 is brought into surface contact with the upper surface of the flat sheet-shaped mold MA onto which the molding target W is attached after the transfer, and the mold holding body 161 is configured to hold the flat sheet-shaped mold MA, for example, by vacuum suction.

The conveying/positioning device 3 conveys and positions the sheet-shaped mold MA so that the mutually attached flat sheet-shaped mold MA and molding target W by the transfer can be located between the upper surface of the molding target holding body 157 and the lower surface of the mold holding body 161, which face to each other. Moreover, the thickness directions of the sheet-shaped mold MA and the molding target W are perpendicular to the upper surface of the molding target holding body 157 and the lower surface of the mold holding body 161.

The molding target W to which the transfer is performed by the transfer device 5 is conveyed from the transfer device 5 to the peeling device 7 while the sheet-shaped mold MA attached thereon is left. In this regard, between the transfer device 5 and the peeling device 7, one or a plurality of the molding targets (molding targets attached onto the sheet-shaped mold MA) W may exist at a predetermined interval (the pitch p1 shown in FIG. 24(a)) (for example, refer to FIGS. 5(a) and 5(b). In such a way, it is possible to enlarge a distance between the transfer device 5 and the peeling device 7.

Moreover, as already understood, when the molding target holding body 157 is located at a rising end thereof, the upper surface of the molding target holding body 157 comes to contact the molding target W attached onto the flat sheet-shaped mold MA. Meanwhile, when the molding target holding body 157 is located at a lowering end thereof, the upper surface of the molding target holding body 157 is spaced apart from the molding target W by a predetermined distance below the molding target W attached onto the flat sheet-shaped mold MA.

The mold holding body 161 is provided on the base member 147. The mold holding body 161 rotates about an axis C12, as a rotation center. The axis C12 is located on the upstream side (left side in FIG. 16(a)) in the conveying direction of the flat sheet-shaped mold MA, and extends in the width direction of the flat sheet-shaped mold MA. Then, in a normal state, the lower surface of the mold holding body 161 is set horizontal by a stopper (not shown), and is brought into contact with the horizontal upper surface of the sheet-shaped mold MA. Moreover, when the mold holding body 161 rotates, the downstream side of the mold holding body 161 is lifted up, and thus slightly inclined (refer to FIG. 18(a) and the like).

The mold sandwiching portion 153 is provided on the mold holding body 161 on the downstream side in the conveying direction of the flat sheet-shaped mold MA. The mold sandwiching portion 153 includes a mold sandwiching body 163 formed into a bar-like shape, and the mold sandwiching body 163 has a thin flat upper surface. This upper surface faces to the lower surface of the mold holding body 161, a longitudinal direction of the upper surface coincides with the width direction of the flat sheet-shaped mold MA. Further, a width direction of an upper surface of the mold sandwiching body 163 coincides with the longitudinal direction (left and right direction of FIG. 16(a)) of the flat sheet-shaped mold MA flat sheet-shaped mold MA.

The mold sandwiching body 163 is provided on the mold holding body 161 through a linear guide bearing (not shown) so as to be freely movable in a direction of approaching and leaving the mold holding body 161.

Then, when the mold sandwiching body 163 moves to a mold holding body 161 side by an actuator such as an air cylinder 165, the mold sandwiching body 163 sandwiches the sheet-shaped mold MA in cooperation with the mold holding body 161 (for example, refer to FIG. 17(b)). Alternatively, when the mold sandwiching body 163 moves away from the mold holding body 161, the sandwiching of the sheet-shaped mold MA is released.

Note that the mold sandwiching body 163 is provided at a position of not interfering with the molding target holding body 157. Moreover, the mold sandwiching body 163 and the mold holding body 161 are configured not to sandwich the molding target W therebetween.

The demolding portion 155 is provided on the base member 147 on the downstream side in the conveying direction of the flat sheet-shaped mold MA. The demolding portion 155 includes a demolding body 167. The demolding body 167 is raised by an actuator such as an air cylinder 169, whereby the demolding body 167 pushes up and rotates the mold holding body 161 (mold sandwiching body 163), and inclines the lower surface of the mold holding body 161 as mentioned above. In a state where the mold holding body 161 is not pushed up by the demolding body 167, the demolding body 167 is located downward, and is spaced apart from the mold holding body 161 (mold sandwiching body 163).

Moreover, downstream of the peeling device 7 in the conveying direction of the flat sheet-shaped mold MA, a mold length adjustment device (tension maintaining device) 171 is provided.

The tension maintaining device 171 maintains the tension of the flat sheet-shaped mold MA substantially constantly so that the sheet-shaped mold MA is not loosened or that the sheet-shaped mold MA is not cut owing to an excessive tension even if the form (for example, an extension route of the flat sheet-shaped mold MA existing between the transfer device 5 and the mold rolling-up device 11) of the flat sheet-shaped mold MA is changed (for example, is changed so that the flat sheet-shaped mold MA can be inclined as shown from FIG. 17(b) to FIG. 18(a)) by being peeled off by the peeling device 7 (when the peeling device 7 performs the peeling).

Irrespective of the form of the flat sheet-shaped mold MA, the tension of the flat sheet-shaped mold MA is maintained substantially constantly by the tension maintaining device 171. Accordingly, when the molding target W is peeled off from the flat sheet-shaped mold MA, the sheet-shaped mold MA can be prevented from being loosened and cut, and the transfer device 5 can be operated smoothly.

Note that, as already understood, the transfer device 5 performs the transfer by using the flat sheet-shaped mold MA which is positioned and stopped after the conveyance thereof. The peeling device 11 performs the peeling when the flat sheet-shaped mold MA and the molding target W are sandwiched by the transfer device 5 in addition to a condition where the conveyance of the flat sheet-shaped mold MA is stopped.

Moreover, the peeling device 11 performs the peeling in such a manner that the mold holding body 161 sucks and holds aback surface (surface opposite with the surface on which the fine transfer pattern is formed; upper surface) of the sheet-shaped mold MA attached to the molding target W, the molding target holding body 157 sucks and holds a back surface (surface opposite with the surface on which the fine transfer pattern is formed; lower surface) of the molding target W attached to the flat sheet-shaped mold MA, and the mold holding body 161 rotates (refer to FIG. 18(a)).

The molding target W and the flat sheet-shaped mold MA, which are attached onto each other, exist between the mold rolling-up device 11 and the spot where the transfer is performed by the transfer device 5.

As mentioned above, the peeling in the peeling device 11 is completed, for example, when a linear boundary moves from one end portion in the longitudinal direction of the sheet-shaped mold MA to other end portion therein (for example, from right to toward left in FIGS. 17(a) and 17(b) and FIGS. 18(a) and 18(b)) and such movement is completed. Here, The linear boundary is a boundary extending in the width direction of the sheet-shaped mold MA, and is between a region where the peeling is completed and a region where the peeling is still uncompleted.

The tension maintaining device 171 maintains the tension of the flat sheet-shaped mold MA between the spot where the transfer is performed by the transfer device 5 and the mold rolling-up device 11. Then, as mentioned above, the mold holding body 161 rotates, whereby the form of the flat sheet-shaped mold MA is changed between the spot where the transfer is performed by the transfer device 5 and the mold rolling-up device 11; however, even in the case of this change, the tension of the flat sheet-shaped mold MA is maintained at a substantially constant value.

In the conveying/positioning device 3, when the flat sheet-shaped mold MA and the molding target W are sandwiched in order to perform the transfer, the peeling between the flat sheet-shaped mold MA and the molding target W is performed. Accordingly, even if the peeling is performed, the positional deviation of the sheet-shaped mold MA does not occur in the transfer device 5, and an occurrence of a transfer failure can be avoided.

Moreover, the tension of the flat sheet-shaped mold MA just needs to be maintained constantly in a relatively short range between the transfer device 5 and the mold rolling-up device 11, and accordingly, a value of the tension can be set at an accurate one approximate to a target value.

A description is made in detail of the mold length adjustment device (tension maintaining device) 171 with referring to an example. The mold length adjustment device 171 includes: guide rails 173 supported integrally on the base member 147; a bearing member 175 engaged with the guide rails 173 and made freely movable in the vertical direction; and a roller 177 provided on this bearing ember 175 so as to be rotatable about, as a rotation center, an axis (axis parallel to the axis C12 and the axis C3 shown in FIG. 9(a)).

The roller 177 exists between the spot where the transfer is performed by the transfer device 5 and the mold rolling-up device 11 (more specifically, between the peeling device 7 and the mold rolling-up device 11). The roller 177 is located above the flat sheet-shaped mold MA, and the sheet-shaped mold MA is wound around a lower side of the roller 177.

In such a way, the back surface (upper surface) of the sheet-shaped mold MA, which is the surface opposite with the surface on which the fine transfer pattern M1 is formed, is brought into contact with the roller 177.

A biasing device 197 (refer to FIG. 16(a)) is provided in the mold length adjustment device 171. The biasing device 197 biases the roller 177 in a direction (downward direction in FIG. 16(a)) of applying a tension to the flat sheet-shaped mold MA wound around the roller 177, and in addition, with substantially constant force irrespective of a position of the roller 177. That is to say, the biasing device 197 biases the roller 177 so as to apply an appropriate tension to the flat sheet-shaped mold MA.

Specifically, the biasing device 197 includes: an air cylinder (not shown); and an air pressure control instrument (for example, a regulator and a relief valve) that controls a pressure of air to be supplied to this air cylinder at a constant value.

For example, the bearing member 175 biases the sheet-shaped mold MA downward with constant force by the biasing device 197. Specifically, the bearing member 175 is biased by an air pressure cylinder (not shown). The regulator and the relief valve (either thereof is not shown) are connected to a pipe for compressed air supplied to the air pressure cylinder, whereby it is made possible to always apply constant urging force to the bearing member 175 irrespective of an extension amount of a rod from the air pressure cylinder.

In the conveying/positioning device 3, the tension maintaining device 171 includes the roller 177 and the air cylinder. Accordingly, with a simple configuration, the tension of the flat sheet-shaped mold MA can be maintained substantially constantly without performing complicated control.

Moreover, the compressed air supplied to the air cylinder is gas provided with compressibility, and accordingly, even in the case where a sudden change occurs in the form of the flat sheet-shaped mold MA owing to some cause, the tension can be adjusted in response to the sudden change concerned. Hence, even in the case where such a sudden form change occurs in the flat sheet-shaped mold MA, the sheet-shaped mold MA can be prevented from being cut, and so on.

Note that, desirably, mass of the roller 177 or the like is as small as possible. Moreover, in the case where the mass of the roller 177 or the like is large, the roller 177 or the like may be biased by the air cylinder in a direction of reducing weight of the roller 177 or the like (upward). In this case, the tension is applied to the sheet-shaped mold MA by the reduced weight of the roller 177 or the like.

Moreover, in the conveying/positioning device 3, the roller 177 of the tension maintaining device 171 contacts the back surface of the sheet-shaped mold MA, and accordingly, the fine transfer pattern M1 formed on the sheet-shaped mold MA can be prevented from being scratched, and depending on the case, it becomes possible to reuse the sheet-shaped mold MA.

Note that, in FIG. 16(a) and the like, the mold holding body 161 rotates about, as a rotation center, the axis C12 located on the upstream side in the conveying direction of the sheet-shaped mold MA, whereby the mold length adjustment device 171 is provided between the peeling device 7 and the mold rolling-up device 11.

In contrast, the mold holding body 161 may be configured to rotate about, as a rotation center, an axis located on the downstream side in the conveying direction of the sheet-shaped mold MA, and the mold length adjustment device 171 may be provided between the transfer device 5 and the peeling device 7.

At the time of conveying the flat sheet-shaped mold MA by the conveying/positioning device 3, as shown in FIG. 16(a) and the like, the upper surface of the molding target holding body 157 is located below the sheet-shaped mold MA and the molding target W, and is spaced apart from the sheet-shaped mold MA and the molding target W, and the lower surface of the mold holding body 161 is set horizontal and is brought into contact with the upper surface of the sheet-shaped mold MA, or is spaced apart therefrom very slightly. Moreover, the demolding body 167 is located downward, and the mold sandwiching body 163 is also located downward, and does not sandwich the mold.

When the conveyance of the flat sheet-shaped mold MA in the conveying/positioning device 3 is ended, and the molding target W is peeled off from the sheet-shaped mold MA, for example, as shown in FIG. 17(a), a configuration is adopted, in which the molding target holding body 157 rises, and holds the molding target W by the vacuum suction, and the sheet-shaped mold MA is held by the mold holding body 161 by the vacuum suction.

Then, as shown in FIG. 18(a), the mold sandwiching body 163 and the mold holding body 161 sandwiches the sheet-shaped mold MA, the mold holding body 161 (mold sandwiching body 163) rotates by the rising of the demolding body 167, and the sheet-shaped mold MA and the molding target W are separated from each other. At this time, a change occurs in the length of the flat sheet-shaped mold MA extended between the unused-mold placing device 9 (transfer device 5) and the mold rolling-up device 11, and accordingly, this change is absorbed by the mold length adjustment device 171, whereby it is made possible to rotate the mold holding body 161 (mold sandwiching body 163) without generating an unnecessary tension in the sheet-shaped mold MA (while keeping the tension substantially constant).

The base member 147 of the mold peeling device 7 is provided integrally on the bed 45. Moreover, the peeing of the molding target W from the sheet-shaped mold MA in the mold peeling device 7 is performed when the transfer by the transfer device 5 is performed (more specifically, when the sheet-shaped mold MA and the molding target W are sandwiched by the press body 31 and the molding target placing body 33).

Next, a description is made of operations of the transfer system 1.

In an initial state, as shown in FIG. 9(a), the unused rolled mold MB is placed on the unused-mold placing device 9, and the flat sheet-shaped mold MA exists with an appropriate tension between the mold rolling-up device 11 and the unused-mold placing device 9. Moreover, the transfer pattern forming area AE1 of the sheet-shaped mold MA is located at the position where the transfer by the transfer device 5 is performed.

The vacuum molding chamber 99 of the transfer device 5 is open, (the respective bellows 101 and 107 are contracted), the moving body 49 is lowered, and the ultraviolet ray generation device 125 is stopped and does not generate the ultraviolet ray. Note that the distance (distance between the lower surface of the press body 31 and the upper surface of the flat sheet-shaped mold MA) L2 shown in FIG. 2(a) is a very slight distance in actual.

Moreover, in the above-described initial state, as shown in FIG. 16(a), the molding target holding body 157 of the peeling device 7 is lowered, the mold holding body 161 does not rotate, and the lower surface of the mold holding body 161 is set horizontal. The mold sandwiching body 163 is located downward, and does not sandwich the sheet-shaped mold MA, and the demolding body 167 is located downward, and does not push up the molding target holding body 157. Moreover, the sheet-shaped mold MA attached onto the molding target W is located at the appropriate position suitable for the peeling by the peeling device 7.

First, a description is made of operations of the transfer device 5.

In the above-described initial state, under the control of the control device 179, the molding target W before the transfer is placed on the molding target placing body 33 of the transfer device 5 by the first conveying device 15 (refer to FIG. 9(b)).

Subsequently, the respective bellows 101 and 107 are extended by the respective air cylinders 105 and 111 (refer to FIG. 10(a)), and the moving body 49 is raised, whereby the vacuum molding chamber 99 is formed (refer to FIG. 10(b)). The inside of the vacuum molding chamber 99 is decompressed by a vacuum pump (refer to FIG. 2 and the like) 121, and is turned to a substantially vacuum state (refer to FIG. 11(a)).

Subsequently, while maintaining the vacuum molding chamber 99, the upper air cylinders 105 are set at the intermediate position, and the moving body 49 is further raised very slightly, whereby the flat sheet-shaped mold MA is brought into contact with the press body 31 (mold contact material 39) (refer to FIG. 11(b) and the like). Then, the moving body 49 is further raised slightly, whereby the molding target W and the sheet-shaped mold MA are sandwiched and pressed by the press body 31 and the molding target placing body 33, and the ultraviolet ray to be mitted by the ultraviolet ray generation device 125 is irradiated onto the ultraviolet curing resin W2 of the molding target W, whereby the ultraviolet curing resin W2 is cured (refer to FIG. 12(a)).

Subsequently, the vacuum molding chamber 99 is returned to the atmospheric pressure (refer to FIG. 12(b)), the upper contact member 103 is lowered by the upper air cylinder 105, and in addition, the moving body 49 is lowered very slightly, whereby the sheet-shaped mold MA and the molding target W, which are attached onto each other, are separated from the press body 31 and the molding target placing body 33 (refer to FIG. 13(*a*)).

Subsequently, the sheet-shaped mold MA is held by the mold holding mechanism 127 (refer to FIG. 13(*b*)), and the respective upper and lower bellows 101 and 107 are contracted by the respective air cylinders 105 and 111, whereby the vacuum molding chamber 99 is opened (eliminated, refer to FIG. 14(*a*)), and then the moving body 49 is further lowered (refer to FIG. 14(*b*).

Subsequently, the holding of the sheet-shaped mold MA by the mold holding mechanism 127 is stopped, and the sheet-shaped mold MA is conveyed to the peeling device 7 by the conveying/positioning device 3 while leaving the molding target W attached thereonto (refer to FIG. 15), and the transfer device 5 is ready for next transfer.

Next, a description is made of operations of the peeling device 7.

In the above-described initial state, under the control of the control device 179, the molding target holding body 157 is raised, whereby the sheet-shaped mold MA and the molding target W are sandwiched by the molding target holding body 157 and the mold holding body 161 (refer to FIG. 16(*b*)), the molding target W is held by the molding target holding body 157 by the vacuum suction, and the sheet-shaped mold MA is held by the mold holding body 161 by the vacuum suction (refer to FIG. 17(*a*))

Subsequently, the mold sandwiching body 163 is raised, whereby the sheet-shaped mold MA is sandwiched between the mold sandwiching body 163 and the mold holding body 161 (refer to FIG. 17(*b*)), then the demolding body 167 is raised, and the mold holding body 161 is rotationally moved, whereby the sheet-shaped mold MA is peeled off from the molding target (post-transfer molding target) W (refer to FIG. 18(*a*)), and then the molding target holding body 157 is lowered (refer to FIG. 18(*b*)).

Subsequently, the vacuum suction by the molding target holding body 157 is stopped (refer to FIG. 19(*a*)), the molding target W is carried out by the second conveying device 19 (refer to FIG. 19(*b*)), the demolding body 167 is lowered to horizontally set the lower surface of the mold holding body 161, the mold sandwiching body 163 is lowered to stop the sandwiching of the sheet-shaped mold MA, and the vacuum suction by the mold holding body 161 is stopped (refer to FIG. 20(*a*)), then the sheet-shaped mold MA is conveyed by the conveying/positioning device 3, and the above-mentioned initial state is returned (refer to FIG. 20(*b*)).

In the transfer system 1, the transfer is performed by the transfer device 5, the sheet-shaped mold MA is conveyed in a state where the sheet-shaped mold MA and the molding target W adhere to each other, and the peeling between the sheet-shaped mold MA and the molding target W is performed by the peeling device 7 provided apart and separate from the transfer device 5, in other words, the transfer and the peeling are performed in different steps of different spots. Accordingly, the transfer and the peeling can be performed simultaneously, and in the event where the fine transfer pattern M1 formed on the sheet-shaped mold MA is transferred to the molding target W, the molding target W subjected to the transfer can be obtained efficiently (a throughput of the transfer can be shortened).

Moreover, the peeling device 7 can be provided apart from the transfer device 5, and accordingly, there occurs room in a placing space of the peeling device 7, and the transfer device 5 and the peeling device 7 can be fabricated by a design concept free from difficulty. Moreover, it becomes easy to place the first conveying device 15 and the second conveying device 19.

Furthermore, in accordance with the transfer system 1, with respect to the one sheet-shaped mold production device 27 in which a processing capability is high (a tact time is short), the pluralities of transfer devices 5 and the like, in each of which a processing capability is lower (a tack time is longer) than in the sheet-shaped mold production device 27, are provided (refer to FIG. 25). Accordingly, the number of such sheet-shaped mold production devices 27 can be reduced, and the transfer system 1 can be simplified and made inexpensive.

Moreover, in accordance with the transfer system 1, the shock-absorbing material 35 is provided in the transfer device 5, and accordingly, in the event of the transfer, the sheet-shaped mold MA and the molding target W can be sandwiched with a uniform pressure, and an occurrence of a dropout of the transfer can be suppressed.

Moreover, in accordance with the transfer system 1, the mold contact material 39 is provided on the shock-absorbing material 35 of the transfer device 5. Accordingly, in the event of the transfer, when the sheet-shaped mold MA and the molding target W are sandwiched and are subjected to the transfer, and the press body 31 is spaced apart from the sheet-shaped mold MA after the transfer, the press body 31 is less likely to be attached onto the sheet-shaped mold MA, and the release of the sandwiching after the transfer can be surely performed.

Furthermore, in accordance with the transfer system 1, the laminate films S1 are provided, and accordingly, the fine transfer pattern M1 can be avoided being scratched in the unused rolled mold MB.

Note that, in the above, the description has been made of the matter that the UV imprint method is performed in the sheet-shaped mold production device 27 and the transfer device 5 by taking the matter as an example; however, the thermal imprint method may be performed in the sheet-shaped mold production device 27 and the transfer device 5.

The invention claimed is:

1. A sheet-shaped mold position detection device comprising:
   a sheet-shaped mold position detector configured to:
      receive light from a fixed position in a region through which a sheet-shaped mold passes, the sheet-shaped mold comprising a transfer pattern forming area on which the fine transfer pattern is formed and a transfer pattern non-forming area on which the fine transfer pattern is not formed; and
      detect, at the fixed position, a change over time of transmittance or reflection of light in the sheet-shaped mold caused by a movement of a predetermined region of the sheet-shaped mold to the fixed position in a conveyance of the sheet-shaped mold to the region by detecting a difference in the transmittance of the light or a difference in the reflectance of the light between the transfer pattern forming area and the transfer pattern non-forming area, thereby detecting the predetermined region of the sheet-shaped mold.

2. A sheet-shaped mold position detection device comprising:
   a sheet-shaped mold position detector configured to:
      receive light from a fixed position in a region through which a sheet-shaped mold passes; and
      detect, at the fixed position, a change over time of transmittance or reflectance of light in the sheet-shaped mold caused by a movement of the predetermined region to the fixed position in a conveyance of the sheet-shaped mold to the region by detecting an edge line created at a time of forming a fine transfer pattern on the sheet-shaped mold, thereby detecting a predetermined region of the sheet-shaped mold.

* * * * *